United States Patent [19]

Toke et al.

[11] 4,138,718

[45] Feb. 6, 1979

[54] NUMERICAL CONTROL SYSTEM WITH DOWNLOADING CAPABILITY

[75] Inventors: Ronald J. Toke, Bratenahl Village; William A. Donze, Mentor, both of Ohio

[73] Assignee: Allen-Bradley Company, Milwaukee, Wis.

[21] Appl. No.: 850,927

[22] Filed: Nov. 14, 1977

[51] Int. Cl.² .......................... G06F 3/02; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,626,385 | 12/1971 | Bouman | 364/200 |
| 3,744,031 | 7/1973 | Avery et al. | 364/200 |
| 3,810,104 | 5/1974 | Markley | 364/200 |

OTHER PUBLICATIONS

IBM TDB-vol. 14, No. 11, Apr. 1972, pp. 3418-3419—Bensaude et al.-"Host Processor Control of Satellite Disk Storage".

Primary Examiner—Harvey E. Springborn
Attorney, Agent, or Firm—Quarles & Brady

[57] ABSTRACT

A numerical control system which employs a programmed numerical control processor to perform the numerical control functions is coupled to a bulk storage device by a host computer. The bulk storage device stores a download library which includes not only part programs, but also system software programs and diagnostic programs which may be downloaded to the numerical control system upon request. By downloading a system software program the numerical control capabilities of the system can be completely reconfigured to, in essence, provide a new machine.

9 Claims, 22 Drawing Figures

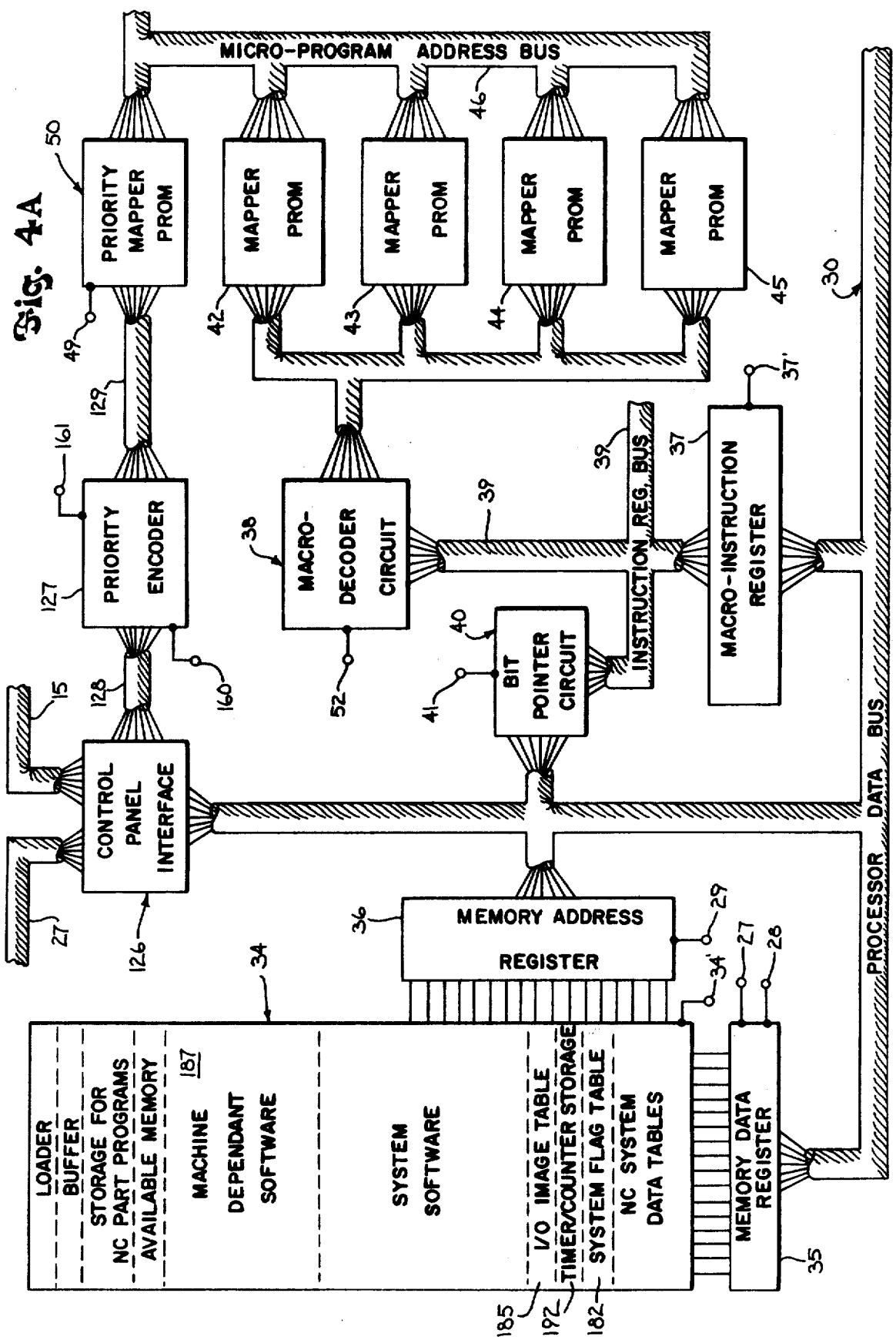

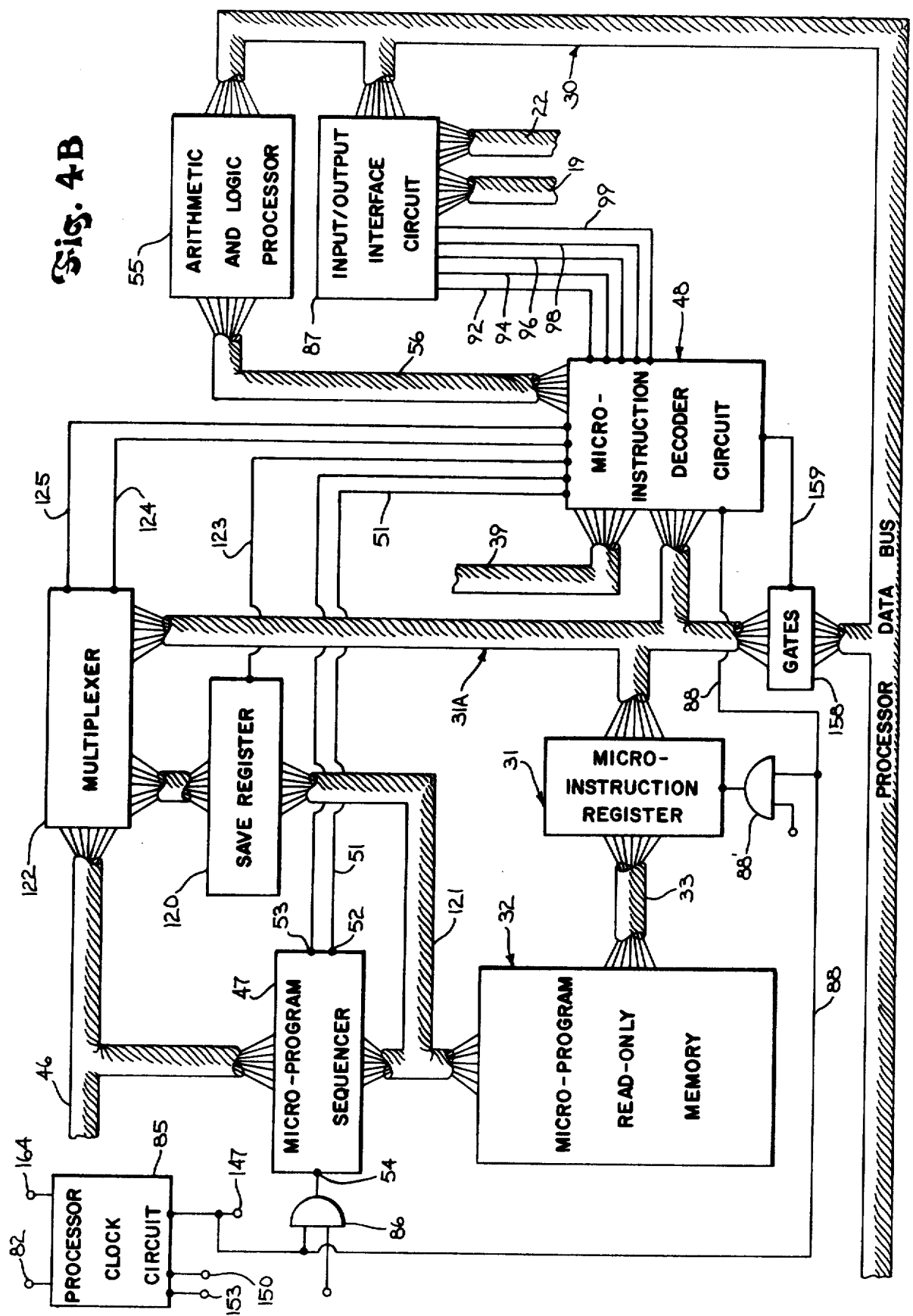

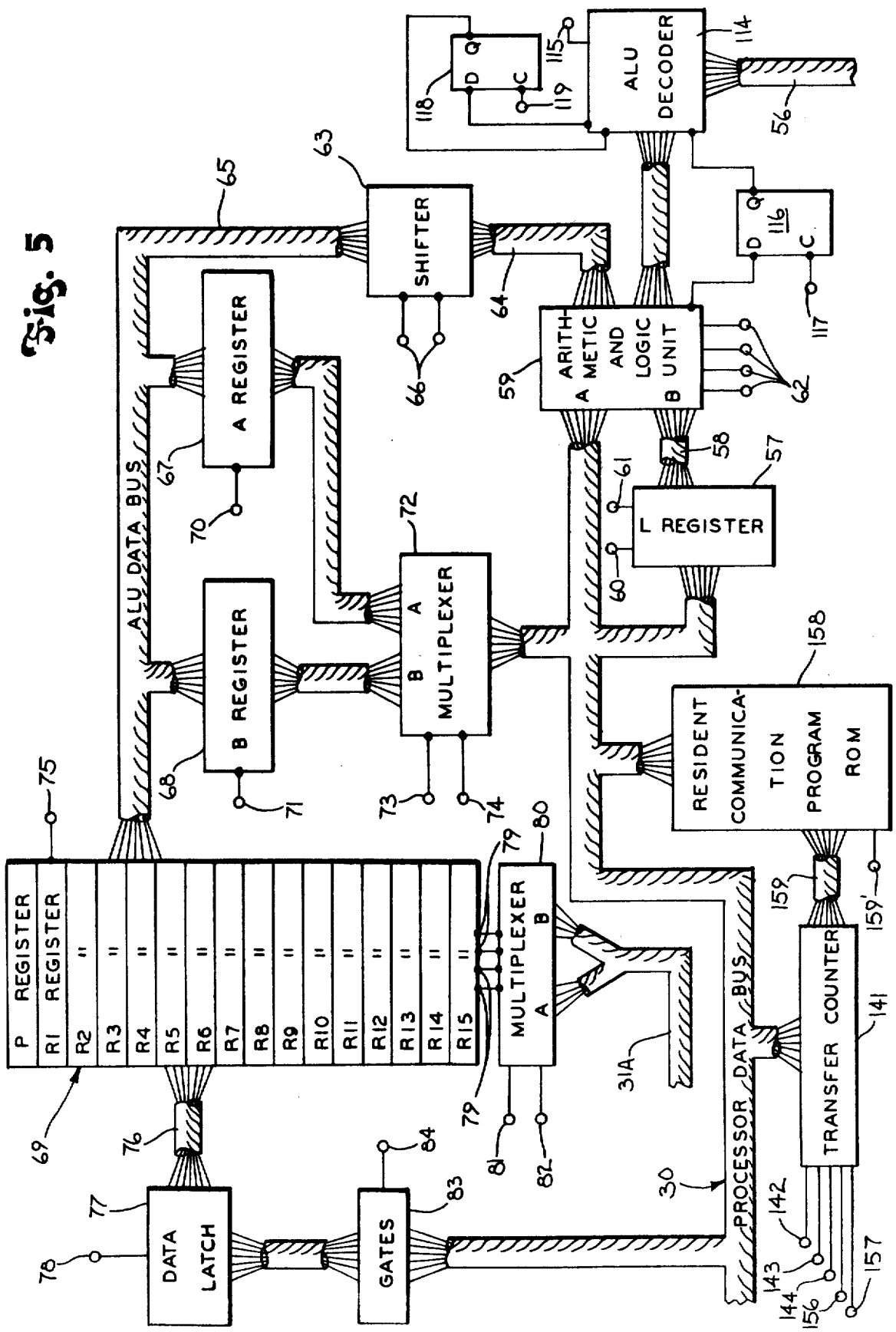

NUMERICAL CONTROL SYSTEM WITH DOWNLOADING CAPABILITY

BACKGROUND OF THE INVENTION

The field of the invention is numerical control systems, and particularly, numerical control systems of the type which employ programmed processors as the means for carrying out the numerical control functions.

Such a numerical control system is known in the art as a computer numerical control or "CNC" and they are characterized generally by their use of a programmed minicomputer or microprocessor in lieu of hardwired logic circuitry. Such a system which employs a programmed processor is disclosed in U.S. Pat. No. 4,038,533 which issued on July 26, 1977 and is entitled "Industrial Control Processor System." Although CNC systems are programmable and do therefore offer a certain amount of flexibility, as a practical matter the system program which determines the basic operational characteristics of the system is seldom altered once the system is attached to a specific machine tool. For example, the CNC system may be programmed to provide full contouring for a three-axis milling machine without automatic tool changer and with certain "canned cycles." That software system is usually not altered during the life of the machine despite the fact that for much of the time the machine tool may not require contouring capability and could make better use of the memory space occupied by the circular and linear interpolation programs.

The flexibility afforded by the use of a programmable processor in a numerical control system has thus never been fully realized in prior systems.

SUMMARY OF THE INVENTION

The present invention relates to a numerical control system in which a system program may be readily downloaded from a library stored in a bulk storage device. More specifically, the invented numerical control system includes a main memory, a processor, a read-only memory which stores a resident communication program, means for transferring the resident communications program from the read-only memory to the main memory and for initiating the execution of said program by the numerical control system processor, a storage device for storing a plurality of programs including a system program for the numerical control system, and a host processor coupled to said storage device and said numerical control system processor and being responsive to a download command generated by said numerical control system processor during its execution of the resident communications program to download said system program to the main memory, wherein the numerical control system processor jumps from the resident communications program to said downloaded system program after the download has been completed.

A general object of the invention is to download a system program to the memory of a CNC system. If the main memory is completely empty, as for example, after a prolonged power failure or a malfunction which erases part or all of the system program, a new system program can be downloaded from the download library in the storage device by initiating the execution of the resident communications program.

Another object of the invention is to enable the operator to select a system program from the download library. A manual data entry means such as a keyboard is associated with the numerical control processor and the download command is selected by the operator to identify a specific program in the download library. In this manner different system programs may be downloaded to alter the capabilities of the numerical control system to meet the requirements of the machine tool to which it is attached and the part being machined.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is made to the claims herein for interpreting the breadth of the invention.

BRIEF DESCRIPTION OF THE DRAWINGS

FIGS. 4a and 4b are a block diagram of the industrial control processor which forms part of the system of FIG. 3;

FIG. 5 is a block diagram of the arithmetic and logic processor which forms part of the industrial control processor of FIG. 4b;

FIG. 7 is a schematic diagram of the priority encoder circuit which forms part of the industrial control processor of FIG. 4a;

DESCRIPTION OF THE PREFERRED EMBODIMENT

Figure 1:
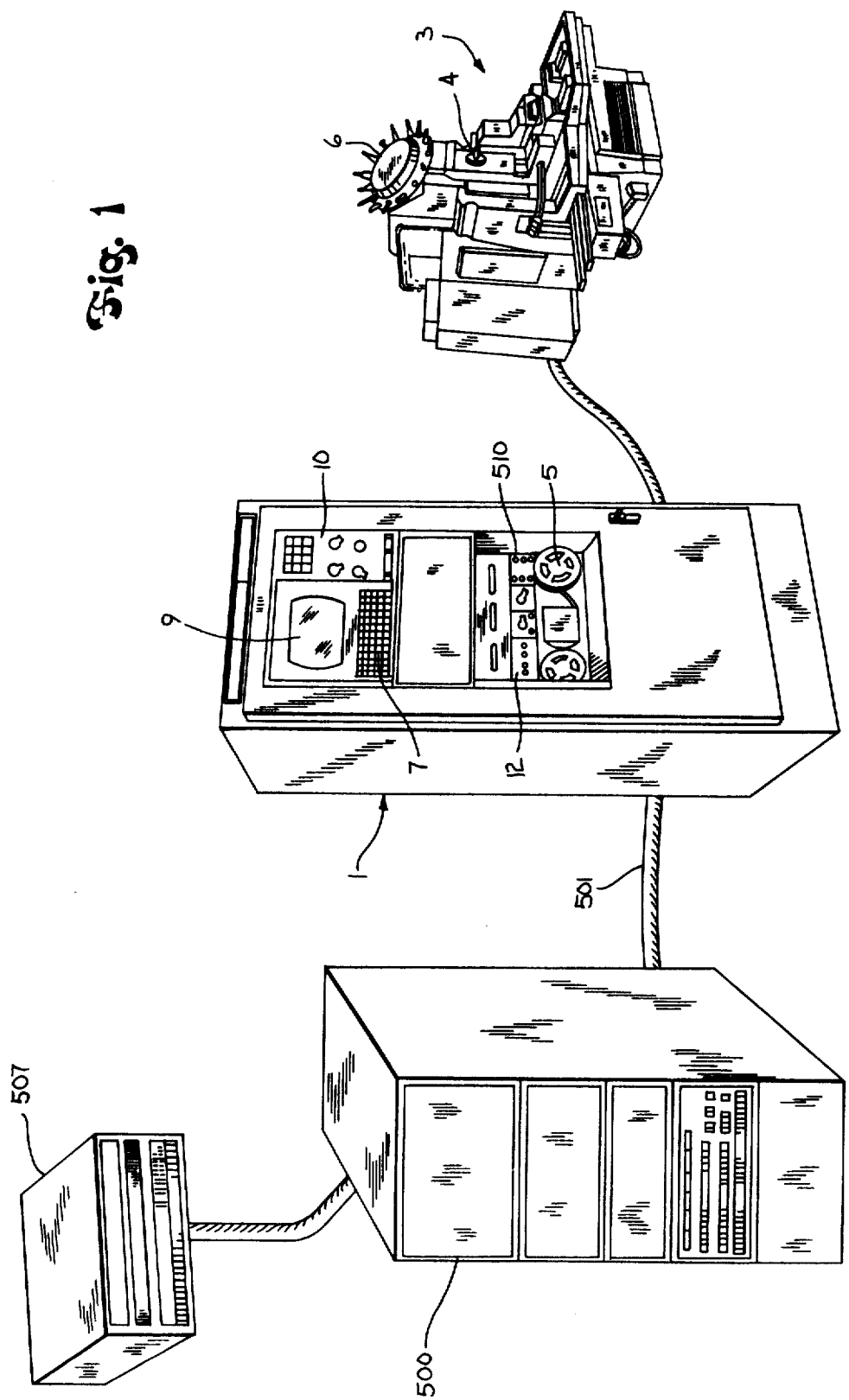
FIG. 1 is a perspective view of the system of the present invention connected to a machine tool.

Referring to FIG. 1, a numerical control system is housed in a cabinet 1 and connected through a cable 2 to a multi-function machine tool with automatic tool changer 3. The numerical control system controls the motion of a cutting tool 4 along two or more axes of motion in response to a part program which is read from a tape reader 5. In addition, the numerical control system operates in response to commands read from the tape reader 5 to control auxiliary functions on the machine tool 3, such as automatic tool selection and changing from a tool magazine 6, pallet selection and changing, spindle speed and coolant operation. The implementation of such auxiliary functions involves the sensing of one-bit signals generated by numerous input devices such as limit switches, selector switches, and photo-electric cells, which are mounted to the machine tool 3, and the operation of numerous output devices such as solenoids, lights, relays and motor starters. The numbers and types of such input and output devices, as well as the manner in which they are operated, will vary considerably from machine to machine.

The numerical control system includes a programmable interface which allows it to be easily interfaced with machine tools of any make and model. This interface is accomplished by entering a control program comprised of programmable controller-type instructions through a keyboard 7. When this control program is executed the system operates as a programmable controller to selectively sense the status of the particular input devices on the machine tool to be controlled and to selectively operate the output devices thereon to provide the desired manner of operation.

Mounted to the door of the cabinet 1 immediately above the keyboard 7 is an associated cathode ray tube (CRT) display 9. Mounted to the right of the keyboard 7 and CRT display 9 is a main control panel 10 which includes a variety of pushbuttons and selector switches for providing standard operator controls such as mode selection, feedrate override, spindle speed override, jog select, axis select, etc. One of the pushbuttons enables the keyboard 7 to enter data.

Figure 2:
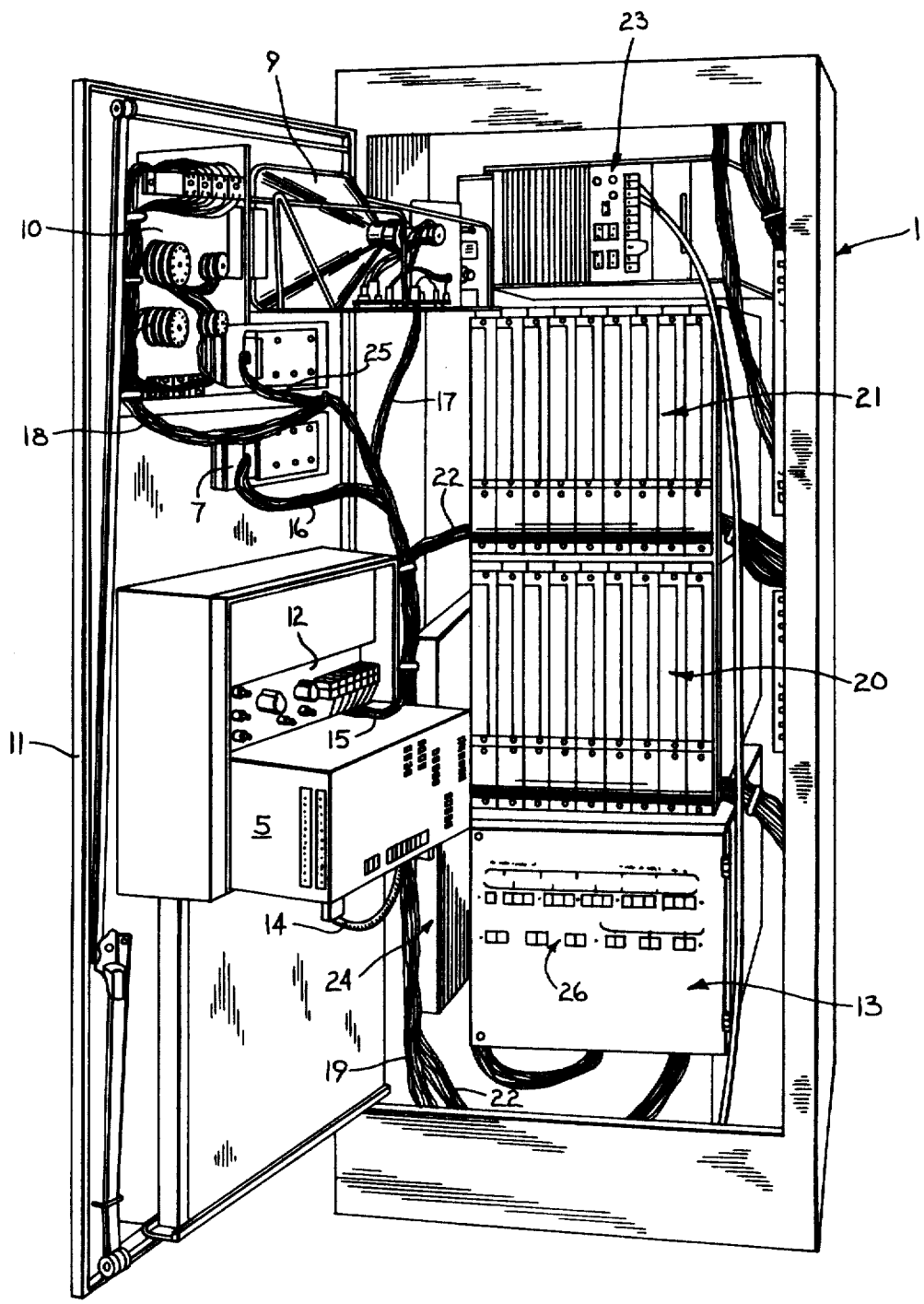
FIG. 2 is a perspective view of the numerical control system which forms part of the system of FIG. 1 with the enclosure door open.
Figure 3:
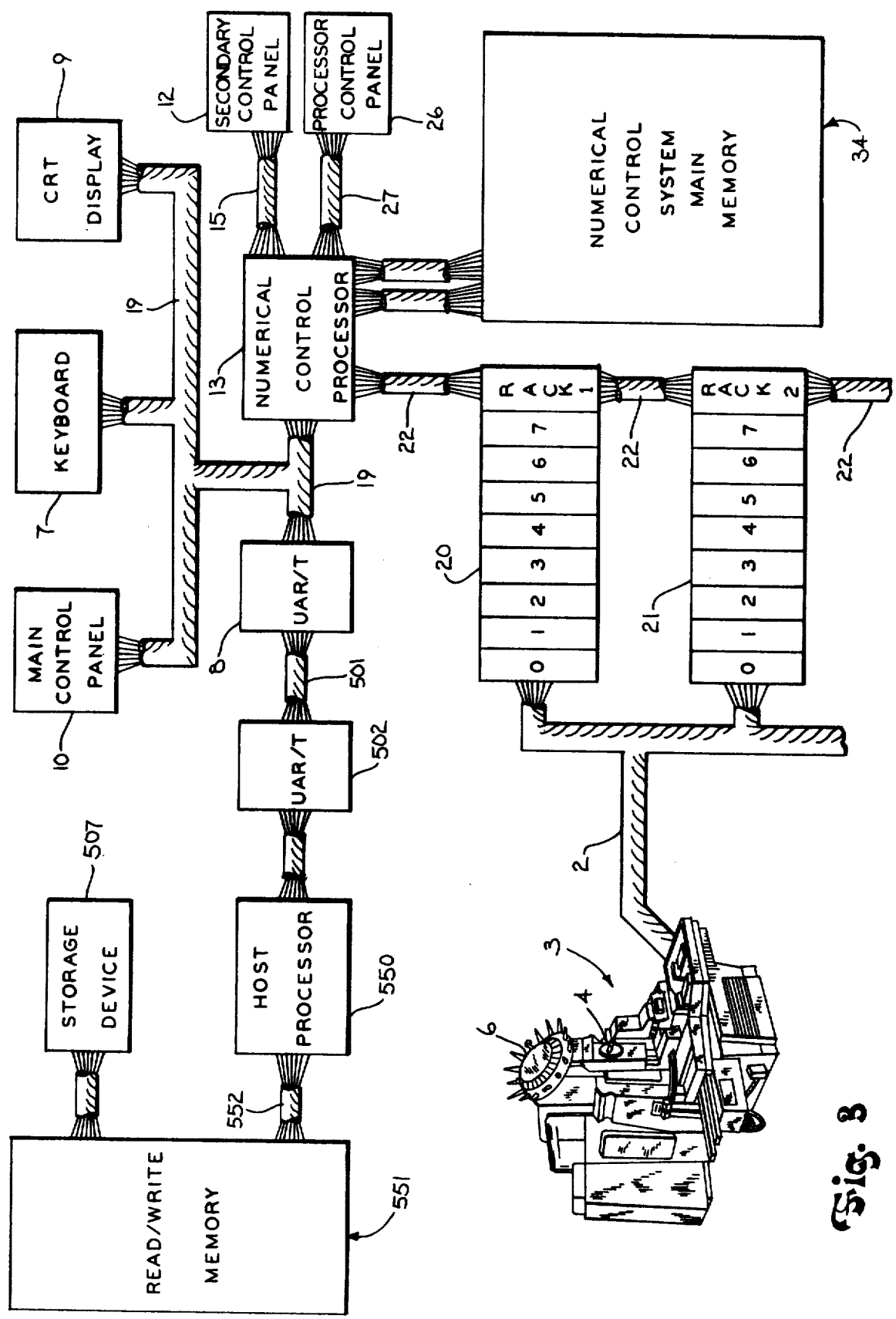
FIG. 3 is a block diagram of the system of FIG. 1.

Referring particularly to FIGS. 2 and 3, the elements of the numerical control system are mounted within the cabinet 1 to allow easy access for inspection, testing and maintenance. The keyboard 7 is mounted to the cabinet door 11 along with the tape reader 5, CRT display 9 and main control panel 10. A secondary control panel 12 mounts immediately above the tape reader 5 and all of these system I/O devices are connected to a numerical control processor 13 which is housed at the bottom of the cabinet 1. More specifically, the tape reader 5 connects through a cable 14, the secondary control panel 12 connects through a cable 15, the keyboard 7 connects through a cable 25, the CRT display 9 connects through a cable 17, and the main control panel 10 connects through a cable 18 to a wire harness 19 which leads to the processor 13. A processor front panel 26 provides a number of manually operable pushbuttons and visual indicators which relate to the operation of the processor 13 and which are connected thereto through a bus 27.

Two input/output (I/O) interface racks 20 and 21 are mounted in the cabinet 1 above the processor 13 and are connected thereto by a wiring harness 22 which extends upward along their left-hand side. A main power supply 23 mounts above the I/O interface rack 21 and a memory power supply 24 mounts on the left side wall of the cabinet 1.

The I/O interface racks 20 and 21 mount a variety of input circuits and output circuits on closely spaced, vertically disposed printed circuit boards (not shown in the drawings). These input and output circuits serve to couple the industrial control processor 13 with the cable 2 that leads to the machine tool 3 and may include input circuits for sensing the status of limit, selector and pushbutton switches such as that disclosed in U.S. Pat. No. 3,643,115 entitled "Interface Circuit for Industrial Control Systems," and output circuits for driving solenoids and motors such as that disclosed in U.S. Pat. No. 3,745,546 entitled "Controller Output Circuit." The input circuits also include position feedback accumulators which receive feedback data from the position transducers on the machine tool 3 and the output circuits include registers for providing axis motion command words to the machine tool servo mechanisms.

Referring particularly to FIGS. 1-3, the numerical control system 1 is connected to a host computer 500 through a cable 501 in what is known in the art as a DNC configuration. The cable 501 connects to a universal asynchronous receiver/transmitter (UAR/T) 8 which is mounted within the numerical control processor housing 13 and it in turn is connected to the numerical control processor 13 through the wire harness 19. The UAR/T 8 is treated as another input/output device by the processor 13 as will be described in more detail hereinafter.

The host computer 500 is a general purpose digital computer such as the Model 7/32 manufactured by Interdata, Inc. As will be described in more detail hereinafter, it is coupled to the cable 501 by a UAR/T 502 which connects to an I/O port on a computer processor 550. The processor 550 is coupled to a read/write memory 551 through a bus 552 and a bulk storage device 507 in the form of a disc couples to the memory 551 and it serves to store not only a large number of part programs, but also, a variety of numerical control system software packages which may be downloaded to the numerical control system 1. Programs stored in the host computer memory 551 enable the computer to communicate with the numerical control system 1 and to manage the library of programs stored in the bulk storage 507.

As will be described in more detail hereinafter, an operator at the numerical control system 1 can call up a particular part program or a particular numerical control software system by generating commands through the keyboard 7. Referring particularly to FIG. 3, a communications package stored in a numerical control system memory 34 couples these commands to the host computer 500, which in turn reads the selected part program or numerical control system software package out of the bulk storage 507 and downloads it to the numerical control system 1. The downloaded program is stored in the memory 34 at a location determined by the communications package. To better understand the nature of a numerical control software system package which can be downloaded from the bulk storage 507 to the memory 34, a description of a preferred numerical control system — both hardware and software — will now be made. This preferred numerical control system is sold commercially by the Allen-Bradley Company as the Model 7300 B and it is described in detail in U.S. Pat. No. 4,038,533.

Referring particularly to FIGS. 4a and 4b, the numerical control processor 13 is organized around a sixteen-bit bidirectional processor data bus 30. Data is moved from one element of the processor to another through this data bus 30 in response to the execution of a micro-instruction which is held in a 24-bit micro-instruction register 31. Each such micro-instruction indicates the source of the data to be applied to the data bus 30, the destination of the data, and any operations that are to be performed on that data. The micro-instructions are stored in a micro-program read-only memory 32, and one is read out every 200 nano-seconds through a bus 33 to the micro-instruction register 31. The read-only memory 32 stores a large number of separately addressable, or selectable, micro-routines, each of which is comprised of a set of micro-instructions. To enable the processor 13 to perform a desired function, the appropriate micro-routine is stored in the read-only memory 32 and it is selected for execution by a 16-bit macro-instruction which is stored in a read/write main memory 34.

The main memory 34 is comprised of 4K by 1 dynamic MOS RAMs which are organized to store up to 32,000 16-bit words. Macro-instructions and data are read out of and written into the main memory 34 through a 16-bit memory data register 35 which connects to the processor data bus 30. The memory words are selected, or addressed, through a 15-bit memory address register 36 which also connects to the processor data bus 30. To write into the main memory 34, an address is first loaded into the memory address register 36 by applying a logic high voltage to its clock lead 29. The data to be loaded appears on the processor data bus 30 and is gated through the memory data register by applying a logic high voltage to its data in clock lead 27. A logic high voltage is then applied to a read/write control line 34' on the memory 34 to complete the loading operation. Data or a macro-instruction is read out of an addressed line of the main memory 34 when a READ micro-instruction is executed. A logic low voltage is applied to the read/write control line 34' and a logic high voltage is applied to a data out enable line 28 on the memory data register 35. The data word is momentarily stored in the register 35 and is subsequently transferred through the processor data bus 30 to the desired destination.

In response to the execution of a micro-routine called FETCH, which includes the READ micro-instruction, a macro-instruction is read from the main memory 34 and coupled to a 16-bit macro-instruction register 37 through the data bus 30. The macro-instruction is stored in the register 37 by a logic high voltage which is applied to a macro-instruction register clock line 37'. Certain of the macro-instructions include operation codes which are coupled through an instruction register bus 39 to a macro-decoder circuit 38, and other instructions also include a bit pointer code which is coupled through the same instruction register bus 39 to a bit pointer circuit 40. The bit pointer circuit 40 is a binary decoder having four inputs connected to the least significant digit outputs of the macro-instruction register 37 and having a set of 16 outputs connected to respective leads in the processor data bus 30. In response to the execution of a selected micro-instruction (MASK), a logic high voltage is applied to a terminal 41, and the bit pointer circuit 40 drives a selected one of the sixteen leads in the processor data bus 30 to a logic low voltage. The bit pointer circuit 40 facilitates the execution of certain programmable controller type macro-instructions.

In response to an operation code in a macro-instruction stored in the register 37, one of the micro-routines in the read-only memory 32 is selected. The operation code is applied to the macro-decoder circuit 38 which enables one of four mapper proms 42-45 and addresses a selected line in the enabled mapper prom. Each line of the mapper proms 42-45 stores a twelve-bit micro-routine starting address, which when read out, is coupled through a micro-program address bus 46 to preset a twelve-bit micro-program sequencer 47. The sequencer 47 is a presettable counter which includes a load terminal 52, an increment terminal 53 and a clock terminal 54. The clock terminal 54 is driven by a five-megahertz clock signal which is generated by a processor clock circuit 85 that is coupled to the sequencer 47 through an AND gate 86. Each time a logic high clock pulse is applied to the terminal 54 on the micro-program sequencer 47, it is either preset to an address which appears on the bus 46 or it is incremented one count. Concurrently, the micro-instruction register 31 is clocked through a line 88 and AND gate 88' to read and store the micro-instruction which is addressed by the micro-program sequencer 47. The AND gates 86 and 88 can be disabled in response to selected codes in a micro-instruction to decouple the 5 mHz clock. Such decoupling of the clock 85 from the sequencer 47 occurs, for example, during input and output operations to allow data one micro-second to propagate.

Each micro-second which is read out of the read-only memory 32 to the micro-instruction register 31 is coupled through a micro-instruction bus 31a to a micro-instruction decoder circuit 48 which is also coupled to the clock line 88. The micro-instructions are decoded and executed before the next clock pulse is applied to the terminal 54 on the micro-program sequencer 47. Each micro-instruction is comprised of a plurality of separate codes called micro-orders which are each separately decoded to enable one of the processor elements.

Each micro-routine stored in the micro-program read-only memory 32 is terminated with a special micro-instruction which includes a code, or micro-order, identified hereinafter by the mnemonic EOX or EOXS. When coupled to the micro-instruction decoder circuit 48, this code causes a logic high voltage to be generated on an EOX line 49 to a priority mapper prom 50. If the industrial control processor 13 is in the RUN mode, the starting address of the FETCH micro-routine is read from the priority mapper prom 50 and is applied to the micro-sequencer 47 through the bus 46. The micro-instruction decoder circuit 48 also generates a logic high voltage on a preset line 51 which connects to the load terminal 52 on the micro-program sequencer 47 to preset the sequencer 47 to the starting address of the FETCH micro-routine.

As indicated above, the FETCH micro-routine functions to read the next macro-instruction to be executed from the main memory 34, couple it to the macro-instruction register 37, and initiate the execution of that macro-instruction. The last micro-instruction in the FETCH micro-routine includes a code which is identified hereinafter by the mnemonic MAP. This micro-instruction code causes the micro-instruction decoder circuit 48 to generate a logic high voltage to the macro-decoder circuit 38 through a MAP line 52 and to thereby initiate decoding of the macro-instruction which is stored in the macro-instruction register 37. A logic high voltage is also generated on the preset line 51 to load the micro-program sequencer 47 with the starting address of the micro-routine called for by the decoded macro-instruction.

As shown in FIG. 4b, mathematical and logical operations are performed by the industrial control processor 13 in an arithmetic and logic processor 55 which connects to the processor data bus 30 and to the micro-instruction decoder circuit 48 through a bus 56. Referring particularly to FIG. 5, the arithmetic and logic processor 55 includes a 16-bit "L" register 57 which has inputs that connect to the leads in the processor data bus 30 and a corresponding set of outputs which connect through a bus 58 to the "B" inputs of a 16-bit arithmetic and logic unit (ALU) 59. Data on the bus 30 is clocked into the L register 57 when a logic high is applied to a lead 60 and the L register 57 is cleared when a logic high is applied to a lead 61. The leads 60 and 61 connect to the micro-instruction decoder circuit 48 through the bus 56 and are thus controlled by selected micro-instructions.

The ALU 59 is comprised of four commercially available arithmetic logic units combined with a commercially available full carry look-ahead circuit to perform high speed functions such as add, substract, decrement and straight transfer. The ALU 59 has a set of 16 "A" inputs which connect directly to the leads in the processor data bus 30 and a set of four function-select lines 62 which connect to the micro-instruction decoder circuit 48 through the bus 56. In response to selected micro-instructions, the ALU 59 performs functions on data applied to its A and B inputs and generates the 16-bit results to a shifter circuit 63 through a bus 64.

Also, the ALU 59 generates signals to an ALU decoder 114 which indicate when the result of a logical or arithmetic function is zero, all "ones," odd, negative or when it causes an overflow or a carry. The existence of such a condition is separately tested by micro-orders, or codes in micro-instructions which enable the ALU decoder 114 through the bus 56. The existence of the tested condition results in the generation of a logic high on a skip line 115 which connects to the decoder 48.

The existence of an overflow condition in the ALU 59 can also be stored in an overflow flip-flop 116 when a logic high is applied to its clock terminal through a line 117 by the decoder circuit 48. The Q output on the flip-flop 116 connects to the ALU decoder 114 and its condition can be tested by an appropriate micro-order. A system flag flip-flop 118 connects to the ALU decoder 114 and it can be clocked in response to an appropriate micro-order through a line 119 from the micro-instruction decoder 48. The flag flip-flop 118 may be set in response to one of the tested ALU conditions, and its state, or condition can in turn be tested by an appropriate micro-order acting through the ALU decoder 114.

The shifter circuit 63 is comprised of eight commercially available, dual four-line-to-one-line data selectors having their inputs connected to selected leads in the bus 64. Sixteen outputs on the shifter 63 connect to a 16-lead ALU data bus 65 and a pair of control leads 66 connect it to the micro-instruction decoder circuit 48. In response to selected micro-instructions, the shifter 63 passes the sixteen-bit data word from the ALU 59 directly to the ALU data bus 65, or it shifts or rotates that data one or four bits.

The 16-bit data word on the ALU bus 65 is coupled to a 16-bit "A" register 67, a 16-bit "B" register 68, or a random access memory bank 69. The data is clocked into the A register 67 by applying a logic high voltage to a lead 70 which connects the A register 67 to the micro-instruction decoder circuit 47, or the data is clocked into the B register 68 by applying a logic high voltage to a lead 71 which connects the B register 68 to the micro-instruction decoder circuit 48. The sixteen outputs of the A register 67 connect to the "A" inputs on a 16-bit multiplexer 72 and the 16 outputs on the B register 68 connect to the "B" inputs on the multiplexer 72. Sixteen outputs on the multiplexer 72 connect to the leads in the processor data bus 30, and when a logic high voltage is applied to an enable lead 73 thereon, the contents of either the A register 67 or the B register 68 are coupled to the processor data bus 30. The selection is made through a select lead 74 which, along with the enable lead 73, connect to the micro-instruction decoder circuit 48. In response to the execution of selected micro-instructions, therefore, the A register 67 or the B register 68 may provide the source of data to the processor data bus 30 through the multiplexer 72, or they may be designated by selected micro-instructions as the destination of data on the processor bus 30 which is coupled through the ALU 59 and the shifter circuit 63.

The random access memory 69 is comprised of four commercially available 64-bit (16×4) random access memories which are arranged to provide 16 16-bit registers identified hereinafter as the "P" register and the R1-R15 registers. A sixteen-bit data word is written into the random access memory 69 from the ALU data bus 65 when a logic high voltage is applied to a read-write line 75. On the other hand, the contents of one of the 16 registers in the memory 69 are read out through a bus 76 to a 16-bit data latch 77 when the line 75 is at a logic low voltage and the data latch 77 stores this word when a logic high voltage is applied to its clock line 78. The lines 75 and 78 connect to the micro-instruction decoder circuit 48 and both the random access memory 69 and the data latch 77 are thus responsive to selected micro-instructions.

The particular register in the random access memory 69 which is to be accessed is determined by a four-bit address code which is applied to a set of terminals 79. The address terminals 79 are connected to the outputs of a four-bit multiplexer 80 which has a set of "A" inputs connected to receive bits 4-7 of the micro-instruction (source field) and a set of four "B" inputs which are connected to receive bits 9-12 of the micro-instruction (destination field) through the micro-instruction bus 31a. The multiplexer 80 is enabled through a lead 81 which connects to the micro-instruction decoder circuit 48 and the four-bit address on the A or B inputs is selected by the logic signal applied to a lead 82 which connects to receive a 5 mHz "destination" signal from the clock circuit 85. When the random access memory 69 is identified as the source of data, the address of the particular register in the memory 69 from which the data is to be read appears at the A inputs of the multiplexer 80, and when the random access memory 69 is identified as the destination of data, the address of the particular register into which the data is to be written appears on the B inputs.

Data read from the random access memory 69 and stored in the data latch 77 is coupled to the processor data bus 30 by a set of 16 gates 83. The gates 83 are enabled through a lead 84 which connects to, and is controlled by, the micro-instruction decoder circuit 48. For example, the P register in the memory 69 serves as the macro-program counter, and when the FETCH micro-routine is executed, the contents of the P register is read out through the data latch 77 and the gates 83 to the processor data bus 30 where it is coupled to the main memory address register 36.

The arithmetic and logic processor 55 also includes a 10-bit binary transfer counter 141 which has its inputs connected to the ten least significant digit leads in the processor data bus 30. A constant can be loaded into the transfer counter 141 by a micro-order which designates it as the destination of the data and which enables it through an enable lead 142. The same micro-order generates a logic high voltage to a preset terminal through a lead 143. The transfer counter 141 can be incremented through a lead 144 and an output signal is generated on respective leads 156 and 157 when a count of 15 or 1,023 is reached. The leads 142–144, 156 and 157 connect to the micro-instruction decoder 48.

Connected to the processor data bus 30 and the transfer counter 141 is a resident communication program read-only memory 158. The ROM 158 is a 4-bit by 1024 line read-only memory which has its address terminals connected to the counter 141 through a nine-lead bus 159 and its four data output terminals connected to the four least significant leads in the data bus 30. The ROM 158 is enabled to read a four-bit byte of data onto the bus 30 when a logic high voltage is applied to an enable terminal 159 by the micro-instruction decoder 48.

Figure 6:
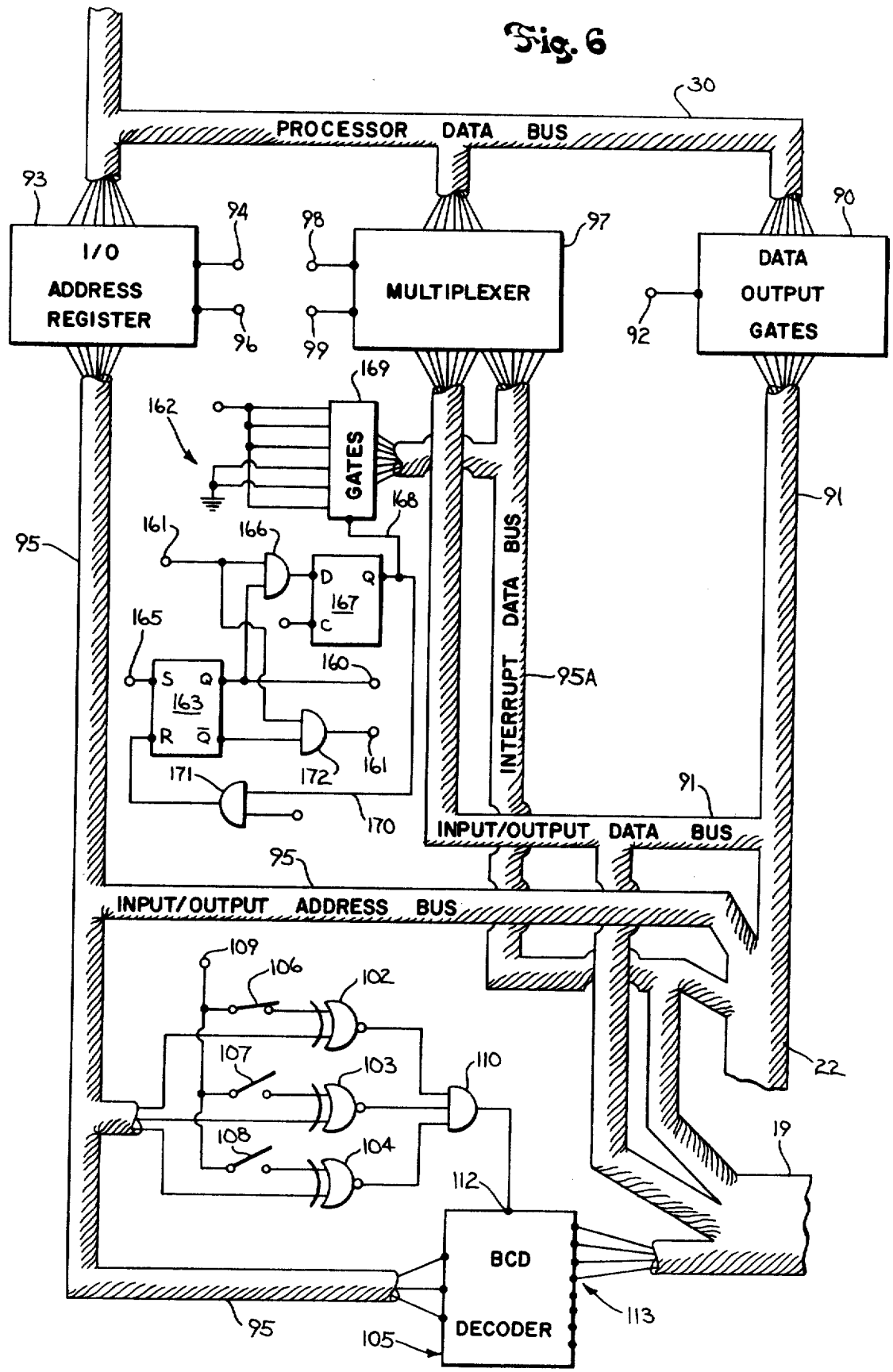
FIG. 6 is a block diagram of the input/output circuitry which forms a part of the industrial control processor of FIG. 4b.

Referring again to FIGS. 3 and 4b, data is coupled to and is received from the I/O interface racks 20 and 21 and the system I/O devices 5, 7, 8, 9 and 10 through an input/output interface circuit 87 which connects to the processor data bus 30. Referring particularly to FIG. 6, the I/O interface circuit 87 includes a set of sixteen data output gates 90 which have inputs connected to the leads in the processor data bus 30 and outputs which connect to a 16-bit input/output data bus 91. An enable line 92 connects a second input on each of the data output gates 90 to the micro-instruction decoder circuit 48, and when driven to a logic high voltage, a 16-bit data word on the processor data bus 30 is coupled to the input/output data bus 91. The input/output data bus 91 connects to the wiring harness 19 and 22 which couple the industrial control processor 13 to the interface racks 20 and 21 and to the respective system I/O devices such as the CRT display 9.

The input/output interface circuit 87 also includes a six-bit input/output address register 93 which connects to the six least significant digit leads in the processor data bus 30. The I/O address register 93 connects to the micro-instruction decoder circuit 48 through a clock lead 94 and when a logic high voltage is generated on the clock lead 94, a six-bit I/O address is clocked into the register 93 from the processor data bus 30. Six output terminals on the register 93 connect to leads in a six-bit I/O address bus 95. The I/O address bus 95 joins the wiring harness 22, and the I/O address stored in the register 93 is thus coupled through the bus 95 to the I/O interface racks 20 and 21. A clear line 96 connects the address register 93 to the micro-instruction decoder circuit 48, and when a logic high voltage is generated thereon, the register 93 is reset to zero. As will be described in more detail hereinafter, when an OTA macro-instruction is executed, the I/O address (rack number and slot number) is loaded into the output address register 93 and is applied to the I/O address bus 95. The addressed device acknowledges receipt of its address and a 16-bit data word may then be applied to the processor data bus 30 and gated onto the input/output data bus 91 to the addressed device.

Data is coupled into the industrial control processor 13 through a 16-bit multiplexer 97 which forms part of the input/output interface circuit of FIG. 6. A set of 16 "B" input terminals on the multiplexer 97 connect to the input/output data bus 91 and a set of 16 output terminals thereon connect to the respective leads in the processor data bus 30. The six least significant digit inputs of a set of 16 "A" inputs on the multiplexer 97 connect to an interrupt address bus 95a. An enable line 98 and a select line 99 on the multiplexer 97 connect to the micro-instruction decoder circuit 48. When a logic high voltage is generated on the enable line 98, the data on either the I/O data bus 91 or the interrupt address bus 95a is coupled to the processor data bus 30. The selection is made by the logic state of the select line 99 which is also controlled by selected micro-instructions through the decoder circuit 48.

Decoding of the I/O address for the system I/O devices 5, 7, 8, 9 and 10 is accomplished in the input/output interface circuit of FIG. 6. The three most significant digit leads of the input/output address bus 95 connect to the respective inputs on three exclusive NOR gates 102–104 and the three least significant digit leads therein connect to the inputs of a BCD decoder 105. A second input on each of the exclusive NOR gates 102–104 connects through respective switches 106–108 to a logic low voltage supply terminal 109 and an output terminal on each of the gates 102–104 connects to respective inputs on an AND gate 110. An output on the AND gate 110 connects to an enable terminal 112 on the BCD decoder 105, and when a logic high voltage is generated thereat, the three-bit binary coded decimal number applied to the inputs of the decoder 105 is decoded. As a result, a logic low voltage is generated at one of eight terminals 113, the five least significant of which connect to the respective system I/O devices 5, 7, 8, 9 and 10 through the wire harness 19. The three switches 106–108 are set to indicate the rack number (which in the preferred embodiment is number 1), and when this number appears on the three most significant digit leads of the I/O address bus 95, one of the system I/O devices is addressed.

The input/output interface circuit 87 of FIG. 6 also includes a timed interrupt circuit 162. The circuit 162 includes an R–S flip-flop 163 having a set terminal connected through a lead 164 to the processor clock circuit 85 (FIG. 4b). Every 10.25 milliseconds a logic high clock pulse is applied to set the flip-flop 163 and a logic high voltage is generated at its Q output terminal and applied to an interrupt request line 160. The interrupt request line connects to a priority encoder circuit 127 (FIG. 4a) as will be described hereinafter, and when the interrupt is granted, a logic high voltage is generated on an interrupt acknowledge line 161. The interrupt acknowledge signal is gated through an AND gate 166 and clocked into a d.c. flip-flop 167 connects through a lead 168 to one input on each of six AND gates 169 and through a lead 170 to an AND gate 171. The outputs of the AND gates 169 connect to the respective leads in the interrupt address bus 95a and their respective second input terminals are connected to logic high and logic low voltage sources in such fashion as to generate the octal address seventeen on the bus 95a when the d.c. flip-flop 167 is set. Thus, every 10.24 milliseconds the circuit 162 generates an interrupt request to the priority encoder 127 and when an acknowledge signal is received it asserts the I/O address seventeen on the interrupt address bus 95a.

Circuits similar to the timed interrupt circuit 162 reside in the keyboard 7, the UAR/T 8 and the tape reader 5. Each of these system I/O devices connect to the interrupt request line 160 and each is connected in "daisy chain" fashion to the interrupt acknowledge line 161. As shown in FIG. 6, the interrupt acknowledge line 161 is coupled through the interrupt circuit 162 by an AND gate 172 which is controlled by the Q output terminal on the R—S flip-flop 163. Thus, when the circuit 162 requests the interrupt, it not only responds to the resulting interrupt acknowledge signal, but it also prevents that signal from being coupled to subsequent system I/O devices in the daisy chain. In this manner, only one interrupting I/O device is serviced at a time. As will be described in more detail hereinafter, when an interrupt is acknowledged by the priority encoder circuit 127, it also initiates the execution of an interrupt service micro-routine which loads the I/O address of the interrupting device into register R4 of the memory 69. This I/O address is then employed to locate the starting address in the main read/write memory 34 of a macro-routine which services that particular system I/O device. For example, the timed interrupt circuit 162 calls up a ten millisecond timed interrupt routine.

It should be apparent from the description thus far that the various elements of the industrial control processor 13 are operated in sequence in response to micro-instructions which are read from the micro-program read-only memory 32 into the micro-instruction register 31 and which are then decoded by the decoder circuit 48. The address of the first micro-instruction in any micro-routine to be executed is loaded into the micro-program sequencer 47 from one of the mapper prom 42-45 or 50 and as the micro-instructions are executed, the micro-program sequencer 47 is incremented one count to read out the next micro-instruction in the micro-routine until an EOX or EOXS code is detected which indicates the end of the micro-routine.

Referring particularly to FIG. 4b, to enable the use of JUMP micro-instructions, and to thus allow one level of micro-subroutine, a 12-bit save register 120 is connected to the outputs of the micro-program sequencer 47 through a bus 121, and a twelve-bit multiplexer 122 is connected to the inputs of the sequencer 47 through the address bus 46. The save register includes a clock lead 123 which connects to the micro-instruction decoder circuit 48, and when selected JUMP micro-instructions are executed, the address stored in the micro-program sequencer 47 is stored in the save register 120. The outputs of the save register 120 connect to a set of 12 "A" inputs on the multiplexer 122, and when a return call micro-instruction is subsequently executed, the address stored in the save register is coupled through the multiplexer 122 and loaded back into the micro-program sequencer 47. The multiplexer 122 also includes a set of "B" inputs which connect to the micro-instruction bus 31a, and when a JUMP micro-instruction is executed, the target address in the instruction is coupled from the micro-instruction register 31 to the micro-program sequencer 47 through the multiplexer 122. The multiplexer 122 is controlled by the data select lead 124 and an enable lead 125, both of which connect to the micro-instruction decoder circuit 48.

Referring to FIG. 4b, the micro-instruction bus 31a also couples to the processor data bus 30 through a set of 16 AND gates 158. One input on each gate 158 connects to a lead in the bus 31a and a second input on each is commonly connected through a lead 159 to the micro-instruction decoder circuit 48. Their outputs connect to the respective leads in the processor data bus 30.

Referring particularly to FIG. 4a, the switches, lights and other control and indicating devices on the processor front panel 26 and the secondary control panel 12 are coupled to the processor data bus 30 by a control panel interface circuit 126. The control panel interface circuit 126 in turn is connected to inputs of a priority encoder 127 through a seventeen-lead bus 128 and five outputs on the priority encoder 127 connect to the priority mapper prom 50 through a bus 129. The control panel interface circuit 126 receives signals from panels 12 and 26 through the cables 15 and 27, and it receives signals through the processor data bus 30. In response, it generates a logic low on one or more of the leads in the cable 128 which determine the mode in which the industrial control processor 13 is to operate.

Figure 7:
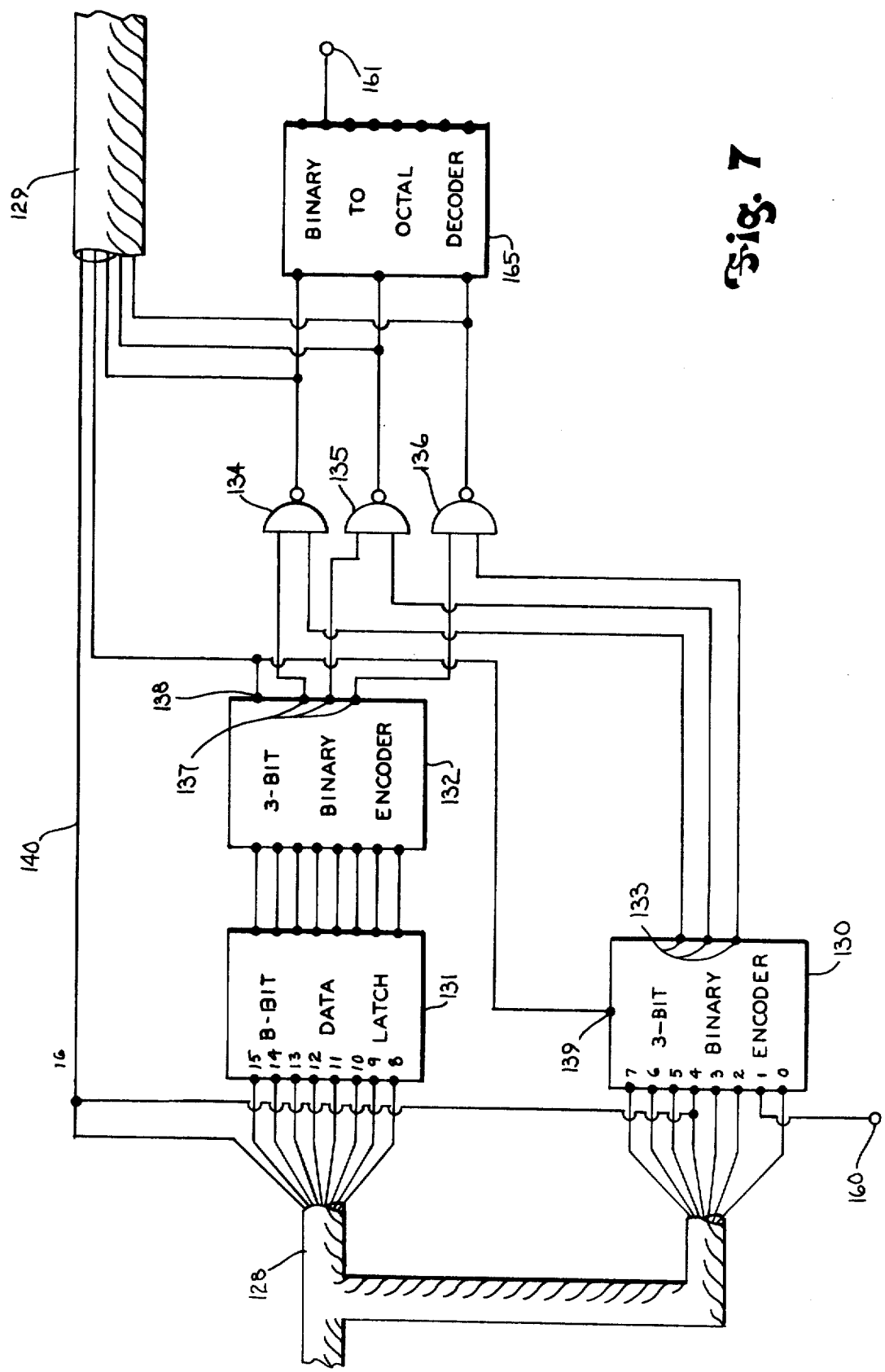

Referring particularly to FIG. 7, the priority encoder 127 includes a first three-bit binary encoder 130 which has a set of eight inputs, seven of which connect to the bus 128. The eighth input connects to the interrupt request line 160 from the I/O interface circuit 87. An eight-bit data latch 131 also has a set of eight inputs which connect to leads in the bus 128 and its eight output terminals connect to respective inputs on a second three-bit binary encoder circuit 132. Three output terminals 133 on the first binary encoder 130 connect to respective first inputs on three NAND gates 134-136. Similarly, three output terminals 137 on the second encoder 132 connect to respective second inputs on the NAND gates 134-136 and a fourth output terminal 138 on the second encoder 132 connects to an enable terminal 139 on the first binary encoder 130. The fourth output 138, the outputs of the respective NAND gates 134-136 and a seventeenth lead 140 in the bus 128 connect to respective leads in the bus 129 which in turn connects to the priority mapper prom 50. The lead 140 also connects to input number 4 on the first binary encoder 130.

The priority encoder 127 generates a five-bit binary code to the priority mapper prom 50 which is responsive to a logic low voltage at one of the seventeen leads in the bus 128, and which operates to address a line of the mapper prom 50. The mapper prom 50 is enabled when its EOX terminal 49 is driven to a logic high voltage at the completion of the micro-routine then being executed and a twelve-bit starting address is read out of the addressed line of the enabled mapper prom 50 to the micro-program sequencer 47. Although more than one of the leads in the bus 128 may be low at any given time, the encoder circuit 127 generates the code, or mapper prom line address, only for that lead which has the highest priority. Listed from the lowest to highest priority, the signals on the respective lead numbers 0-16 in the bus 128 result in the following functions being performed:

| Lead No. | Micro-Routine | Description |
|---|---|---|
| 0 | FETCH | RUN mode in which the program stored in the main memory is executed. |
| 1 | INTERRUPT | A requested interrupt is serviced. |
| 2 | POWER UP /DOWN | A higher priority interrupt which is serviced before other interrupts. |
| 3 | START | Initiates the processor when it is switched from HALT to RUN mode. |
| 4 | HALT | Three-instruction micro-loop in which no execution of macro-instructions or servicing of interrupts will occur. |
| 5 | CLR DISPL | Display register on processor front panel 26 is cleared. |
| 6 | PAR NHLT | Interrupts and displays "memory error" on CRT. |
| 7 | PAR HLT | Interrupts and halts processor. |
| 8 | DISPL R | Display contents of a selected |

-continued

| Lead No. | Micro-Routine | Description |
|---|---|---|
| | | processor register on processor front panel 26. |
| 9 | DISPL T | Display contents of a selected memory location on processor front panel 26. |
| 10 | STORE R | Store contents of processor front panel display in selected processor register. |
| 11 | STORE T | Store contents of processor front panel display in selected memory location. |
| 12 | DECM | Decrement memory address register 36. |
| 13 | INCM | Increment memory address register 36. |
| 14 | STEP | Execute one macro-instruction, then halt. |
| 15 | BBL | A micro-program which transfers the resident communications program stored in ROM 158 to main memory 34 and initiates its execution. |
| 16 | MPFF | Writes HALT codes in every location of the main memory when battery power is lost during an extended shutdown. |

The priority encoder 127 also includes a binary-to-octal decoder 165 which has a set of three inputs which connect to the respective NAND gates 134-136. The second of eight output terminals on the decoder 165 connects to the interrupt acknowledge line 161, and when the interrupt service micro-routine is requested by a logic high voltage on the interrupt request line 160, a logic high voltage is generated on the interrupt acknowledge line 161 when the request is granted.

The above described hardware is operated in response to micro-routine comprised of micro-instructions which are executed at a rate of one every 200 nanoseconds. These micro-instructions include codes which are decoded by the circuit 48 to generate enabling signals to the appropriate system elements. The operation of the hardware will become more apparent after the micro-instruction set which this hardware executes is discussed.

The micro-instruction set is comprised of three types of instructions. The first type of micro-instruction has the following format and is employed to transfer data between processor elements which couple to the processor data bus 30, to perform logical and arithmetic functions on data applied to the ALU 59, and to perform data test and micro-instruction skip operations.

| Bit No. | 23 22 21 20 19 | 18 17 16 15 14 | 13 12 11 10 9 | 8 7 6 5 4 | 3 2 1 0 |
|---|---|---|---|---|---|
| Description | PROCESSOR FUNCTION | ALU FUNCTION | DESTINATION FIELD | SOURCE FIELD | SKIP, FLAG and MAP |

The micro-instruction decoder circuit 48 simultaneously decodes each of the five "micro-orders" in this first type of micro-instruction and enables the appropriate processor elements to perform one or more functions. The processor element identified by the destination code is not enabled, however, until the last 50 nanosecond portion of the 200 nanosecond execution time period. The codes which may be employed in the five micro-orders of a "type one" micro-instruction are as follows:

PROCESSOR FUNCTION MICRO-ORDER CODES

| Mnemonic | Bit Pattern | Description |
|---|---|---|
| ASG1 | 11010 | Enables decoding of alter/skip group 1 of macro-instruction. |
| ASG2 | 11011 | Enables decoding of alter/skip group 2 of macro-instruction. |
| CFLG | 01111 | Clear processor flag flip-flop 118. |
| COV | 01101 | Clear overflow flip-flop 116. |
| CYFL | 00111 | If processor flag flip-flop 118 is set, generate carry in to ALU 59. |
| DIV | 10000 | Divide 32-bit number in A and B registers by number in L register. |
| DMA | 01011 | Enables DMA cycle after execution of micro-instruction. |
| DWEL | 00100 | Causes 1 usec. freeze by disabling AND gate 86 on sequencer 47. |
| FLG | 11101 | Enables setting of processor flag bit. |
| FLGS | 11100 | Inverts condition of processor flag bit. |
| ICNT | 00010 | Increments the transfer counter 141 by one count. |
| IOFF | 00101 | Disables interrupt recognition except party errors and power fail interrupts. |
| IOG | 01010 | Initiates a 1 usec. I/O cycle. |
| L1 | 10100 | Performs a one-bit logical left shift on data leaving ALU. |
| L4 | 10111 | Performs a four-bit logical left shift on data leaving ALU. |
| MPY | 10001 | Multiplies number in A register by number in L register. |
| NOP | 00000 or 11111 | No operation is performed. |
| R1 | 10101 | Performs a one-bit logical right shift on data leaving ALU. |
| READ | 01000 | Loads address into main memory address register 36 and reads out data or macro-instruction into memory data register 35. |
| RPT | 00011 | Repeats next micro-instruction and increments transfer counter 141. |
| RSS | 11110 | Reverses sense of SKIP/FLAG micro-order. |
| SFLG | 01110 | Sets the processor flag flip-flop 118. |
| SOV | 01100 | Sets overflow flip-flop 116. |
| SRG1 | 11000 | Arithmetic or rotational shift of data leaving ALU as determined by bits 6 through 9 in the macro-instruction register 37. |
| SRG2 | 11001 | Similar to above, but controlled by bits 0, 1, 2 and 4 in the macro-instruction register 37. |
| WRTE | 01001 | Loads address into main memory address register 36 and writes contents of memory data register 35 into main memory 34. |

ALU FUNCTION MICRO-ORDER CODES

| Mnemonic | Bit Pattern | Description |
|---|---|---|
| ADD | 00100 | Adds the data on processor data bus 30 to contents of L register 57. |
| ADDO | 00101 | Same as ADD, but extend and overflow logic enabled. |
| AND | 01100 | Performs a logical "and" of the data on the processor bus 30 and the contents of L register 57. |
| ARS | 11010 | Used in combination with shift processor function codes to perform arithmetic shift of combined contents of A register 67 and B register 68. |
| CMPS | 01010 | Ones complement data on processor |

ALU FUNCTION MICRO-ORDER CODES

| Mnemonic | Bit Pattern | Description |
|---|---|---|
| CRS | 11001 | data bus 30. Used in combination with shift processor function codes to perform circular rotate shift of contents of A register 67 and B register 68. |
| DEC | 00110 | Decrement data on processor data bus 30 by one count. |
| INC | 00010 | Increment data on processor data bus 30 by one count. |
| INCO | 00001 | Increment data on processor data bus 30 by one count with extend and overflow logic enabled. |
| IOR | 01110 | Logical "or"of the data on processor data bus 30 and contents of L register 57. |
| LGS | 11000 | Logical left shift of combined A register 67 and B register 68 when combined with processor shift codes. |
| LWF | 10011 | Combined with proper processor shift codes, it performs rotational shift of data applied to shifter 63 and the flag bit. |
| NAND | 01101 | Performs a logical "nand"on the data on processor data bus 30 and contents of L register 57. |
| NOR | 01111 | Performs a logical "nor"of the data on processor data bus 30 and contents of L register 57. |
| ONES | 01011 | Passes all "ones"to the shifter 63. |
| PASS | 00000 | Passes the data unchanged. |
| RSB | 10010 | Loads contents of save register 120 into micro-program sequencer 47. |
| SUB | 00111 | Subtracts contents of L register 57 from data on processor data bus 30. |
| SWD | 11111 | Switch on the processor control panel specifies the destination field. |
| SWS | 11110 | Switch on the processor control panel specifies the source field. |
| XNOR | 00011 | Performs logical exclusive "nor"of the data on the processor data bus 30 and the contents of L register 57. |
| XOR | 01000 | Performs logical exclusive "or" of the data on the processor data bus 30 and the contents of L register 57. |
| ZERO | 01001 | ALU passes all zeros. |

DESTINATION FIELD MICRO-ORDER CODES

| Mnemonic | Bit Pattern | Description |
|---|---|---|
| A | 10100 | Stores data on ALU bus 65 in A register 67. |
| ABT | 10110 | A register 67, B register 68 or memory 34 depending on contents of memory address register 36. |
| B | 10101 | Stores data on ALU bus 65 in B register 68. |
| CAB | 10001 | A register 67 or B register 68 depending on bit 11 in macro-instruction register 37. |
| CNTR | 11110 | Stores lower eight bits on processor data bus 30 in transfer counter 141. |
| DSPL | 11010 | Stores data on processor data bus 30 in processor front panel display. |
| IOO | 10111 | Couples data on processor data bus 30 to I/O data bus 91. |
| IR | 11011 | Stores data on processor data bus 30 in macro-instruction register 37. |
| IRIO | 11001 | Stores lower six bits on processor data bus 30 in I/O address register 93. |
| L | 10000 | Stores data on processor data bus 30 in L register 57. |
| M | 10011 | Stores data on processor data bus 30 in memory address register 36. |
| NOP | 11111 | No store operation. |
| P | 00000 | Store data on ALU bus 65 in the P register of memory 69. |
| T | 10010 | Store data on processor data bus 30 in the memory data register 35. |
| R1-R15 | 00001 through 01111 | Store data on ALU bus 65 in one of the respective registers R1 through R15 of the memory 69. |

SOURCE FIELD MICRO-ORDER CODES

| Mnemonic | Bit Pattern | Description |
|---|---|---|
| A | 10100 | Couples data from A register 67 to the processor data bus 30. |
| ABT | 10110 | A register 67, B register 68 or memory 34 depending on contents of memory address register 36. |
| ADDR | 11001 | Couples low portion of macro-instruction register 37 and high portion of memory address register 36 to the processor data bus 30. |
| B | 10101 | Couples data from B register 68 to the processor data bus 30. |
| CAB | 10001 | Couples data from A register 67 to the processor data bus 30 if bit 11 in macro-instruction register 37 is 0; couples data from B register 68 to the processor data bus 30 if bit 11 is a one. |
| CIR | 11000 | Couples six-bit address from I/O interrupt bus 95a to the processor data bus 30. |
| DSPL | 11010 | Couples contents of processor front panel display register (not shown) to the processor data bus 30. |
| IOI | 10111 | Couples data from the I/O data bus 91 to the processor data bus 30. |
| IR | 11011 | Couples data in macro-instruction register 37 to the processor data bus 30. |
| LDR | 11101 | Couples data from resident communications program ROM 158 to processor data bus 30. |
| M | 10011 | Couples data in memory address register 36 to the processor data bus 30. |
| MASK | 11100 | Enables bit pointer circuit 40. |
| NOP | 11111 | Processor data bus 30 contains all ones. |
| P | 0000 | Couples contents of P register in memory 69 to the processor data bus 30. |
| R1-R15 | 00001 through 01111 | Couples data from respective registers R1 through R15 in the memory 69 to the processor data bus 30. |
| T | 10010 | Couples main memory data from register 35 to the processor data bus 30. |
| TIMR | 11110 | Couple output of real-time clock 145 to the processor data bus 30. |

SKIP MICRO-ORDER CODES

| Mnemonic | Bit Pattern | Description |
|---|---|---|
| ALO | 0010 | Skips the next micro-instruction if bit 0 at output of ALU 59 is one. |
| AL15 | 0011 | Skips the next micro-instruction if bit 15 at output of ALU 59 is a one. |
| ALZ | 0001 | Skips the next micro-instruction if output of ALU 59 is zero. |
| CNT4 | 1001 | Skips the next micro-instruction if the four least significant bits of the transfer counter 141 are all ones. |
| CNT8 | 1000 | Skips the next micro-instruction if all the bits of the transfer counter 141 are ones (i.e., count = 2047). |
| COUT | 0100 | Skips the next micro-instruction |

-continued

SKIP MICRO-ORDER CODES

| Mnemonic | Bit Pattern | Description |
|---|---|---|
| FLG | 1011 | if the ALU 59 produces a carry. Skips the next micro-instruction if the processor flag flip-flop 118 is set. |
| INTP | 1010 | Skips the next micro-instruction if an interrupt is pending. |
| NOP | 0000 | Do not skip the next micro-instruction. |
| ONES | 0101 | Skips the next micro-instruction if the ALU 59 outputs are all ones. |
| OVFL | 0110 | Skips the next micro-instruction if the processor overflow flip-flop 116 is set. |
| UNCD | 0111 | Skips the next micro-instruction unconditionally. |

FLAG MICRO-ORDER CODES

| Mnemonic | Bit Pattern | Description |
|---|---|---|
| ALO | 0010 | Set the processor flag flip-flop 118 if the least significant bit output of ALU 59 is a one. |
| AL15 | 0011 | Set the processor flag flip-flop 118 if the most significant bit output of ALU 59 is a one. |
| ALZ | 0001 | Set the processor flag flip-flop 118 if the outputs of the ALU 59 are all zero. |
| COUT | 0100 | Set the processor flag flip-flop 118 if the ALU 59 produces a carry. |
| ONES | 0101 | Set the processor flag flip-flop 118 if outputs of ALU 59 are all ones. |
| OVFL | 0110 | Set the processor flag flip-flop 118 if an overflow occurs. |
| UNCD | 0111 | Set the processor flag flip-flop 118 unconditionally. |

The FLAG micro-orders are enabled only when the FLG or FLGS processor function micro-order appears in the same micro-instruction. Absent the FLG or FLGS micro-order, the SKIP micro-orders are enabled.

MAPPING MICRO-ORDER CODES

| Mnemonic | Bit Pattern | Description |
|---|---|---|
| EOX | 1100 | Indicates that micro-routine is complete after execution of next micro-instruction and enables priority mapper prom 50. |
| EOXS | 1101 | Indicates that micro-routine is complete and enables priority mapper prom 50. |
| MAP | 1111 | Enables macro-decoder circuit 38 to call up micro-routine specified by macro-instruction in register 37. |
| MAPL | 1110 | Enables macro-decoder circuit 38 to call up micro-routine after indirect addressing is resolved. |

The second type of micro-instruction has the following format:

| Bit No. | 23 22 21 20 19 | 18 17 16 15 14 13 12 11 10 9 | 8 | 7 6 5 4 3 2 1 0 |
|---|---|---|---|---|
| Description | PROCESSOR FUNCTION | ALU FUNCTION   DESTINATION | MODIFIER | OPERAND |

The processor function micro-order coders and the destination micro-order codes are the same as those for "type one" micro-instructions which are listed above. There are only two ALU function micro-order codes and in addition to the functions which these two codes specify as described below, they serve to identify the micro-instruction as one having the type two format.

ALU FUNCTION MICRO-ORDER CODES

| Mnemonic | Bit Pattern | Description |
|---|---|---|
| IMM | 10100 | Places sixteen bits onto the processor data bus 30 consisting of the 1's complement of the eight-bit binary OPERAND and another eight bits of all ones. The ALU 59 performs a PASS operation. |
| IMMC | 10101 | Same as IMM except the ALU 59 performs a 1's complement of the data on the processor data bus 30. |

MODIFIER MICRO-ORDER CODES

| Mnemonic | Bit Pattern | Description |
|---|---|---|
| HIGH | 1 | Specifies that the 1's complement of the OPERAND is applied to the eight most significant bit leads of the processor data bus 30. |
| LOW | 0 | Specifies that the 1's complement of the OPERAND is applied to the eight least significant bit leads of the processor data bus 30. |

The OPERAND micro-order code is an eight-bit binary integer which specifies a decimal number from 0 to 255 or an octal number from 0 to 377.

The third type of micro-instruction has the following format:

| Bit No. | 23 22 21 20 19 | 18 17 16 15 14 13 12 | 11 10 9 8 7 6 5 4 3 2 1 0 |
|---|---|---|---|
| DESCRIPTION | PROCESSOR FUNCTION | ALU FUNCTION   MODIFIER | OPERAND |

The processor function micro-order codes are the same as those for "type one" micro-instructions which are listed above. There are only two ALU function micro-order codes and in addition to the functions which these two codes specify as described below, they serve to identify the micro-instruction as one having the type three format.

ALU FUNCTION MICRO-ORDER CODES

| Mnemonic | Bit Pattern | Description |
|---|---|---|
| JMP | 10110 | Jump unconditionally to the micro-instruction address specified in the OPERAND. |
| JSB | 10111 | Jump unconditionally to the micro-instruction address specified in the OPERAND and store the return address in the save register 120. |

MODIFIER MICRO-ORDER CODES

| Mnemonic | Bit Pattern | Description |
|---|---|---|
| J30 | 01 | Replaces the four least significant bits of the OPERAND with the four least significant bits in the macro-instruction register |

-continued

| MODIFIER MICRO-ORDER CODES | | |
|---|---|---|
| Mnemonic | Bit Pattern | Description |
| J74 | 10 | 37. Replaces the four least significant bits of the OPERAND with bits 4–7 in the macro-instruction register 37. |
| NOP | 11 | No modification of the OPERAND |

The OPERAND micro-order code in a type three micro-instruction is a 12-bit address which is coupled through the multiplexer 122 to the micro-program sequencer 47.

The above-defined micro-instructions are combined to form micro-routines which are stored in the micro-program read-only memory 32. These micro-routines are in turn employed to execute macro-instructions which are stored in the main memory 34. The macro-instructions are combined to form programs, or routines, which when executed, perform the various numerical control functions and operate the discrete digital devices associated with the machine tool. Before a more detailed description is made of the manner in which macro-instructions are executed by selected micro-routines, a general description of the software system of the industrial control processor 13 will be made in order to acquaint the reader with the objectives which are to be accomplished and the general manner in which the system operates to accomplish these objectives.

The operation of the industrial control processor 13 is determined by the software routines stored in its main memory 34 which together form the software system. The software system is comprised of four main categories: background routines; 10-millisecond timed interrupt control routine; tape reader service routine; and keyboard service routine.

Figure 9:
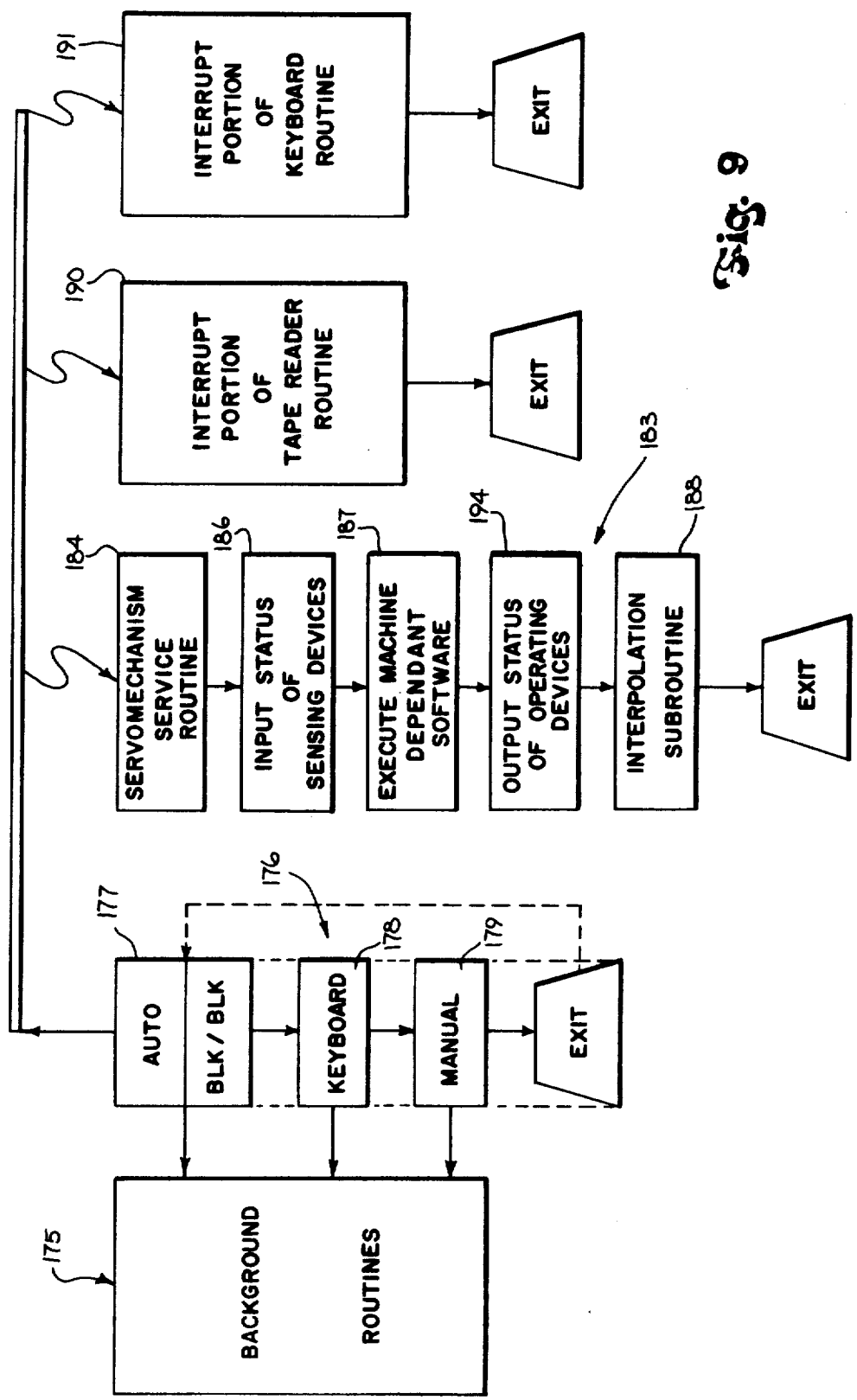
FIG. 9 is a flow chart of a system program which may be stored in the numerical control processor memory.
Figure 10:
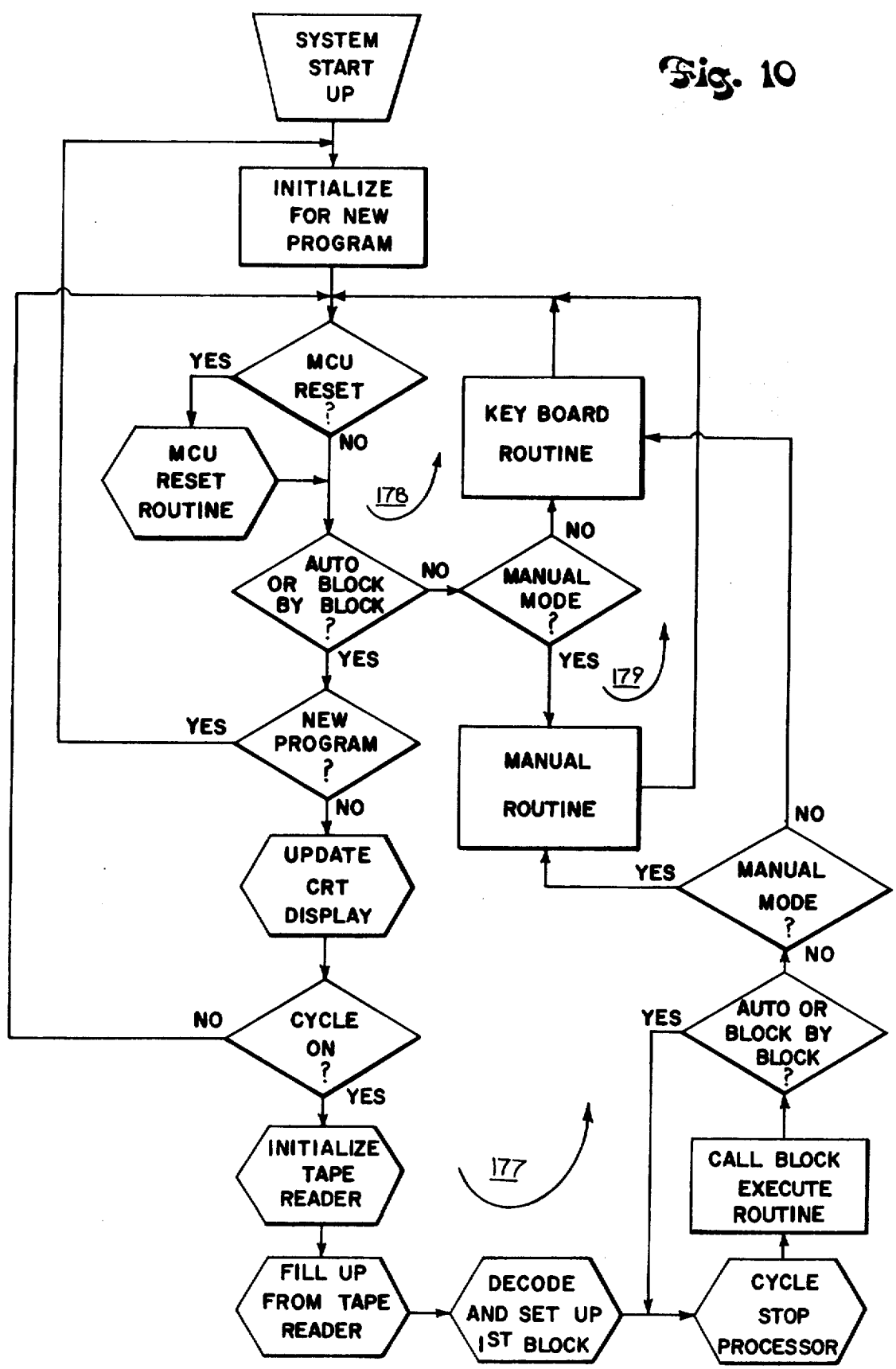
FIG. 10 is a flow chart of the main controller routine which forms part of the software system of FIG. 9.

Referring to FIG. 9, the background routines 175 consist of such basic numerical control routines as setup, decode, noninterrupt portion of the keyboard and tape reader routines, display update subroutine, ASCII-to-octal and octal-to-ASCII converters, math and support routines, jog, keyboard servicing, tool and fixture offset, cutter compensation, and part program editing. The background routines also include those associated with the programmable controller aspects of the system, such as machine dependent software loader and editor, hardcopy output, punch output and I/O monitor. Most of these background routines are selectively called up by a main control, or executive, routine 176 which is comprised of three program loops 177–179. The three loops 177–179 are selected by the mode switches on the main control panel 10; the first loop 177 responding to the selection of the automatic or block-by-block modes; the second loop 178 responding to the keyboard mode; and the third loop 179 responding to the manual mode. A detailed flow chart of the main control routine 176 is shown in FIG. 10.

Figure 11A:
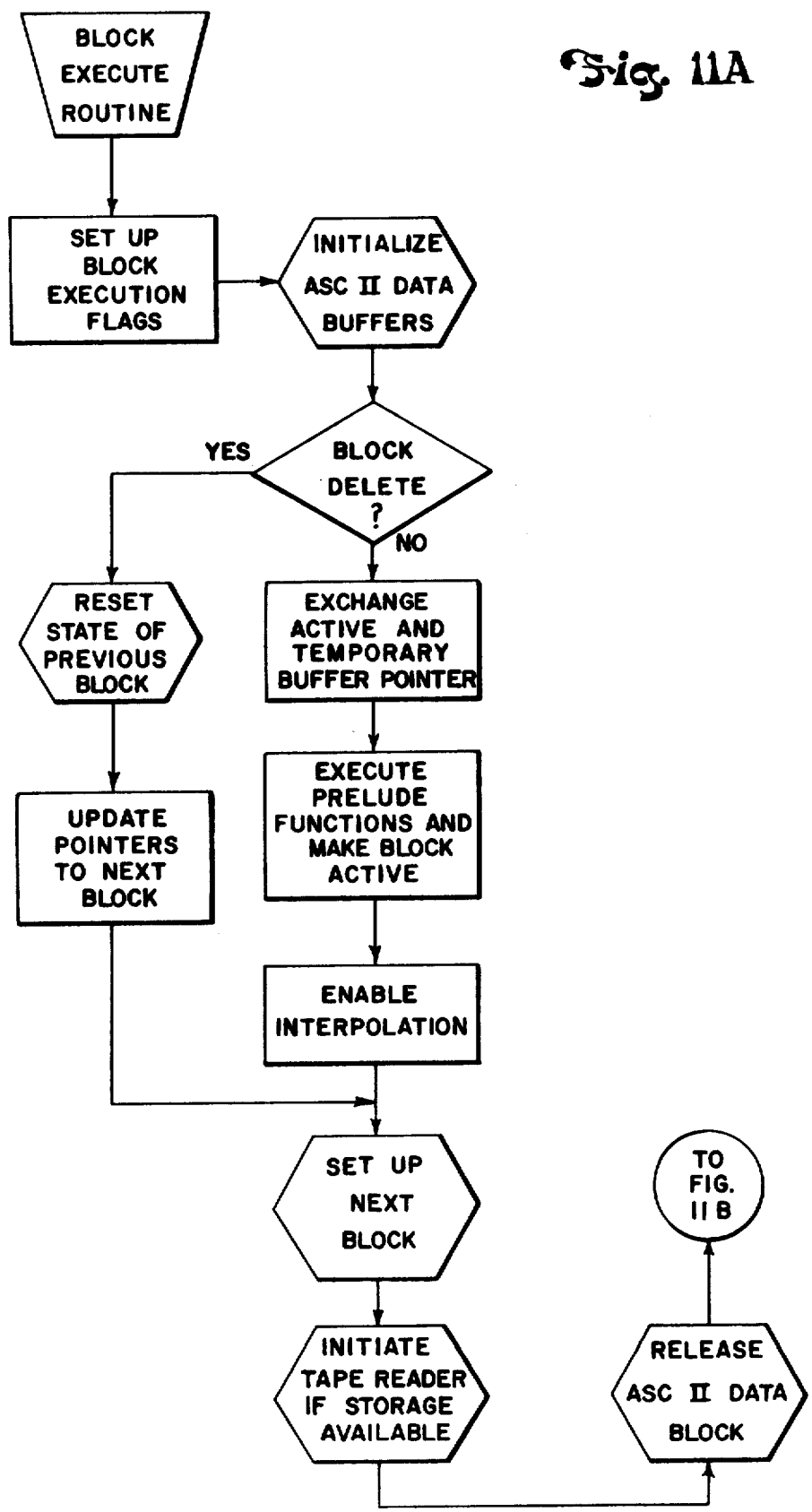
FIGS. 11a and 11b is a flow chart of the block execute routine which forms part of the software system of FIG. 9.
Figure 11B:
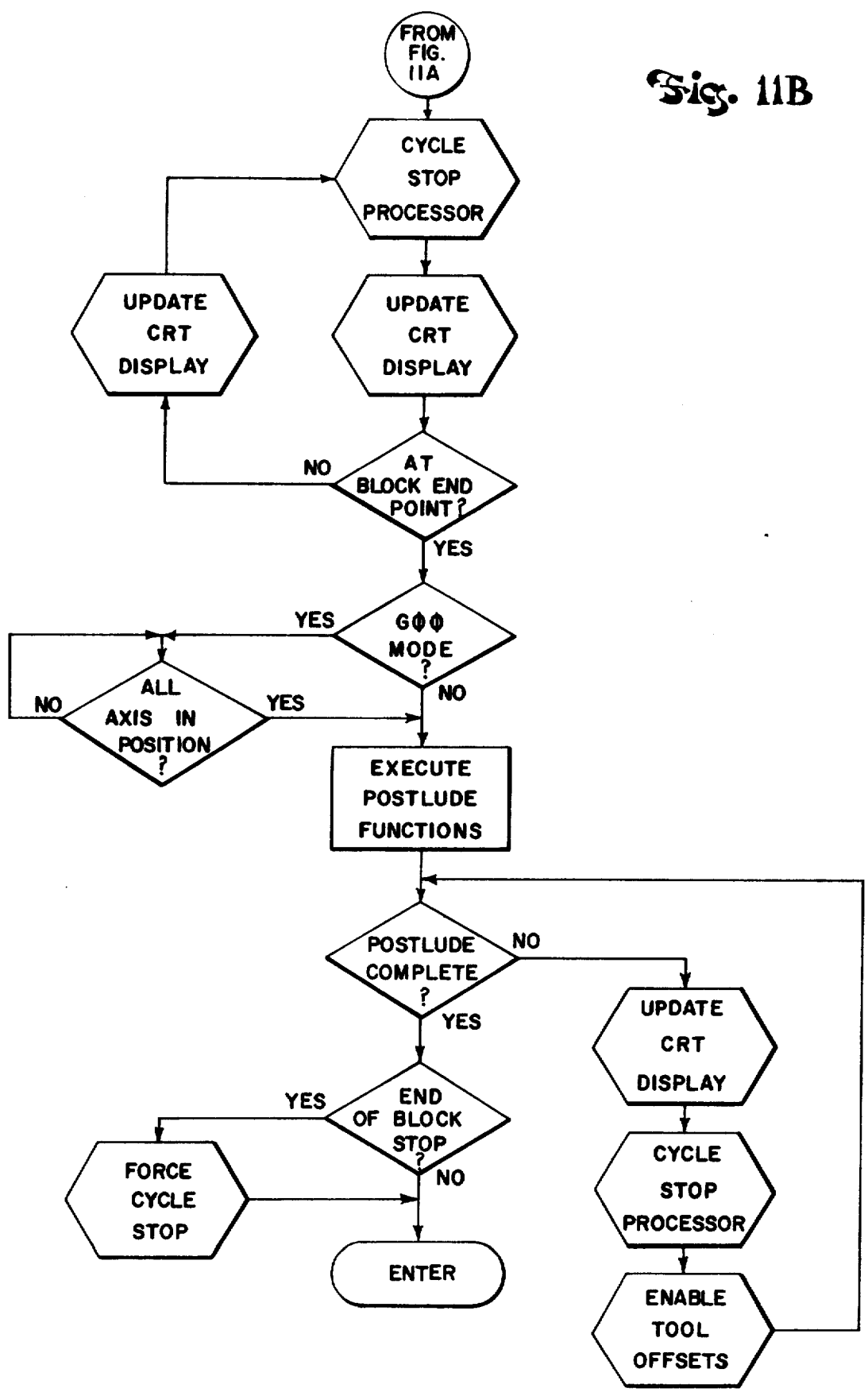

The automatic and block-by-block modes of operation are performed by a common loop 177 which calls up selected background routines 175. These routines initialize the tape reader 5, read in the block of part program data, decode it and set it up. The routine 177 then calls up a block execute routine which performs the actual execution of the block of part program data. As shown in the detailed flow chart of FIGS. 11a and 11b, the block execute routine is divided into a pre-block, or prelude, portion, an interpolation portion and a post-block, or postlude, portion. During the prelude portion selected system flags are set to indicate that certain functions such as turn on spindle, coolants, etc., are to be performed. These flags are stored in selected memory locations in a system flag table 182 in the main memory 34. Similarly, during the postlude portion of the block execute routine flags are set in the table 182 to indicate that certain functions such as tool changes, shuttles, turning off coolants and spindle, etc., are to be performed by the machine dependent discrete devices. The flag table 182 interfaces the numerical control functions of the system with the programmable controller functions of the system.

The second loop 178 of the main control routine 176 is entered when the keyboard enable pushbutton on the main control panel 10 is pushed. This mode is employed, for example, to perform such functions as part program editing of the machine dependent software routine. The third loop 179 of the main control routine 176 is entered when the front panel selector switch is set to manual. The manual routine contains all of the operator functions such as jog, tape controls, and set zero which are each performed by respective routines that are selectively called up. The main control routine 176 thus manages all of the background functions of the system which serve to prepare the industrial control processor 13 to provide data to the servo mechanisms on the machine tool and to indicate to the associated discrete digital devices the auxiliary functions that are to be performed.

The remaining portions of the software system interrupt the main control routine 176 to service the I/O interface racks 20 and 21 and the system I/O devices. A ten millisecond timed interrupt routine 183 performs the actual transfer of data from the industrial control processor 13 to the machine servo mechanisms and the discrete digital devices on the controlled machine. This routine is indicated generally in FIG. 9 and it is executed to the finish every 10.24 milliseconds following an interrupt posted by the timed interrupt circuit 162. As indicated above, an interrupt service micro-routine loads the starting memory address of the ten millisecond timed interrupt routine 183 in the P register (program counter) of the memory 69 and it is then executed to the finish.

Figure 12A:
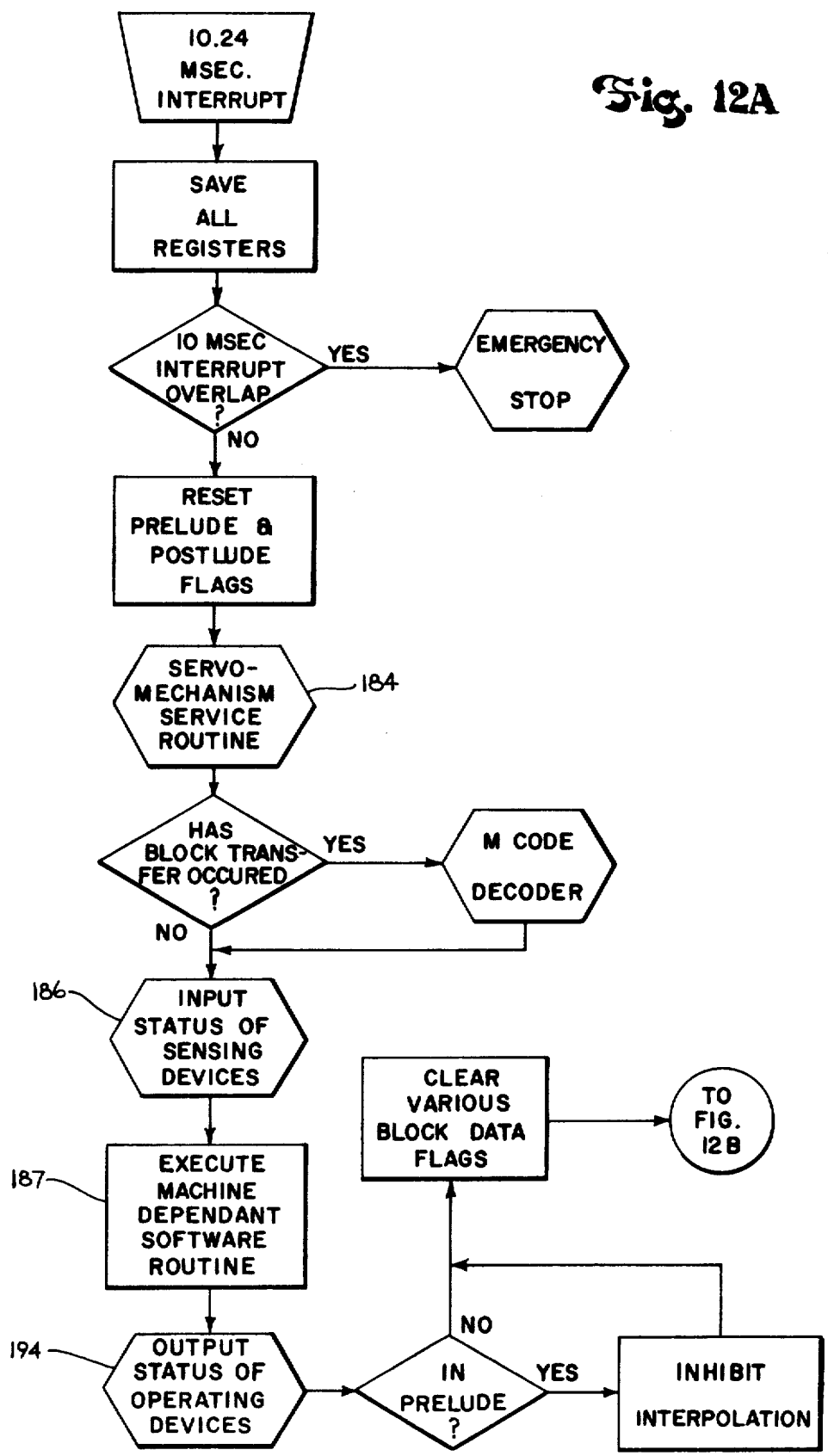
FIGS. 12a and 12b is a flow chart of the ten millisecond timed interrupt routine which forms part of the software system of FIG. 9.
Figure 12B:
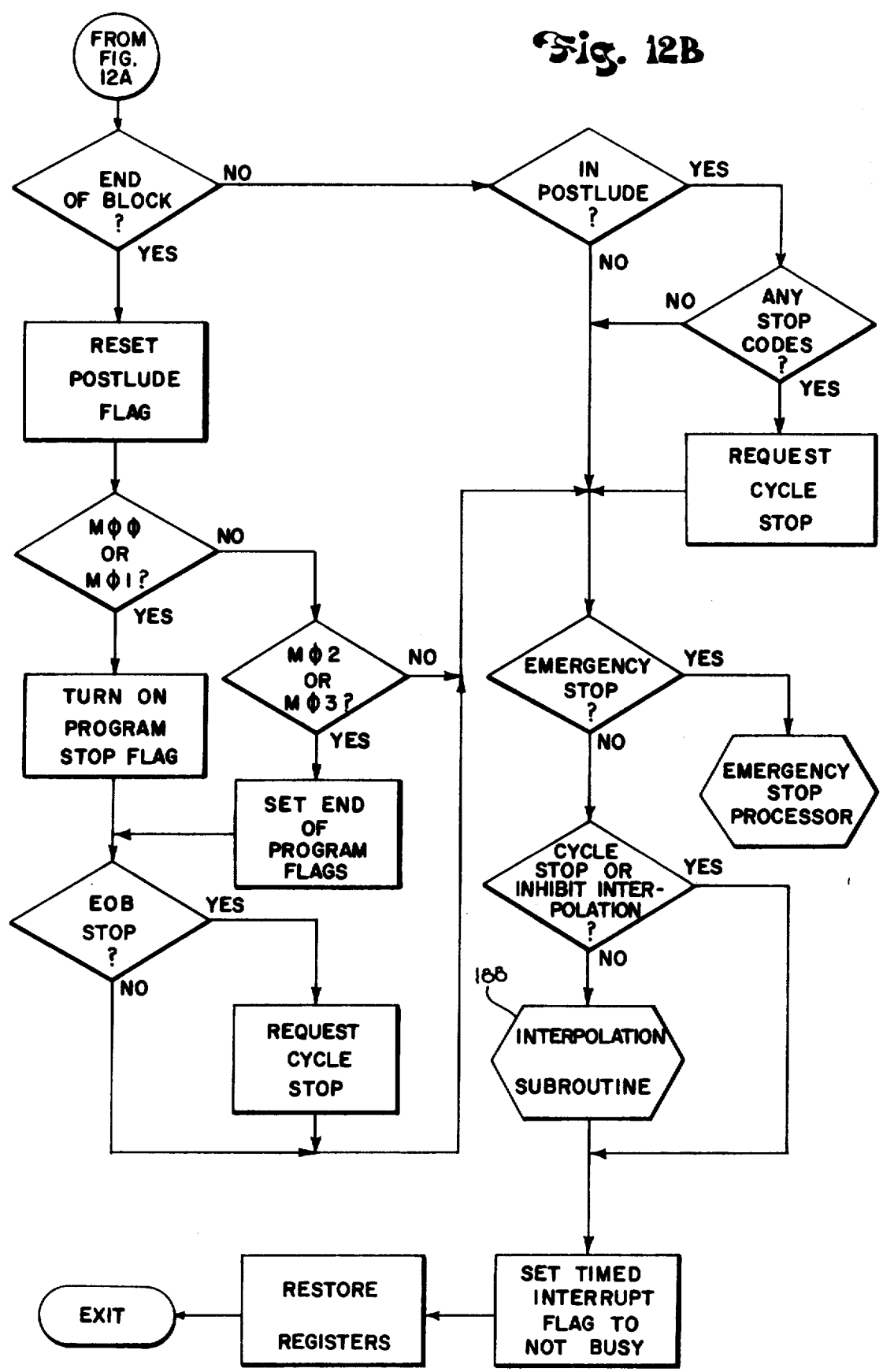

Referring to FIG. 9 and the detailed flow chart of the 10 millisecond timed interrupt routine in FIGS. 12a and 12b, after various housekeeping functions are performed, position feedback data and position command data is coupled between the I/O interface rack 20 and the industrial control processor 13 by a servo mechanism service routine 184. For a three-axis machine, for example, the x, y and z axis position feedback accumulators are connected to slots 0–2 of the first I/O interface rack 20 and servo mechanism command registers are connected to slots 3–5. The routine 184 sequentially couples the three sixteen-bit feedback words to corresponding lines in the read/write memory 34 and the three 16-bit command words previously calculated and stored at three memory locations in the main memory 34 are coupled to slots 3–5 of I/O interface rack 20.

The status of all sensing devices connected to the I/O interface racks 20 and 21 are then coupled to the main memory 34 by an input status routine 186. The routine 186 sequentially couples the sixteen bits of status data from slots in the I/O interface racks 20 and 21 to an associated line in the main memory 34. A portion of the main memory 34, hereinafter called the I/O image table 185, is dedicated to storing this status data as well as the data which is to be outputted to the I/O interface racks 20 and 21.

A machine dependent software routine 187 is executed next to determine the state to which all operating devices connected to the I/O interface racks 20 and 21 are to be driven. The machine dependent software routine 187 is comprised of programmable controller instructions which are executed in sequence to solve Boolean expressions and thereby determine the state of operating devices. In making these determinations the status of selected bits in the I/O image table 185 and the system flag table 182 are examined to ascertain a picture of the current state of both the numerical control system process and the machine dependent devices connected to the system. The determined states are stored in the I/O image table 185, and after the routine 187 is executed, these states are coupled to the output circuits in the I/O interface racks which drive the associated operating devices by an output status routine 194. The routine 195 couples sixteen-bit status words from the main memory 34 to their associated I/O interface rack and slot.

If a block of part program data has been set up and the prelude functions completed, an interpolation subroutine 188 is executed to calculate position command data for the machine servo mechanisms. These calculated position command words control the servo mechanisms for a 10.24 millisecond time period and are outputted by the servo mechanism service routine 184 during the subsequent ten-millisecond interrupt. The timed interrupt routine 183 is exited back to the main control routine 176.

Referring again to FIG. 9, a third category of routines which comprise the software system is the tape reader routine which is divided into two portions; the interrupt portion 190 and the background portion. The tape reader routine is called by the main controller routine 176 which employs the background portion of the tape reader routine to perform the initialization functions. After initialization by the background portion, a tape reader interrupt will then occur whenever a new tape character is positioned under the read head of the tape reader 5 and the interrupt portion of the tape reader routine 190 is executed. This routine reads the tape character and stores it in a selected data buffer in the main memory 34. It also sets flags in the system table 182 when the end of block character is read or when the block limit is exceeded.

A fourth category of routines which comprise the software system is the keyboard and CRT routine. This includes an interrupt portion 191 which is entered each time a key is depressed on the keyboard 7. Background portions of the keyboard and CRT routine interpret the received ASCII characters as data which is stored in the main memory 34 or as codes which call for the execution of specific subroutines.

The above described software forms no part of the present invention, but instead, the description illustrates the nature of the system software, machine dependent software, tables and storage areas which reside in a computerbased numerical control system (CNC). These elements, which are referred to collectively herein as a system program, or system software package, determine the functions which the numerical control system can perform. As is known to those skilled in the art, such system software packages vary considerably in content and structure depending on the type of machine tool the numerical control system is to operate, the types of parts to be run on the machine, and the types of optional features to be included. For examples, the machine tool may perform drilling operations or punching operations which require only point-to-point control rather than contouring. The system software would not include interpolation capability and more space in the numerical control system memory would be made available for part program storage. The contrary is the case where full contouring is required with linear, circular and perhaps even spline interpolation present.

The present invention enables the entire resident software system in the numerical control system memory to be changed by downloading a different software system package from the bulk storage device 507. Such a change may be required, for example, because a different type of part is to be machined which requires different interpolation capability or special "canned cycles" for efficient production. Also, the ability to download an entire system software package enhances the reliability of CNC systems which employ destructable memories. That is, rather than providing expensive and bulky battery backup systems for maintaining power to the system memory during power outages, the system software package may be downloaded by the present invention from a non-destructable memory after power is restored.

Downloading is initiated by depressing a pushbutton 510 located on the secondary control panel 12 of the numerical control system 1. Referring to FIGS. 4 and 7, the logic high voltage thus generated is coupled through the control panel interface 126 to lead number fifteen of the priority encoder 127. As a result, the priority encoder 127 generates a five-bit binary code to the priority mapper prom 50 which addresses the BBL micro-routine stored in the micro-program read-only memory 32.

The BBL micro-routine is then executed to load a communications program into the top of the main memory 34, load the starting address of the communications program into the program register (P), and then execute a macro-instruction fetch to begin execution of that program. The BBL micro-routine is as follows:

| Label | Proc. Function | ALU Function | Dest. Field | Source Field or Mod. & Operand | Comments |
|---|---|---|---|---|---|
| BBL | | ZERO | R1 | | Load Zeros in R1. |
| LOAD R | | IMM | R9 | HIGH 200B | Initialize R9 to maximum possible memory address. |
| | DMA | IMMC | R8 | HIGH 020B | Initialize R8 to 010000B. |
| LOAD 1 | | IMM | L | LOW 077B | Load mask (177700B) into L register. |
| | | AND | P | R9 | Load maximum memory address into P register. |
| | DMA | CMPS | R10 | P | Form 2's complement |
| | | INC | R10 | R10 | of memory address |

-continued

| Label | Proc. Function | ALU Function | Dest. Field | Source Field or Mod. & Operand | Comments |
|---|---|---|---|---|---|
| | WRTE | INC | | R9 | and store in R10. Write contents of |
| | | PASS | T | R10 | R10 into memory location indicated by R9 and increment R9. |
| | DMA | PASS | L | R8 | Store contents of R8 in latch L. |
| | READ | INC | | R9 | Read contents of |
| | | SUB | R9 | R9 | location written into |
| | | PASS | L | R10 | to determine if memory is present. |
| | | XOR | | T ALZ | Is memory present? |
| | | JMP | | LOAD 1 | No, loop back and try with maximum memory address reduced by 4K. |
| | | PASS | R9 | P | Yes, save maximum memory address in R9. |
| | DMA | IMM | CNTR | LOW 377B | Clear transfer counter. |
| LOAD 2 | L4 | PASS | R8 | LDR | Read out contents of addressed line in ROM 158, shift left four places and store in R8. |
| | ICNT | PASS | L | R8 | Increment transfer counter and store contents of R8 in latch L. |
| | L4 | AND | R8 | LDR | Read out contents of addressed line in ROM 158, AND with contents of L, shift result left four places and store in R8. |
| | ICNT | PASS | L | R8 | Increment transfer counter and store contents of R8 in latch L. |
| | L4 | AND | R8 | LDR | Read out contents of addressed line in ROM 158, AND with contents of L, shift result left four places and store in R8. |
| | ICNT | PASS | L | R8 | Increment transfer counter and store contents of R8 in latch L. |
| | DMA | AND | R8 | LDR | Read out contents of addressed line in ROM 158, AND with contents of L and store in R8. |
| | WRTE | INC | R9 | R9 | Write 16-bit word in |
| | | PASS | T | R8 CNT8 | R8 into memory 34 at location indicated by R9, increment R9 and check to see if transfer counter is all ones. |
| | ICNT | JMP | | LOAD 2 | No, loop back to transfer next 16-bit word to memory 34. |
| | | CMPS | A | P EOX | YES, put starting |
| | | INC | A | A | address of resident communications program in A register and jump to first instruction therein. |

The BBL micro-program operates first to determine the size of the memory 34. It performs this function by writing into the maximum possible memory address (i.e., the maximum memory address when the largest possible memory is employed in the system) and then reading data out of the memory location. If the data differs no memory is present at that address and the same procedure is carried out with an address which is 4K less.

When the memory size is determined the BBL micro-program sequentially transfers the instructions of the resident communications program from the ROM 58 to the top of the memory 34. The 16-bit instructions are stored as 4-bit bytes which are read out in sequence into the register R8. The reconstructed 16-bit instruction is then transferred to the memory 34 at the address indicated in the register R9. When the transfer counter 141 counts out (i.e., all one's) the starting address of the resident communications program is stored in the P and A registers and the micro-routine is completed. The system then fetches and executes the first macro-instruction in the resident communications program.

Figure 8A:
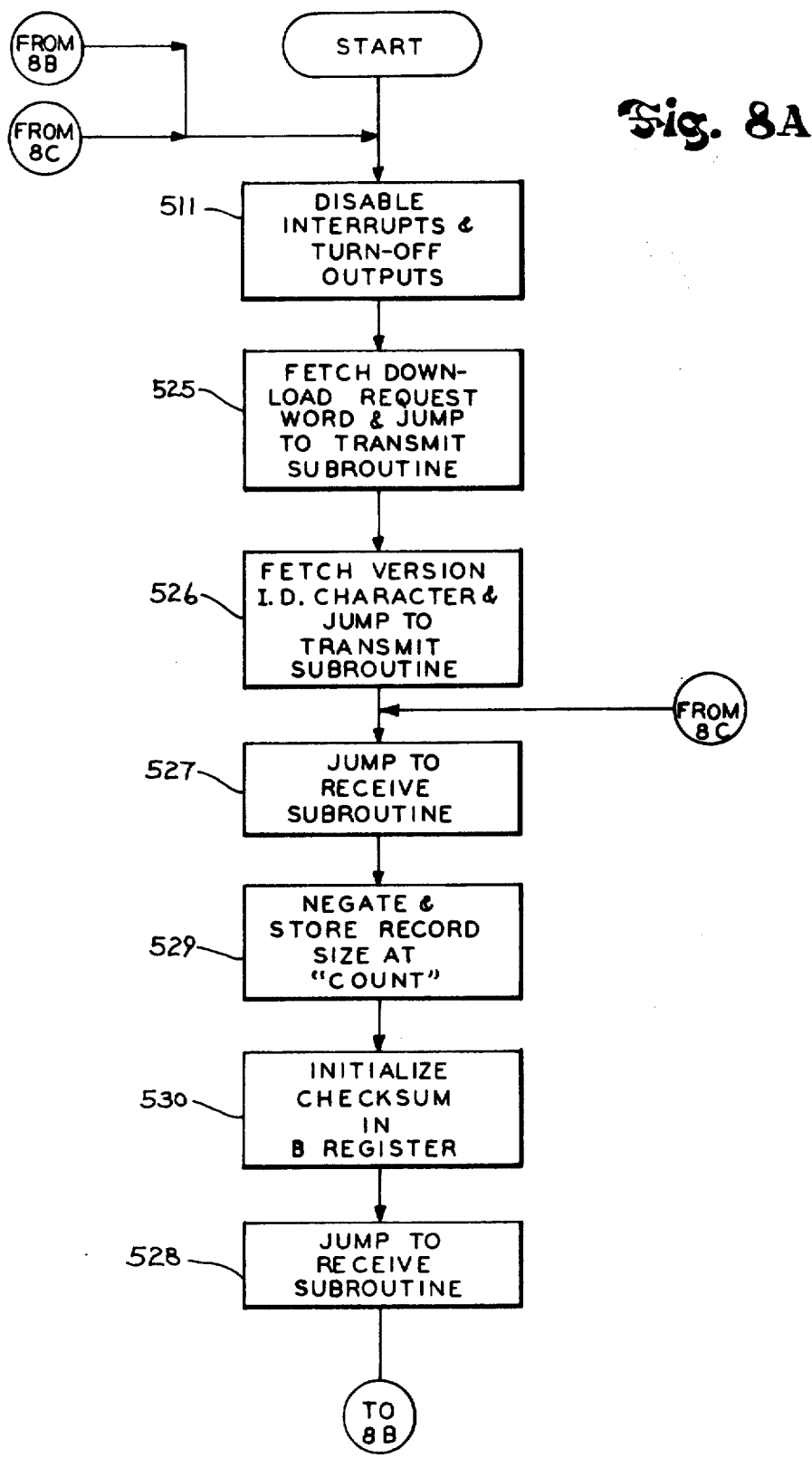
FIGS. 8a–c are a flow chart of the resident communications program which forms part of the industrial control processor of FIG. 4.

The resident communications program is stored on the top 128 lines of the main memory 34. Referring to FIG. 8a, when executed this resident communications program first disables all interrupts and turns off all output devices as indicated by process block 511. As indicated by process blocks 525 and 526 a download request word (octal 20) is then fetched from a location in the memory 34 and is transmitted to the host computer 500 along with a version character. This data is interpreted as a download command by the host computer 500. The octal 20 identifies a communications program, COMPAC, and the version character distinguishes the various versions of this program which may reside in the host computer library.

As will be described in more detail hereinafter, the host computer 500 reads COMPAC out of the disc memory 507 and divides it into a series of records, each of which record is comprised of a predetermined number of words which are downloaded to the numerical control system 1 via the UAR/Ts 502 and 8. The host computer 500 first downloads a record size number, a record load address number, a series of ASCII characters and then a checksum number. As shown in FIG. 8, the resident communications program jumps to a RECEIVE subroutine as indicated by process blocks 527 and 528 to input this data. The record size number is stored at memory location "COUNT" after being negated as indicated by process block 529, the B register is initialized as indicated by process block 530 and the record load address is stored in the memory 34 at "ADDR."

Figure 8B:
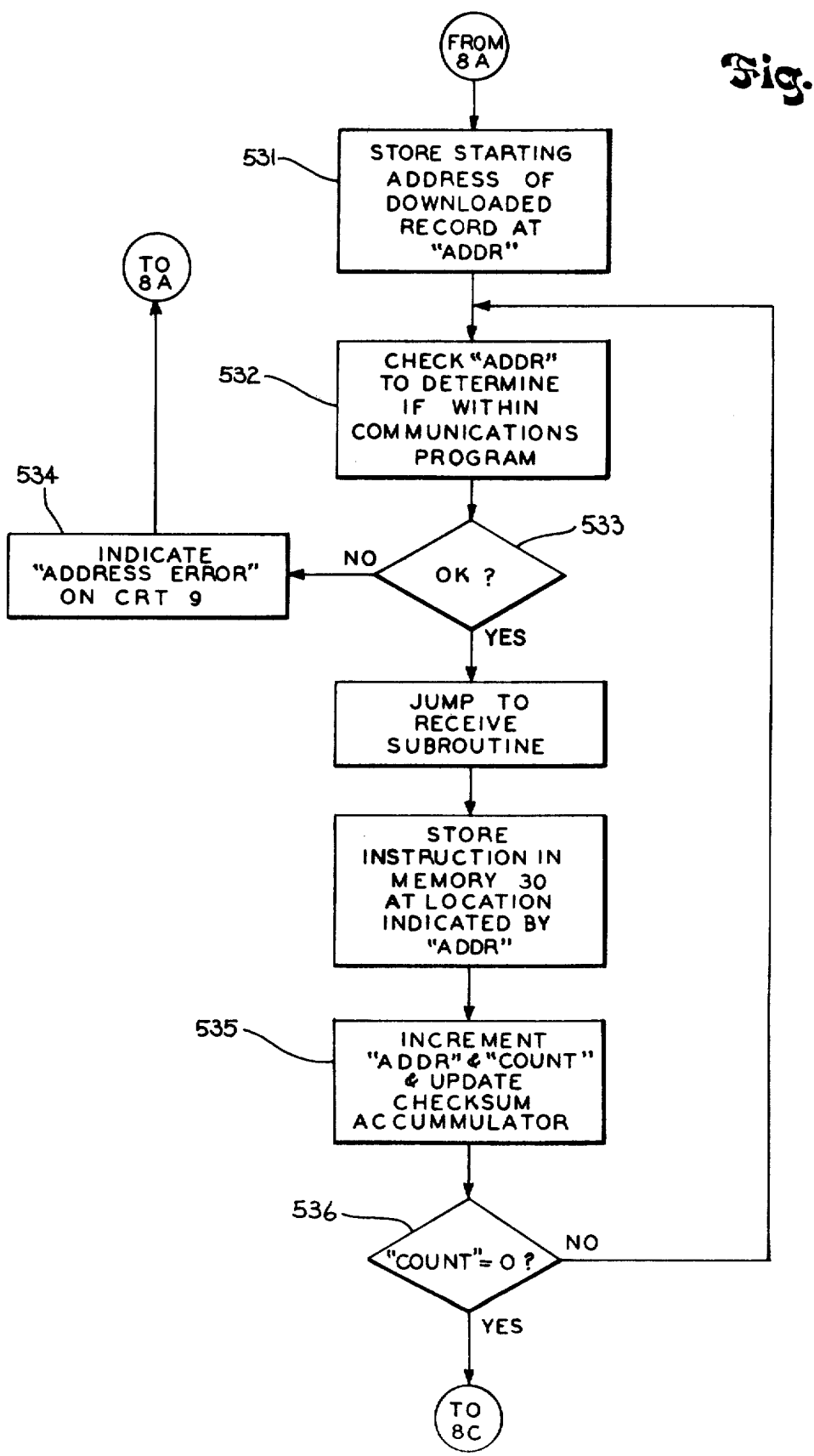

Referring particularly to FIG. 8b, a loop is then established in the program during which a record comprised of the number of words indicated by COUNT is downloaded and stored in the memory 34 at the location indicated by ADDR. A check is first made to insure that the downloaded record will not destroy any part of the resident communications program as indicated by process blocks 531 and 532 and the decision block 533. If a program is detected the message "ADDRESS ERROR" is displayed on the CRT 9 as indicated by process block 534 and the program loops back to START to begin the entire download procedure again. If everything is in order, the system remains in the loop to sequentially download words until the entire record has been received and stored. The contents of "ADDR," "COUNT" and the checksum accumulator (B register) are adjusted accordingly as each word is received and stored as indicated by process block 535, and when COUNT reaches zero as indicated by decision block 536, the loop is exited.

Figure 8C:
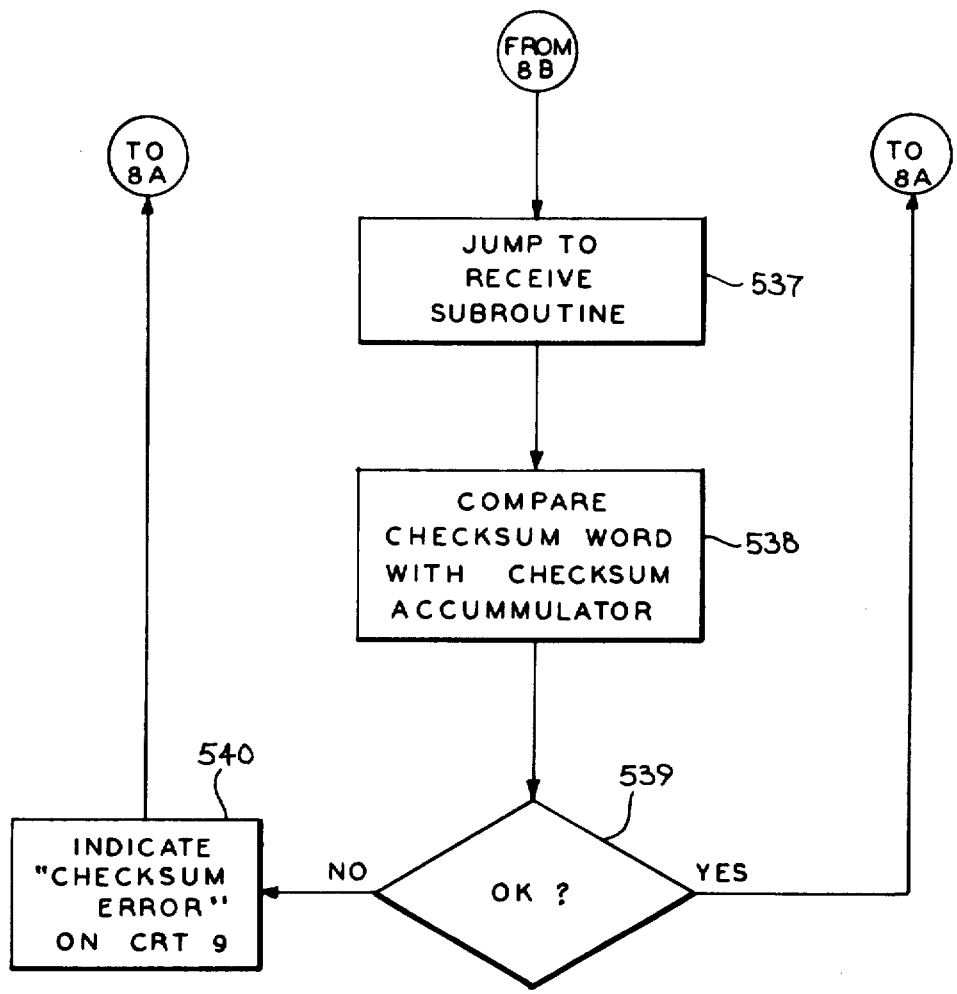

Referring particularly to FIG. 8c, after an entire record has been downloaded a checksum word is downloaded and compared with the checksum accumulator as indicated by process blocks 537 and 538 and decision block 539. If an error in the number of words downloaded has occurred, the message "CHECKSUM ERROR" is displayed on CRT 9 as indicated by process block 540 and the system loops back to START. Otherwise, the system loops back to process block 527 (FIG. 8a) to commence downloading the next record. The system continues downloading records comprised of fixed numbers of words until the end of transmission code (ETX) is received. This is detected in the BYTE subroutine which forms part of the RECEIVE subroutine, and when it occurs, the system jumps to the first instruction in the downloaded program.

The listing of the resident communications program along with the RECEIVE and BYTE subroutines appear in APPENDIX A. A definition of the instruction set appears in "Instruction Manual 7320/40/60" published in 1977 by the Allen-Bradley Company.

An examination of the resident communications program listing reveals that it is relatively short and thus of limited capability. This is done in the preferred embodiment to minimize the amount of space required within the numerical control system ROM 158 for permanent storage of the resident communications program. It can be appreciated, however, that where space permits, communications programs of greater capability may be stored at the numerical control system and loaded by the BBL micro-routine.

Figure 15:
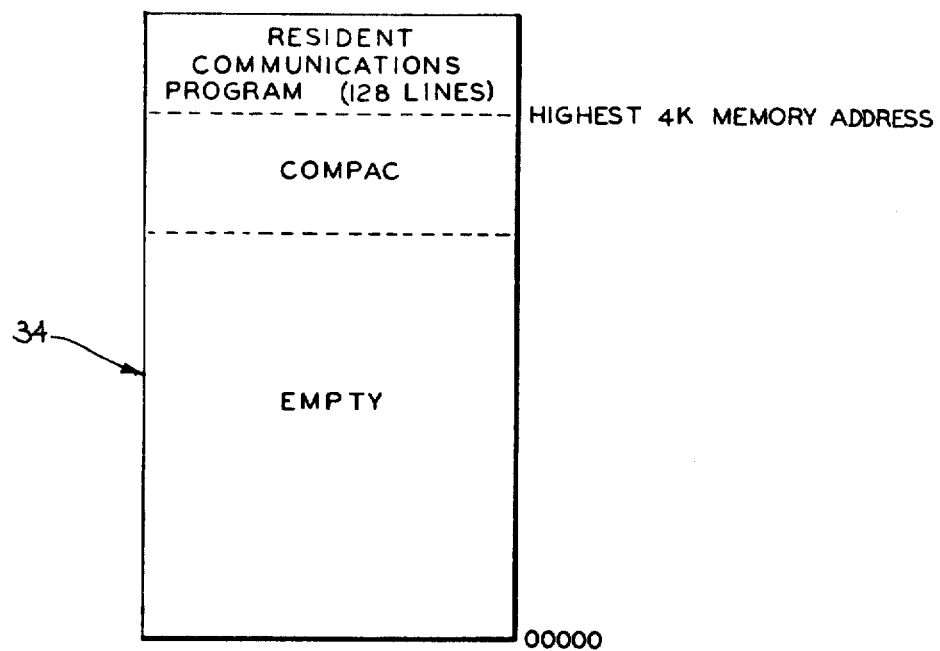
FIG. 15 is a representation of the contents of the numerical control system memory at one stage of the download procedure.

The program downloaded by the resident communications program described above is a more powerful communications program referred to hereinafter as COMPAC. Whereas the resident communications program merely downloads a program and indicates any transmission errors which might occur, COMPAC enables the operator at the numerical control system 1 to interractively communicate with the host computer 500 through the numerical control system keyboard 7 and CRT 9. In this manner the operator is able to identify the particular program which is to be downloaded and stored in the main memory 34. As shown in FIG. 15, at this juncture in the download procedure the main numerical control system memory 34 contains the resident communications program and COMPAC. The remainder of the memory 34 is empty.

Figure 13A:
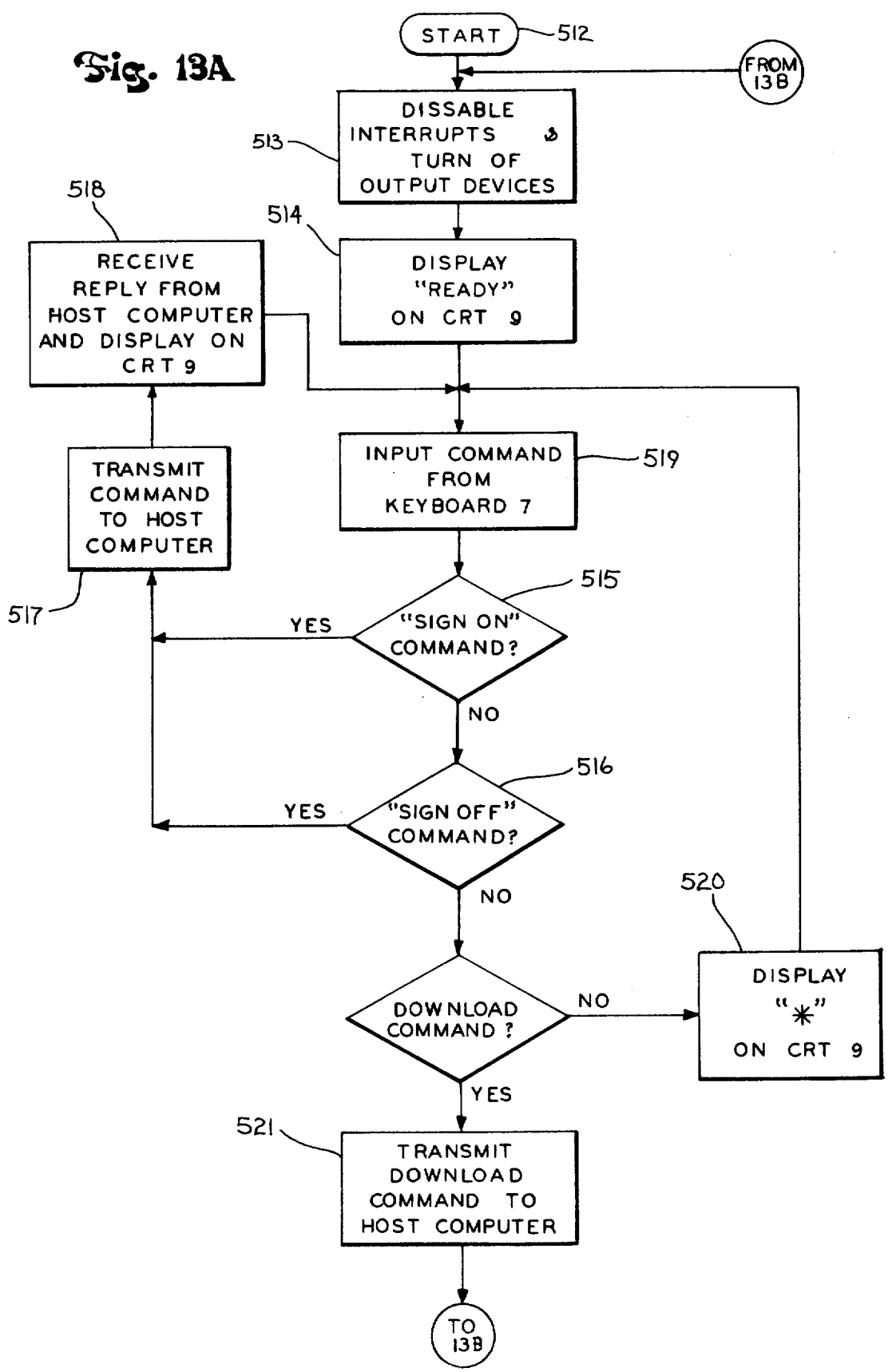
FIGS. 13a and 13b is a flow chart of a program called COMPAC which is stored in the download library.
Figure 13B:
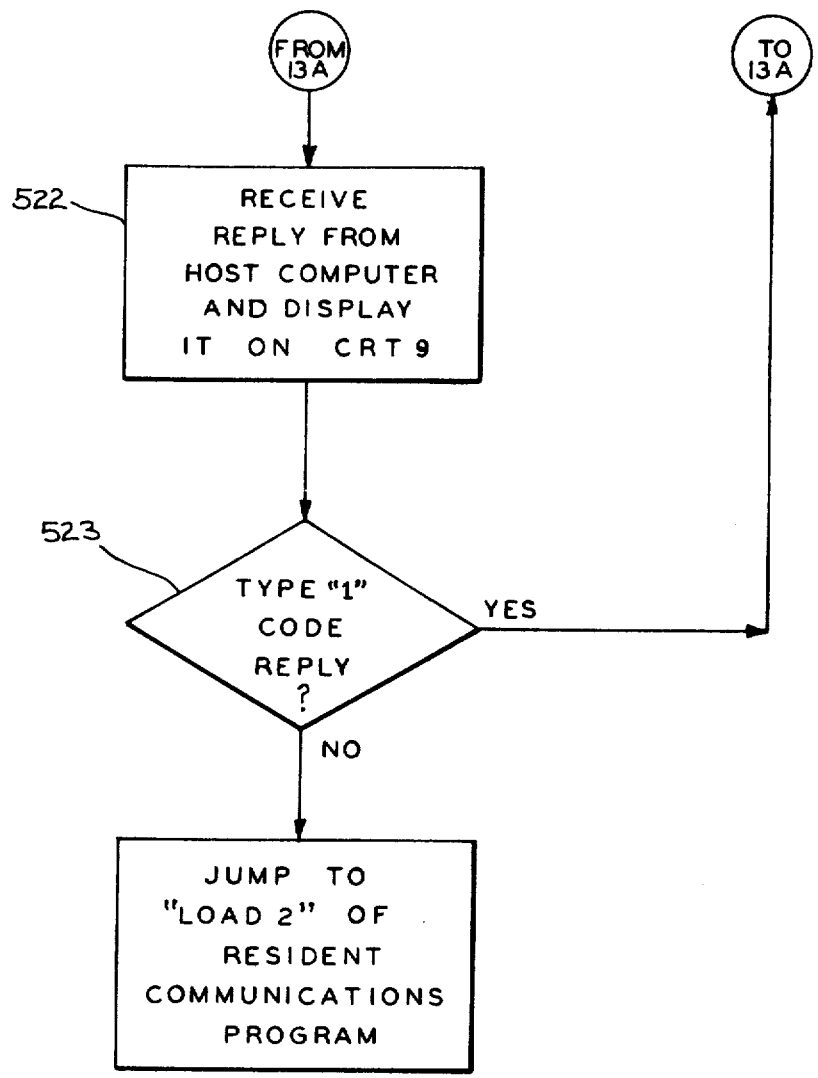

Referring to FIGS. 13a and 13b COMPAC is entered from the resident communications program at the point 512 when the "ETX" character is received at the UAR/T 8. This indicates that the entire COMPAC program has been downloaded (see BYTE SUBROUTINE — APPENDIX A) and that it can now be executed. As indicated by process block 513 interrupts are disabled and all operating devices connected to interface racks 20 and 21 are deenergized. The word "READY" is then displayed on the CRT 9 as indicated by process block 514 and the system waits for the operator to enter a command through the keyboard 7. The only valid commands at this point are sign-on, sign-off and download. If either the sign-on or sign-off command is entered the system branches at decision blocks 515 and 516 and the command is transmitted via the UAR/T 8 to the host computer 500 as indicated by process block 517. The reply from the host computer 500 is then received and displayed on the CRT 9 as indicated by process block 518 and the system loops back to process block 519 to await a further command from the operator. If an invalid command is entered by the operator an asterisk is displayed on the CRT 9 as indicated by the process block 520.

When a proper download command is entered the code is transmitted to the host computer 500 as indicated by process block 521. The reply from the host computer 500 is received and displayed on the CRT 9 as indicated by process block 522 and the reply is then analyzed as indicated by decision block 523 to determine whether it is a type "1" or type "2." If a type "1" reply is received a problem has been detected by the host computer 500 and the system loops back to start. Otherwise, it jumps to the resident communications program to commence the download sequence. The actual downloading is thus performed by the resident communications program in the manner described above. The downloaded executive program is written over the COMPAC program since in most instances the downloaded executive system will include its own sophisticated communications programs.

It should be apparent from the above description that COMPAC enables the keyboard 7 and CRT 9 so that the operator may enter commands and transmit them to the host computer 500. A sign-on command (SN,X) indicates to the host computer that a new user has logged in. The X is a 6-character identification number, or password, which may be associated with specific access privileges. The host computer 500 responds with a message such as PASSWORD NOT FOUND which is displayed on the CRT 9 if a mistake is made in the 6-character identification number. Otherwise, a blank is transmitted to the numerical control system by the host computer 500. A sign-off command (SF) notifies the host computer 500 that the current user has logged out.

A blank is sent back by the host computer 500 as an acknowledgement.

A download command is entered through the keyboard 7 and has the following format:

CT, ST, TX, file name, type of file (A, T or X)

where:

CT indicates to the numerical control system that data is to be transmitted to the host computer 500;

ST indicates to the host computer that a task is to be started;

TX indicates that the task to be performed is a download;

file name identifies the name of the program to be downloaded; and file type indicates the file to be downloaded, A = application, or part program, T = testing or diagnostic program, X = system software package.

COMPAC does not recognize any commands other than these three even though the host computer 500 is programmed to carry out a large number of other tasks. A complete listing of COMPAC is provided in APPENDIX B using the same instruction set as the resident communications program.

Figure 16:
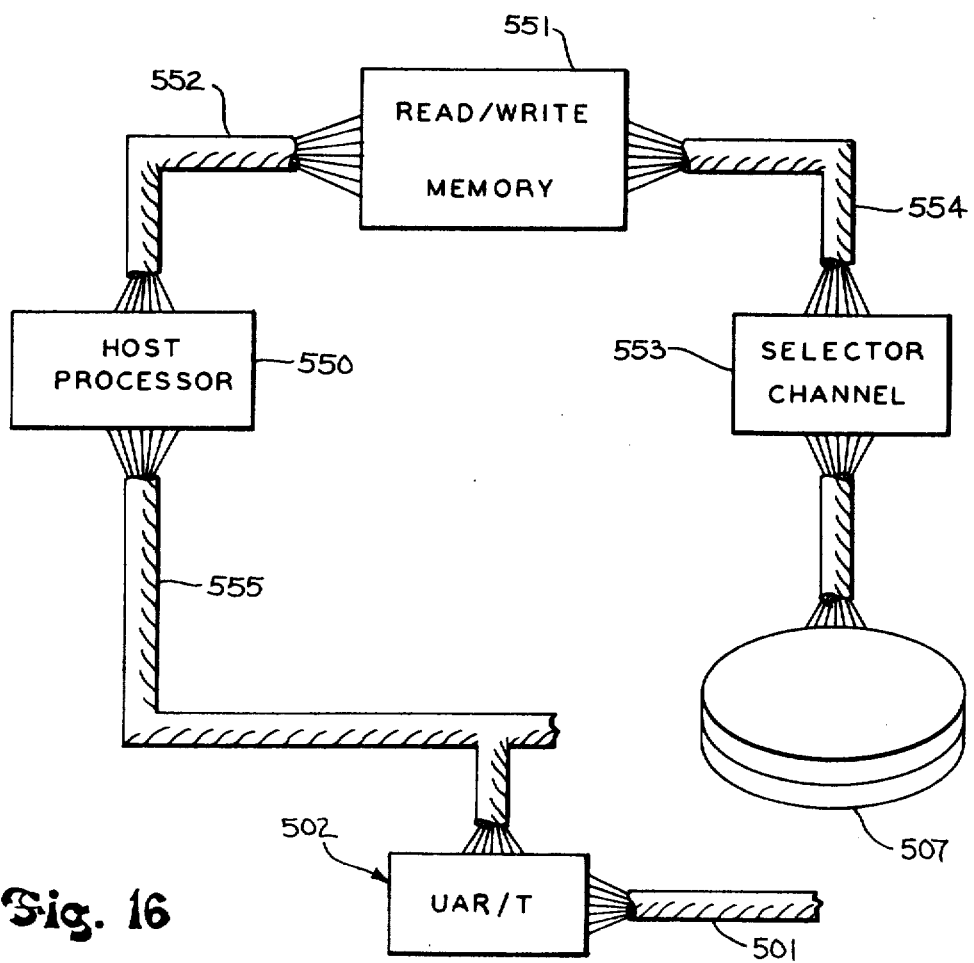
FIG. 16 is a block diagram of the host computer of FIG. 1.

Referring to FIG. 16, the host computer 500 is a 32-bit minicomputer such as the Model 7/32 manufactured by Interdata, Inc. It includes a processor 550 which has 16 32-bit general registers and which performs logical and arithmetic functions in response to program instructions. The processor 550 is coupled to a read/write memory 551 through a bidirectional bus 552. The memory stores the programs which direct the processor 550 to perform its function, including the download NC system program (DNLDNC) to be described hereinafter. A selector channel 553 also couples to the memory 551 through a bidirectional DMA bus 554. The selector channel 553 controls the transfer of data directly between the disc 507 and the memory 551. The selector channel 553 operates simultaneously with the processor 550 by stealing memory cycles to couple data between the disc 507 and memory 551. A "downward library" comprised of COMPAC, NC system software packages, testing and diagnostic programs and application programs is stored in the disc 507 and when a download command is received at processor 550, the selector channel 553 is directed to read the requested program from the disc 507 and store it in the memory 551.

The processor 550 couples to the UAR/T 502 through a bidirectional multiplexer bus 555. The UAR/T 502 is an interrupt driven I/O device and each time it receives an ASCII character or transmits an ASCII character it interrupts the operation of the processor 550. During the interrupt the processor 550 executes an interrupt service routine for the UAR/T 502 which inputs an ASCII character therefrom or outputs an ASCII character thereto. A buffer storage area within the read/write memory 551 is dedicated to the UAR/T 502 and as characters are received they are stored in this buffer until an ETX code is received. Similarly, the buffer stores data which is to be downloaded to the numerical control system, and during each interrupt by the UAR/T 502 one of the ASCII characters in this buffer is coupled to the UAR/T 502 for transmission.

The library of programs and files which may be downloaded is stored as binary data in the disc memory 507. This "download library" is compressed, with each file comprised of a plurality of records, and with each record preceded by a record length number and an absolute load address number. The last halfword of each record is the checksum number. The 16-bit binary words stored in the download library must be converted to ASCII data before they can be transmitted through UAR/Ts 502 and 8 to the numerical control system. This is accomplished by converting each 16-bit binary word into three 7-bit ASCII characters and transmitting these characters sequentially via UAR/T 502 to the numerical control system 1. The division is made as follows:

| ASCII BIT NUMBER | 6 | 5 | 4 | 3 | 2 | 1 | 0 |
|---|---|---|---|---|---|---|---|
| CHARACTER 1 | 1 | 0 | $B_4$ | $B_3$ | $B_2$ | $B_1$ | $B_0$ |
| CHARACTER 2 | 1 | 0 | $B_9$ | $B_8$ | $B_7$ | $B_6$ | $B_5$ |
| CHARACTER 3 | 1 | $B_{15}$ | $B_{14}$ | $B_{13}$ | $B_{12}$ | $B_{11}$ | $B_{10}$ |

Figure 14:
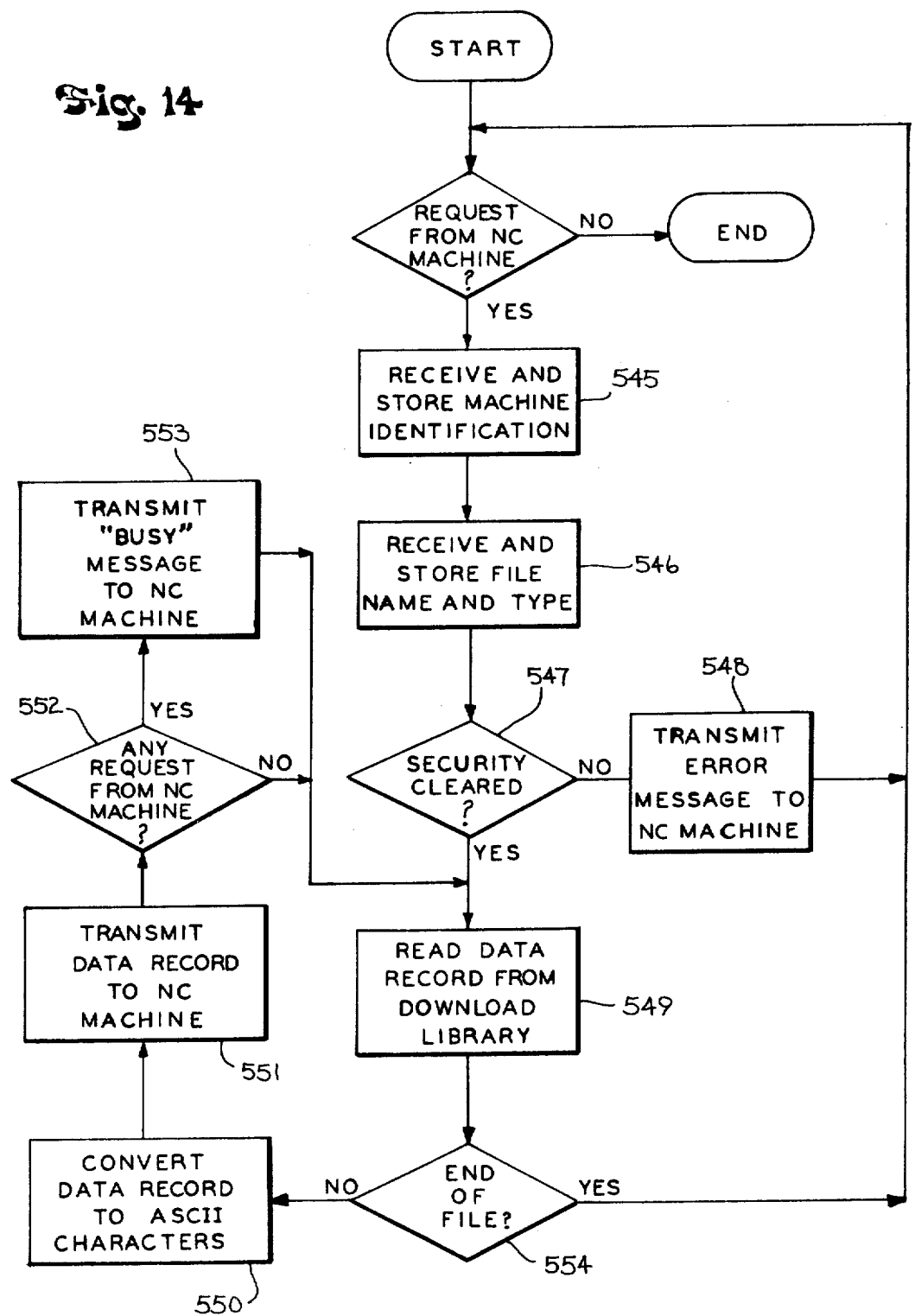
FIG. 14 is a flow chart of the download program (DNLDNC) stored in the host computer memory of FIG. 3.

When a download command (TX) is received from the numerical control system 1 and stored in the buffer storage area in memory 551, a download NC system program (DNLDNC) stored in the host computer memory 551 is entered and executed. Referring particularly to the flow chart of this program in FIG. 14, the identification number of the requesting machine is first received and stored as indicated by process block 545 and then the file name and file type codes are received and stored as indicated by process block 546. The machine identification number is then checked to determine whether or not the requested file can be downloaded to it. If not, as indicated by decision block 547, the system branches to a routine called OUCH which transmits an error message to the numerical control system 1 as indicated by process block 548. If the requesting machine is cleared to receive the identified file, the first record in that file is read from the disc memory 507 as indicated by process block 549 and is converted to ASCII characters as indicated by process block 550. As indicated by process block 551, the characters in the record are then sequentially transmitted to the requesting machine and a check is then made to determine whether a further request from the machine has been made. If so, as indicated by decision block 552, a "BUSY" message is transmitted to the machine as indicated by process block 553. Regardless, the system loops back to the process block 549 to read the next record from the disc 507 and transmit it to the numerical control system 1. As indicated by decision block 554, when the end of file code (ETX) is read out of the disc 507 and downloaded, the system branches back to start to await the next request. A listing of DNLDNC appears in APPENDIX C and a definition of the instructions which appear in this listing is given in "Model 7/32 Processor User's Manual" published by Interdata, Inc. in 1976.

It should be apparent that the invention has been described herein as embodied in a DNC system in which the host computer 500 is a relatively large computer system which may serve a plurality of numerical control systems on a time shared basis. The present invention may, however, be applied in other hardware configurations without departing from the spirit of the invention. For example, the host computer may be a commercially available microprocessor which is connected only to the single numerical control system and which is programmed to manage the files in the "download library" and download a file when requested by the numerical control system. In such a configuration the download library may be stored in devices such as UV proms or bubble memories and the microprocessor and associated download library storage device may be located adjacent to or even in the same enclosure as the numerical control system. In such case, communication links other than the UAR/Ts may be employed since industrial noise may not be as great a factor. Also, the present invention may apply to process controllers and programmable controllers as well as numerical controls.

APPENDIX A
RESIDENT COMMUNICATIONS PROGRAM

| Label | Instruction | Comment |
|---|---|---|
| LOAD | STA MAXAD | SAVE boundary address of resident communications program at memory location MAXAD. |
| | CLF 00B | Disable interrupts. |
| | CLC 0,C | Turn off all I/O devices. |
| LOAD 1 | EQU | |
| | LDA DLE | Fetch constant at memory location DLE. |
| | JSB TRANS | Jump to TRANS subroutine and transmit constant 20 (octal). |
| | LDA VERSN | Fetch ASCII version character from memory 34. |
| | JSB TRANS | Jump to TRANS subroutine and transmit version character. |
| LOAD 2 | EQU | |
| | JSB RECEIVE | Jump to RECEIVE subroutine and input word count. |
| | SZA, RSS | |
| | JMP LOAD 2 | |
| | ALF, ALF | |
| | CMA, CLE, INA | Negate word count and store |
| | STA COUNT | at "COUNT." |
| | JSB RECEIVE | Input record load address. |
| | STA B | Initialize checksum in B register. |
| | STA ADDR | Store record load address at "ADDR." |
| LOAD 3 | EQU | |
| | LDA ADDR | Check to determine whether |
| | ADA. MAXAD | downloaded program will write |
| | SSA, RSS | over resident communication program. |
| | JMP A.ERR | If so, jump to address error indication subroutine. |
| | JSB RECEIVE | Jump to RECEIVE subroutine and download next word. |
| | ADB A | |
| | STA ADDR,I | Store download word in memory 34 at location indicated by ADDR. |
| | ISZ ADDR | Increment memory address stored at ADDR. |
| | ISZ COUNT | Has the last word in the record been downloaded? |
| | JMP LOAD 3 | If not, loop to LOAD 3 and continue downloading. |
| | JSB RECEIVE | If yes, download "checksum" |
| | CPB A | number and compare with value in B register. |
| | JMP LOAD 2 | If checksums agree loop back to LOAD 2 to download next record. |
| C.ERR | EQU | |
| | STA WORD | Save contents of A register at memory location WORD. |
| | LDA NAK | Fetch 025 (octal) stored at memory location NAK. |
| | JSB TRANS | Transmit 025 (octal) to host computer. |
| | LDA WORD | Restore contents of A register. |
| | HLT 11B | Output "CHECKSUM ERROR" to CRT 9. |
| | JMP LOAD | Loop back to restart download procedure. |
| A.ERR | EQU | |
| | LDA NAK | Fetch 025 (octal) stored at memory location NAK. |
| | JSB TRANS | Transmit 025 (octal). |
| | HLT 55B | Output "ADDRESS ERROR" to CRT 9. |
| | JMP LOAD | Loop back to restart download procedure. |
| P.ERR | EQU | |
| | LDA NAK | Fetch 025 (octal) from memory location NAK. |
| | JSB TRANS | Transmit 025 (octal). |
| | HLT 22B | Output "PARITY ERROR" to CRT 9. |
| | JMP LOAD | Loop back to restart download procedure. |
| F.ERR | EQU | |
| | LDA NAK | Fetch 025 (octal) from memory location NAK. |
| | JSB TRANS | Transmit 025 (octal) to host computer. |
| | HLT 44B | Output "FRAMING ERROR" to CRT 9. |

|  |  |  |
|---|---|---|
|  | JMP LOAD | Loop back to restart download procedure. |
| H.ERR | EQU |  |
|  | HLT 33B | Output "HOST ERROR" to CRT 9. |
|  | JMP LOAD | Loop back to restart download procedure. |

BYTE SUBROUTINE

| Label | Instructions | Comment |
|---|---|---|
| BYTE | NOP |  |
|  | CLA |  |
|  | STA LPCNT | Setup loops. |
|  | STA CNTLP |  |
| CLF1 | CLF RS232 | Enable "Interrupt." |
| LIA1 | LIA RS232 | Clear UAR/T receiver. |
|  | RSS |  |
|  | JMP CLF2 |  |
|  | ISZ LPCNT | Wait for "Interrupt." |
|  | JMP SFS1 |  |
|  | ISZ CNTLP |  |
|  | JMP SFS1 |  |
|  | JMP LOAD1 |  |
| CLF2 | CLF RS232 |  |
| LIA2 | LIA RS232 | Input UAR/T status and received character. |
|  | OTA 01B | Display status and character on CRT 9. |
|  | SSA | Signal present? |
|  | JMP H.ERR | If not jump to subroutine which displays "HOST ERROR." |
|  | ALF,SLA | Data received? |
|  | RSS |  |
|  | JMP SFS1 | If not, loop back to SFS1. |
|  | ALF,SLA | Parity error? |
|  | JMP P.ERR | If yes, jump to subroutine which displays "PARITY ERROR." |
|  | RAR,SLA | Overrun or framing error? |
|  | JMP F.ERR | If yes, jump to subroutine which displays "FRAMING ERROR." |
|  | RAL | Align bytes. |
|  | ALF,ALF | Right justify received character. |
|  | AND CHAR | Isolate bits 6–0. |
|  | CPA ENQ | Is the received character the start of a message? |
|  | JMP BYTE+1 | If so, loop back to receive next byte. |
|  | CPA ETX | Is the character ETX? |
|  | JMP 00002B | If so, jump to and begin executing downloaded program. |
|  | AND BITS | Isolate bits 5–0. |
|  | JMP BYTE,I | Return to receive subroutine. |

APPENDIX B

COMPAC PROGRAM

| Label | Instruction | Comment |
|---|---|---|
| BEGIN | EQU * |  |
| OCRT1 | JSB .020 | Output "READY" message to CRT 9. |
|  | DEF *+2 |  |
|  | JMP START |  |
|  | ASC 3, READY |  |
|  | OCT 001400 |  |
| START | EQU * |  |
| ICRT1 | JSB .120 | Read in command from keyboard 7. |
|  | DEC −30 |  |
| BUFAD | DEF BUFER |  |
|  | LDA BUFER | Fetch first two CHAR in CMD "CT" |
|  | CPA =ACT | command? |
|  | RSS | -Yes- |
|  | JMP ERROR | -No- |
|  | LDA BUFAD | Fetch a (Buffer) |
|  | INA | Skip "CT" |
|  | RAL | Form character ADDR |
|  | STA ADDR | Save for .UPK |
|  | JSB .UPK | Fetch 3rd character |
|  | DEF ADDR |  |
|  | CPA =B054 | Comma? |
|  | RSS | -Yes- |
|  | JMP ERROR | -No- |
|  | JSB .UPK | Fetch 4th Byte |
|  | DEF ADDR |  |
|  | ALF,ALF | Swap Bytes |
|  | STA HOLD | Save for later |
|  | JSB .UPK | Fetch 5th Byte |
|  | DEF ADDR |  |
|  | IOR HOLD | Merge with 4th Byte |
|  | CPA =AST | Is it a "START TASK" command? |
|  | JMP STCMD | -Yes- |
|  | CPA =ASN | Is it a "SIGN ON" command? |

APPENDIX B—continued

```
                JMP SNCMD                    -Yes-
                CPA =ASF                     Is it a "SIGN OFF" command?
                JMP SFCMD                    -Yes-
ERROR           EQU *
OCRT2           JSR .020                     Output "*" to CRT 9.
                DEF *+2
                JMP START
                OCT 025003
SNCMD           EQU *
SFCMD           EQU *
                JSB .UPK                     Fetch Byte from buffer storage
                DEF ADDR
                CPA ETX                      End of message?
                RSS                          -Yes-
                JMP *-4                      -No-
                CCA                          *
                ADA ADDR                     * Decrement pointer
                STA ADDR                     *
                LDA CR                       Fetch CR
                JSB .PAK                     Place CR into buffer
                DEF ADDR
                LOA ETX                      Fetch ETX
                JSB .PAK                     Place ETX into buffer
                DEF ADDR
                LOA BUFAD                    Fetch a (Buffer)
                INA                          Skip 1st and 2nd Bytes
                IOR SIGN                     Skip 3rd Byte
                STA DEF1                     Save for .SEND
                JSB .SEND                    Send command to Host Computer
DEF1            NOP
                JSB .RECV                    Wait for reply from host computer
                DEC -30
                DEF BUFER
OCRT3           JSB .020                     Display reply on CRT 9
                DEF BUFER
                JMP START                    Go read in next command from
                                             keyboard 7
STCMD           EQU *
                LDA BUFER+3                  Fetch task ID code
                CPA =ATX                     Download task?
                RSS                          -Yes-
                JMP ERROR                    -No-
                JSB .UPK                     Fetch Byte from buffer
                DEF ADDR
                CPA ETX                      End of message?
                RSS                          -Yes-
                JMP *-4                      -No-
                CCA                          *
                ADA ADDR                     *Decrement pointer
                STA ADDR                     *
                LDA ASIZE                    Fetch a (size)
                RAL                          Form character ADDR
                STA POINT                    Save for .UPK
COPY            EQU *
                JSB .UPK                     Fetch Byte of size
                DEF POINT
                CPA ETX                      End of size?
                JMP *+4                      -Yes-
                JSB .PAK                     Add size to command
                DEF ADDR
                JMP COPY                     Loop until done
                JSB .PAK                     Place end of download code
                                             (ETX) into buffer
                DEF ADDR
                LDA BUFAD                    Fetch a (buffer)
                INA                          Skip 1st and 2nd Bytes
                IOR SIGN                     Skip 3rd Byte
                STA DEF2                     Save for .SEND
                JSR .SEND                    Send command to host computer
DEF2            NOP
                JSB .RECV                    Wait for reply from host
                                             computer
                DEC -30
                DEF BUFER
OCRT4           JSB .020                     Display reply on CRT 9
                DEF BUFER
                LDA TYPE                     Fetch message type code
                CPA ONE                      Type "1"?
                JMP START                    -Yes-
                LDA 7B
                ADA =D6
                CLF 00B
                CLC 0,C
                JMP A,I                      JMP to LOAD 2 in resident
                                             communications program
.PAK            NOP                          Character pack subroutine
                AND =B377                    Isolate character
                STA CHAR                     Save for later
                LDA .PAK,I                   Fetch a (CHAR ADDR)
                LDB A,I                      Fetch a (CHAR)
                ISZ A,I                      Increment CHAR ADDR
                CLE,ERB                      Form word ADDR and U/L Bit
```

APPENDIX B—continued

```
            LDA B,I              Fetch word
            SEZ,RSS              Upper or lower Byte?
            ALF,ALF              Upper - rotate
            AND =B177400         Mask off lower byte
            IOR CHAR             Merge in CHAR
            SEZ,RSS              Upper or lower byte?
            ALF,ALF              Upper - rotate
            STA B,I              Store in buffer
            ISZ .PAK             P+2 return
            JMP .PAK,I           Exit
CHAR        NOP
.UPK        NOP                  Character unpack subroutine
            LDA .UPK,I           Fetch a (CHAR ADDR)
            LDB A,I              Fetch a (CHAR)
            ISZ A,I              Increment CHAR ADDR
            CLE,ERB              Form word ADDR and U/L Bit
            LDA B,I              Fetch word
            SEZ,RSS              Upper or lower Byte?
            ALF,ALF              Upper - rotate
            AND =B377            Isolate character
            ISZ .UPK             P+2 return
            JMP .UPK,I           Exit
.020        NOP                  CRT message output subroutine
            LDA .020,I           Fetch a (buffer)
            RAL                  Form character ADDR
            STA ADDR             Save for later
            ISZ .020             P+2
            LDA =B014            Fetch "FORM FEED"
            JSB OUT 20           Output it to CRT 9
LOOP1       EQU *
            JSB .UPK             Fetch character from buffer
            DEF ADDR
            CPA ETX              End of buffer?
            JMP **3              -Yes-
            JSB OUT 20           Output CHAR to CRT 9
            JMP LOOP 1           Loop unitl buffer empty
            LDA =B013            Fetch "ERASE TO END OF PAGE"
                                 command
            JSB OUT 20           Output it to CRT 9
            JMP .020,I           Return
OUT 20      NOP                  CRT character output subroutine
            LIB CRT 20           Input CRT status
            SSB                  CRT busy?
            JMP *-2              -Yes-
            IOR =B200            Make character bright
            OTA CRT 20           Output character
            AND =B177            Mask off bright bit
            JMP OUT 20,I         Return
.I20        NOP                  Keyboard message input sub-
                                 routine
            DLD .I20,I           Fetch parameters
            RBL                  Form character ADDR
            STB HOLD             Save for test
            DST COUNT            Save for later
            ISZ .I20             P+2
            ISZ .I20             P+3
            LDA =B011            Fetch "HOME" command
            JSR OUT 20           Output IT to CRT 9
RD20        EQU *
            JSB INP 20           Input character from keyboard 7
            CPA ETX              Message end code?
            JMP ETX 20           -Yes-
            CPA =B016            Backspace?
            JMP BKSPC            -Yes-
            CPA =B020            ABS?
            JMP RD20             -Yes-
            CPA =B021            CAR?
            JMP RD20             -Yes-
            CPA =B022            DTG?
            JMP RD20             -Yes-
            CPA =B023            Offset?
            JMP RD20             -Yes-
            CPA =B077            Right arrow?
            JMP RD20             -Yes-
            CPA =B010            Up arrow?
            JMP RD20             -Yes-
            CPA =B012            Down arrow?
            JMP RD20             -Yes-
            CPA =B043            EOB?
            LDA =A #             -Yes-
            JSB OUT20            Display character on CRT 9
            JSB .PAK             Place CHAR into buffer
            DEF ADDR
            ISZ COUNT            Buffer full?
            JMP RD20             -No-
            LDA ETX              Fetch ETX
ETX20       EQU *
            JSB .PAK             Place ETX into buffer
            DEF ADDR
            LDA =B135            Fetch right bracket
            JSB OUT20            Display it
            LDA =B013            Fetch "EEOP" command
```

APPENDIX B—continued

```
                JSB OUT20                       Output it to CRT 9
                JMP .I20,I                      Return
BKSPC           EQU *
                LDA ADDR                        Fetch buffer pointer
                CPA HOLD                        Buffer empty?
                JMP RD20                        -Yes-
                LDA =B016                       Fetch "CURSOR LEFT" command
                JSB OUT20                       Output it to CRT 9
                LDA =B040                       Fetch blank
                JSB OUT20                       Output it to CRT 9
                LDA =B016                       Fetch "CURSOR LEFT" command
                JSB OUT20                       Output it to CRT 9
                CCA                             *
                ADA ADDR                        * Decrement pointer
                STA ADDR                        *
                JMP RD20
INP20           NOP                             Keyboard character input
                                                subroutine
                STC CRT20                       Enable keyboard input
                CLC CRT20                       Disable keyboard interrupt
                LIA CRT20                       Input status*character
                RAL
                CMA,SSA                         Character in?
                JMP *-3                         -No-
                RAR
                AND =B177                       Isolate character
                JMP INP20,I                     Return
.SEND           NOP                             Subroutine to transmit a
                                                message to the host computer
                LDA .SEND,I                     Fetch a (buffer)
                RAL                             Form character ADDR
                STA HOLD                        Save for later
                ISZ .SEND                       P+2
STC1            STC RS232,C                     Enable status
LIA2            LIA RS232                       Clear UAR/T receiver
                LDA =D-10                       Fetch loop count
                STA LOOP                        Setup loop count
SEND1           EQU *
                LDA ENQ                         Fetch enquiry
                JSB .OUT                        Transmit it to host computer
                JSB .IN                         Wait for reply
                RSS                             Error
                JMP SEND3                       Character OK
SEND2           EQU *
                ISZ LOOP                        Time-out
                JMP SEND1                       Try again
OCRT5           JSB .020
                DEF *+2
                JMP START
                ASC 9, DNC NOT RESPONDING
                OCT 043403
SEND3           EQU *
                CPA ACK                         Acknowledge?
                JMP SEND4                       -Yes-
                CPA EOT                         End of transmission?
                JSB .OUT                        -Yes-
                JMP SEND2                       -No-
SEND4           EQU *
                LDA SOH                         Fetch SOH
                STA BCC                         Initialize BCC
                JSB .OUT                        Transmit SOH
                LDA =A C                        Fetch ASCIT"C"
                JSB .OUT                        Transmit it to host computer
                LDA STX                         Fetch STX
                JSB .OUT                        Transmit it to host computer
                LDA HOLD                        Fetch a (buffer)
                STA ADDR                        Save for .UPK
SEND5           EQU *
                JSB .UPK                        Fetch character from buffer
                DEF ADDR
                CPA ETX                         Buffer empty?
                JMP *+3                         -Yes-
                JSB .OUT                        Transmit CHAR to host computer
                JMP SEND5                       Loop until buffer empty
                JSB .OUT                        Transmit ETX code to host
                                                computer
                LDA BCC                         Fetch BCC
                JSB .OUT                        Transmit it to host computer
                LDA =D-4                        Fetch loop count
                STA LOOP                        Setup loop count
SEND6           EQU *
                JSB .IN                         Wait for reply
                JMP SEND7                       Error
                RSS                             Character OK
                JMP SEND7                       Time-out
                CPA ACK                         Acknowledge?
                JMP SEND8                       -Yes-
                CPA NAK                         Negative acknowledge?
                JMP SEND4                       -Yes-
                CPA DLE                         Data link escape?
                JMP ABORT                       -Yes-
SEND7           EQU *
```

APPENDIX B—continued

|  |  |  |
|---|---|---|
|  | ISZ LOOP | Give up? |
|  | RSS | -No- |
|  | JMP ABORT | -Yes- |
|  | LDA ENQ | Fetch enquiry |
|  | JSB .OUT | Transmit it to host computer |
|  | JMP SEND6 | Try again |
| SEND8 | EQU * |  |
|  | LDA EOT | Fetch EOT |
|  | JSB .OUT | Transmit it to host computer |
|  | JMP .SEND,I | Return |
| FAIL | EQU * | DNC failure |
| OCRT6 | JSB .020 |  |
|  | DEF *+2 |  |
|  | JMP START |  |
|  | ASC 6, DNC FAILURE |  |
| .OUT | NOP | Subroutine to transmit a register contents to host computer |
| CLF1 | CLF RS232 | *Enable |
| LIBI | LIB RS232 | *"Interrupt" |
|  | AND =B177 | Isolate output Byte |
| OTA1 | OTS RS232 | Transmit character |
|  | XOR BCC | Compute new BCC |
|  | STA BCC | Updata BCC |
| SFS1 | SFS RS232 | * |
|  | JMP SFS1 | *Wait for "Interrupt" |
| CLF4 | CLF RS232 | * |
| LIB2 | LIB RS232 | Input UAR/T status |
|  | RBL,SLB | Line signal detect? |
|  | JMP FAIL | -No- |
|  | RBL SLB | Transmitter buffer empty? |
|  | JMP .OUT,I | -Yes- |
|  | JMP SFS1 | -No- |
| BCC | NOP | Block check character |
| .IN | NOP | Subroutine to wait 200 ms for a character from host computer |
|  | LDB =D-22500 | Fetch time-out count |
| CLF2 | CLF RS232 | Enable "Interrupt" |
| LIA3 | LIA RS232 | Clear UAR/T receiver |
| SFS2 | SFS RS232 | * |
|  | JMP ISZB | *Wait for "Interrupt" |
| CLF3 | CLF RS232 | * |
| LIA1 | LIA RS232 | Input status+character |
|  | STA INPUT | Save status+character |
|  | SSA | Line signal detect? |
|  | JMP. IN,I | -No- |
|  | ALF,SLA | Data available? |
|  | JMP ERRCK | -Yes- |
| ISZB | EQU * |  |
|  | ISZ B | Time-out |
|  | JMP SFS2 | -No- |
|  | ISZ .IN | -Yes- |
|  | ISZ .IN | P+3 Exit |
|  | JMP .IN,I | Return |
| ERRCK | EQU * |  |
|  | AND =B30000 | Isolate error bits |
|  | SZA | Any errors? |
|  | JMP .IN,I | -Yes- |
|  | LDA INPUT | Fetch status+character |
|  | AND =B177 | Isolate character |
|  | STA B | Save character |
|  | XOR BCC | Compute new BCC |
|  | STA BCC | Update BCC |
|  | LDA B | Restore character |
|  | ISZ .IN | P+2 exit |
|  | JMP .IN,I | Return |
| INPUT | NOP |  |
| .RECV | NOP | Subroutine to receive a message from the host computer |
|  | DLD .RECV,I | Fetch parameters |
|  | RBL | Form character ADDR |
|  | DST HOLD | Save for later |
|  | ISZ .RECV | P+2 |
|  | ISZ .RECV | P+3 |
| RECV0 | EQU * |  |
|  | JSB .IN | Wait for ENQ |
|  | JMP RECV0 | Error |
|  | RSS | Character OK |
|  | JMP RECV0 | Time-out |
|  | CPA EOT | End of transmission? |
|  | JMP RECV1 | -Yes- |
|  | CPA ENQ | Enquiry? |
|  | JMP RECV2 | -Yes- |
|  | CPA DLE | Data link escape? |
|  | JMP ABORT | -Yes- |
|  | JMP RECV0 | None of the above |
| RECV1 | EQU * |  |
|  | JSB .OUT | Transmit EOT code to host computer |
|  | JMP RECV0 | Wait again |
| RECV2 | EQU * |  |
|  | LDA ACK | Fetch acknowledge code |

APPENDIX B—continued

| | | |
|---|---|---|
| | JSB .OUT | Transmit it to host computer |
| RECV3 | EQU * | |
| | JSB .IN | Wait for SOH |
| | JMP RECV4 | Error |
| | RSS | Character OK |
| | JMP ABORT | Time-out |
| | CPA ENQ | Enquiry? |
| | JMP RECV2 | -Yes- |
| | CPA DLE | Data link escape? |
| | JMP ABORT | -Yes- |
| | CPA SOH | Start of header? |
| | JMP RECV6 | -Yes- |
| RECV4 | EQU * | |
| | JSB .IN | Wait for time-out |
| | JMP RECV4 | Error |
| | JMP RECV4 | Character OK |
| RECV5 | EQU * | |
| | LDA NAK | Fetch negative acknowledge code |
| | JSB .OUT | Transmit it to host computer |
| | JMP RECV3 | Wait for SOH |
| RECV6 | EQU * | |
| | DLD HOLD | Fetch parameters |
| | DST COUNT | Copy to work area |
| | CLA | Clear A-REG |
| | STA BCC | Initialize BCC |
| | JSB .IN | Wait for CMD Byte |
| | JMP RECV4 | Error |
| | RSS | Character OK |
| | JMP RECV5 | Time-out |
| | CPA ONE | Type "1"? |
| | RSS | -Yes- |
| | CPA TWO | Type "2"? |
| | RSS | -Yes- |
| | JMP RECV4 | -No- |
| | STA TYPE | Save message type |
| | JSB .IN | Wait for start of test code |
| | | (STX) from host computer |
| | JMP RECV4 | Error |
| | RSS | Character OK |
| | JMP RECV5 | Time-out |
| | CPA STX | Start of text? |
| | RSS | -Yes- |
| | JMP RECV4 | -No- |
| RECV7 | EQU * | |
| | JSB .IN | Wait for text |
| | JMP RECV4 | Error |
| | RSS | Character OK |
| | JMP RECV5 | Time-out |
| | CPA ETX | End of text? |
| | JMP RECV8 | -Yes- |
| | JSB .PAK | Place CHAR into buffer |
| | DEF ADDR | |
| | ISZ COUNT | Buffer full? |
| | JMP RECV7 | -No- |
| | JMP RECV4 | -Yes- |
| RECV8 | EQU * | |
| | JSB .PAK | Save ETX in buffer |
| | DEF ADDR | |
| | JSB .IN | Wait for BCC |
| | JMP RECV4 | Error |
| | RSS | Character OK |
| | JMP RECV5 | Time-out |
| | LDA BCC | Fetch BCC |
| | SZA | BCC correct? |
| | JMP RECV5 | -No- |
| | LDA ACK | Fetch acknowledge code |
| | JSB .OUT | Transmit it to host computer |
| RECV9 | EQU * | |
| | JSB .IN | Wait for reply |
| | JMP *−3 | Error |
| | RSS | Character OK |
| | JMP .RECV,I | Time-out |
| | CPA ENQ | Enquiry? |
| | JMP *−7 | -Yes- |
| | CPA EOT | End of transmission? |
| | RSS | -Yes- |
| | JMP RECV9 | -No- |
| | JSB .OUT | Transmit EOT |
| | JMP .RECV,I | Return |
| ABORT | EQU * | Communications aborted |
| | JSB .IN | Delay one character time |
| | LDA EOT | Fetch EOT |
| | JSB .OUT | Transmit it |
| OCRT7 | JSB .020 | |
| | DEF *+2 | |
| | JMP START | |
| | ASC 12, COMMUNICATIONS ABORTED | |
| | OCT 020003 | |

CONSTANTS / VARIABLES
FOR COMPAC PROGRAM

APPENDIX B—continued

| Label | Instruction | Comment |
|---|---|---|
| EOT | OCT 004 | End of transmission |
| ENQ | OCT 005 | Enquiry |
| DLE | OCT 020 | Data link escape |
| ACK | OCT 006 | Acknowledge |
| SOH | OCT 001 | Start of header |
| NAK | OCT 025 | Negative acknowledge |
| STX | OCT 002 | Start of text |
| ETX | OCT 003 | End of text |
| ONE | OCT 061 | ASCII "1" |
| TWO | OCT 062 | ASCII "2" |
| CR | OCT 015 | Carriage return |
| SIGN | OCT 100000 | Sign bit |
| BUFER | EQU * | |
| | ASC 10, | |
| | ASC 10, | |
| | OCT 001400 | |
| | ASC 5 | |
| HOLD | DEC 0,0 | Count and ADDR hold words |
| COUNT | NOP | Byte counter |
| ADDR | NOP | Buffer pointer |
| TYPE | NOP | Message type |
| LOOP | NOP | Loop counter |
| POINT | NOP | Buffer pointer |
| ASIZE | DEF*+1 | |
| | ASC 3,,48,12 | |
| | OCT 006403 | |

APPENDIX C

DNLDNC PROGRAM

| Label | Instruction | | Comment |
|---|---|---|---|
| DNLDNC | RTL | R5,DNLDNCQ | Get ID number of N/C system from buffer |
| | BO | EOJOB | If no more tasks, jump to EOJOB |
| | NI | R5,Y'00FFFFFF' | Strip off reason code |
| | BAL | RF,ASMACHIN | Jump to ASMACHIN subroutine |
| | L | R6,MCB,CDBF(R5) | |
| | LIS | R2,3 | Search command in buffer |
| | LIS | R3,1 | from after 'ST,.......' |
| | LHI | R4,CMDBFSZ | Get buffer size |
| FRSTCOMA | LB | RA,0(R6,R2) | Find first comma in command |
| | CLHI | RA,C',' | |
| | BES | GETFNAME | Get file name from command in buffer |
| | BXLE | R2,FRSTCOMA | |
| GETFNAME | B | FNCHK | Jump to FNCHK subroutine |
| GETTYPE | AR | R2,R6 | |
| | AIS | R2,1 | |
| | ST | R2,ATYPE | |
| | BAL | RF,TYPECHK | Jump to TYPECHK subroutine |
| | DCX | 4 | |
| ATYPE | DCF | 0 | |
| | LH | R2,TYPE | COMPAC requested? |
| | BNZS | STO.TYPE | No - OK |
| | LHI | R2,C'A' | Yes - Fake Type 'A' |
| STO,TYPE | STB | R2,FNTP+1 | Store type and call |
| | BAL | RF,XRFHAN | XRFHAN to determine |
| | DAC | GET,DNC.PARM | which NC systems the requested file can be downloaded to |
| FNTP | DB | 1,0,5,4 | |
| | DAC | FILENAME,0,ASG.LFD | |
| | DCF | 0 | |
| SRFERR | DS | 2 | |
| | LH | R2,XRFERR | |
| | BNZ | XRF,ERR | Error in finding internal name |
| | LH | R2,TYPE | COMPAC requested? |
| | BZ | ASGLIB | Yes - Skip assignment check |
| | LH | R1,DNC.ASSI | Get machines to which file can be assigned |
| | LR | R2,R5 | A (MCB) |
| | SI | R2,DNC.MCB | Subtract a (First MCB) |
| | DH | R2,DNC.MCSZ | Get MCB number |
| | LR | R4,R3 | Quotient => R3 |
| | SRLS | R4,4 | HFWD offset from DNC.ASSI |
| | SLLS | R4,1 | |
| | AR | R1,R4 | Adjust DNC.ASSI offset |
| | SLLS | R4,3 | |

APPENDIX C—continued

| Label | | Instruction | | Comment |
|---|---|---|---|---|
| | SR | R3,R4 | | Bit offset |
| | TBT | R3,GET(R1) | | Check is prog assigned to machine |
| | BNZS | ASGLIB | | |
| | LA | RB,NOTASGD | | Send "Program not Assignable" message to NC system |
| | B | SEND.TM | | |
| ASGLIB | SVC | 7,ASG.LIB | | Assign request for file to library management program |
| | BAL | RF,SVCERR | | |
| | DCF | 0,7 | | |
| | DAC | JMPTBL,ASG.LIB | | |
| | LH | RB,TYPE | | COMPAC requested? |
| | BZS | READINDX | | Yes - BR |
| | SVC | 1,ST.MSG | | No, Send start message to NC system |
| | BAL | RF,SVCERR | | |
| | DAC | 0,1,DONE+1,ST.MSG | | |
| READINDX | BAL | RF,RDLIB | | Jump to RDLIB subroutine |
| READLIB | BAL | RF,RDLIB | | to read record from disc |
| | L | R8,TRAIL | | End of file flag set? |
| | BNZS | SEND,ETX | | If end of file, jump to SEND.ETX |
| | BAL | RF,UNLOAD | | Jump to UNLOAD SUBROUTINE |
| | B | READLIB | | Loop back to read next record from disc |
| SEND.ETX | LA | R8,TBUF | | |
| | ST | R8,DNLDMCB+4 | | Store start address |
| | AIS | R8,2 | | |
| | ST | R8,DNLDMCB+8 | | Store end address |
| | SVC | 1,DNLDMCB | | Send ETX,0,0 to N/C system |
| | BAL | RF,SVCERR | | |
| | DCF | 0,1 | | |
| | DAC | TRAILERR,DNLDMCB | | |
| DONE | LA | RB,EOJ.MSG | | |
| | BAL | RF,OK.OUCH | | Send END of JOB message to N/C system |
| | BS | CLOSELIB | | |
| TMSG | LA | RB,TRAILMSG | | |
| | BAL | RF,MSG.OUCH | | |
| CLOSELIB | SVC | 7,DEAS.LIB | | Close download library file |
| | BAL | RF,SVCERR | | |
| | DCF | 0,7 | | |
| | DAC | NEXTTASK+1,DEAS.LIB | | |
| | BS | NEXTTASK | | |
| XRF.ERR | LA | RB,XRFER.A | | |
| | LA | RB,XRFER.A | | |
| | BAL | RF,MSG.OUCH | | |
| | BS | NEXTTASK | | |
| ASGERR | LA | RB,ASGMSG | | |
| | BAL | RF,MSG.OUCH | | |
| NEXTTASK | SVC | 7,DEASSIGN | | DEASSIGN MACHINE |
| | BAL | RF,SVCERR | | |
| | DCF | 0,7 | | |
| | DAC | EOJOB.0+1,DEASSIGN | | |
| EOJOB | SVC | 3,0 | | |
| BLACKOUT | SVC | 9,UDL.PWRO | | Resume after power failure |
| ASGMSG | DB | C'LU ASSIGNMENT ERROR', X'D' | | |

FNCHK SUBROUTINE

| Label | Instruction | | Comment |
|---|---|---|---|
| FNCHK | XR | R9,R9 | |
| | AIS | R2,1 | |
| | SR | R9,R2 | |
| BYTECHK | LB | RA,0(R6,R2) | Get file name code |
| | CLHI | RA,C',' | |
| | BE | GETTYPE | from buffer storage, |
| | STB | RA,FILENAME (R9,R2) | |
| | BXLE | R2,BYTECHK | check to make sure it |
| | LA | RB,IFN | |
| | BAL | RF,MSG.OUCH | has no more than 8 |
| | B | NEXTTASK | |
| IFN | DC | C'INVALID FILENAME' | characters, then |
| | DCX | D00 | |
| | ALIGN | 4 | store at "FILENAME" |
| FILENAME | DO | 3 | |
| | DC | C' ' | |
| | DC | C' ' | |
| | DC | C' ' | |

ASMACHIN SUBROUTINE

| Label | Instruction | | Comment |
|---|---|---|---|
| ASMACHIN | ST | RF,MCRFSAV | Save R15 |
| | ST | R5,MCBADD | Store MCB ADDR |
| | L | R0,MCB.MFD(R5) | Load machine file descriptor |
| | ST | R0,LU3FD | Store for LU- Assignment |
| | SVC | 7,ASSIGN | Assign terminal to LU-3 |
| | BAL | RF,SVCERR | Any errors? |

-continued

|  | DCF | 0,7 |  |
| --- | --- | --- | --- |
|  | DAC | JMPTBL,ASSIGN |  |
|  | L | RF,MCRFSAV | Load R 15 |
|  | BR | RF | Return |
| MCRFSAV | DSF | 1 |  |
| ASSIGN | DCX | 4080,3 | Assign/SRW/LU-3 |
|  | DCF | 0 |  |
| LU3FD | DCF | 0 | Machine file descriptor |

TYPECHK SUBROUTINE

| Label | Instruction | | Comment |
| --- | --- | --- | --- |
| TYPECHK | AIS | RF,4 | Align RF to fullword |
|  | NI | RF,−4 |  |
|  | STM | RB,TYPERS | Save registers |
|  | L | RD,0(RF) |  |
|  | LB | RD,0(RD) | Load 'TYPE' code |
|  | CLHI | RD,X'C9' | Type = COMPAC? |
|  | BE | RET | Yes - Return |
|  | L | RC,MCB.AP(R5) | No - check operator access privilege with ID code in sign-on command |
|  | STH | RD,TYPE | Store type |
|  | CLHI | RD,X'41' | Requested Type = 'A'? |
|  | BNES | CHKT | No - Branch operator |
|  | NI | RC,$DA | has application program download privilege? |
|  | BNZ | RET | Yes - Return |
|  | B | LOG.ACS | Jump to authorized access |
| CHKT | CLHI | RD,X'54' | Requested Type - 'T'? |
|  | BNES | CHKX | No - BR |
|  | NI | RC,$DT | Yes - check operator access privilege |
|  | BNZ | RET | Operator has privilege - return |
|  | BS | LOG.ACS | Jump to unauthorized access |
| CHKX | CLHI | RD,X'58' | Requested Type = X? |
|  | BNES | LOG.TM | No - branch |
|  | NI | RC,$DX | Operator has N/C system program access privilege? |
|  | BNZS | RET | Yes - return |
| LOG.ACS | LA | RB,ACS.MSG |  |
|  | BS | SEND.TM |  |
| LOG.TM | LA | RB,TYPEMSG |  |
| SEND.TM | BAL | RF,MSG.OUCH | Send Type 1 message to N/C system to indicate download command cannot be executed |
|  | B | NEXTTASK |  |
| RET | LM | RB,TYPERS | Restore registers |
|  | B | 4(RF) |  |
| TYPERS | DSF | 5 | Register SAVEAREA |
| TYPEMSG | DB | C'UNRECOGNIZABLE TYPE',X'D' |  |
|  | ALIGN | 4 |  |
| ACS.MSG | DB | C'UNAUTHORIZED ACCESS',X'D' |  |
| TYPE | DCX | 0 |  |

BINARY TO ASCII CONVERSION (BTA) SUBROUTINE

| Label | Instruction | | Comment |
| --- | --- | --- | --- |
| BTA | AIS | RF,4 | Align RF to fullword boundary |
|  | NI | RF,−4 |  |
|  | STM | RD,BTARS | Save registers |
|  | L | RE,0(RF) | A (Binary) |
|  | LH | RE,0(RE) | Load binary value |
|  | L | RE,4(RF) | A (ASCII) |
|  | LR | RD,RE | Save binary value |
|  | SRHLS | RD,10 | Get first binary part |
|  | AHI | RD,X'40' | Set (B7)=1 |
|  | STB | RD,2(RF) | Store Byte |
|  | NHI | RE,1023 | Mask |
|  | LR | RD,RE |  |
|  | SRHLS | RD,5 | Get second part |
|  | AHI | RD,X'40' | Set (B7)=1 |
|  | STB | RD,1(RF) | Store Byte |
|  | NHI | RE,31 | Mask |
|  | AHI | RE,X'40' | Third part |
|  | STB | RE,0(RF) | Store Byte |
|  | LM | RD,BTARS | Restore registers |
|  | B | 8(RF) | Return |
| BTARS | DSF | 3 | Register save area |

TASKQS SUBROUTINE

| Label | Instruction | | Comment |
| --- | --- | --- | --- |
| TASKQS | STM | R5,TQSRS | Save registers |
| GETLIST | RTL | R9,DNLDNCQ | Get Q request |

-continued

|  | BO | TKQ.RET | No more Q requests -- return |
|---|---|---|---|
|  | EXHR | R8,R9 |  |
|  | EXBR | R8,R8 |  |
|  | NI | R9,Y'00FFFFFF' | Strip off reason code |
|  | NHI | R8,X'FF' | Get reason code |
|  | CLHI | R8,1 | New request? |
|  | BE | NEWREQ | Yes - BR |
|  | CLHI | R8,6 | Tell Command ESCA? |
|  | BE | TELL.END |  |
|  | CLHI | R8,8 | I/O Req done? |
|  | BNE | GETLIST |  |
| TKQ.RET | LM | R5,TQSRS | Load registers |
|  | BR | RF | Return |
| NEWREQ | L | R5,MCBADD |  |
|  | LM | RE,MCB.MACH(R5) | FD of present terminal |
|  | ST | RE,TERM1 |  |
|  | EXHR | RF,RF |  |
|  | STH | RF,TERM2 |  |
|  | LR | R5,R9 | Log 'download busy' message |
|  | L | R6,MCB.CDBF(R5) | CMD BUF of new terminal |
|  | LA | RB,DNLDBUSY |  |
|  | BAL | RF,MSG.OUCH |  |
|  | B | GETLIST |  |
| TELL.END | L | R7,TELL.BUF+12 | Send 'escape' message |
|  | CI | R7,C'ESCA' |  |
|  | BNE | GETLIST |  |
| TELL.Q | RTL | R5,DNLDNCQ |  |
|  | BO | TEL.END | Send 'escape' message to all leftover tasks |
|  | LA | RB,TELL.BUF+12 |  |
|  | BAL | RF,MSG.OUCH |  |
|  | BS | TELL.Q |  |
| TEL.END | LA | RB,TELL.BUF+12 |  |
|  | L | R5,MCBADD |  |
|  | BAL | RF,MSG.OUCH |  |
|  | SVC | 3,0 |  |
| TELL.BUF | DAC | TELL.BUF |  |
|  | DSF | 18 |  |
| TQSRS | DSF | 11 |  |
|  | ALIGN | 4 |  |
| DNLDBUSY | DC | C'**DNLDNC BUSY : ' |  |
| TERM1 | DCF | 0 |  |
| TERM2 | DCX | 0,D00 |  |
| *  |  |  |  |
| * | TASK | QUEUE |  |
|  | ALIGN | 4 |  |
| DNLDNCQ | DLIST | 10 |  |

RDLIB SUBROUTINE

| Label | Instruction |  | Comment |
|---|---|---|---|
| RDLIB | STM | RE,RDRS | Save registers |
|  | SVC | 1,RDPARBLK | Read record from download library into memory |
|  | BAL | RF,SVCERR |  |
|  | DCF | 0,1 |  |
|  | DAC | RDLIBERR,RDPARBLK |  |
| RD.LDREG | LM | RE,RDRS | Restore registers |
|  | BR | RF | Return |
| TRAILER | LIS | RE,1 | End of file? |
|  | ST | RE,TRAIL | Yes - set end of file flag |
|  | BS | RD.LDREG |  |
|  | ALIGN | 4 |  |
| RDPARBLK | DCX | 5804,0 | Read/Wait/LU-4/Status |
|  | DAC | BBUF,BBUFEND |  |
|  | DCF | 0,0 |  |
| RDRS | DSF | 2 |  |
| RDLIBERR | DAC | RD.LDREG,RD.LDREG |  |
|  | DCF | A(TRAILER)+Y'88000000' |  |
|  | DCF | A(TRAILER)+Y'90000000',0 |  |
| TRAIL | DCF | 0 |  |
| BBUF | DS | BBUFSZ |  |
| BBUFEND | EQU | *-1 |  |

UNLOAD SUBROUTINE

| Label | Instruction |  | Comment |
|---|---|---|---|
| UNLOAD | STM | RA,ULDRS | Save registers |
|  | LI | RB,BBUFSZ | Buffersize |
|  | LA | RC,ABUF |  |
|  | L | RA,TEMPKNT | Get leftover count |
|  | BZ | NEWBUF | No leftover from last time |
|  | LIS | RF,0 |  |
|  | ST | RF,TEMPKNT |  |
|  | LB | RE,TEMP | Leftover record length |
|  | AR | RE,RE | Byte count |
|  | AIS | RE,6 | Plus 3 more half words |
|  | SR | RE,RA | Number of Bytes of leftover record in new buffer |
|  | SR | RB,RE | Adjust buffer Byte count |

-continued

| Label | | Instruction | | Comment |
|---|---|---|---|---|
| | LA | RD,TEMP | | First effective word |
| LEFTOVER | ST | RD,TBBUF | | |
| | ST | RC,TABUF | | |
| | BAL | RF,BTA | | Call binary to ASC I conversion subroutine |
| | DCX | 6 | | |
| TBBUF | DCF | 0 | | |
| TABUF | DCF | 0 | | |
| | AIS | RD,2 | | Next binary word |
| | AIS | RC,3 | | Next ASCII location |
| | SIS | RA,2 | | Left over Byte count |
| | BP | LEFTOVER | | |
| | LA | RD,BBUF | | A(remaining binary) |
| | B | TRANS | | |
| NEWBUF | LA | RD,BBUF | | Yes - keep translate |
| EXAMIN | LB | RE,0(RD) | | Half word count |
| | CI | RD,BBUFEND | | End of binary buffer? |
| | BP | ULDLR | | Yes - Return |
| | AR | RE,RE | | Byte count of record length |
| | BNZS | GOTCOUNT | | Got Byte count |
| | AIS | RD,2 | | Else skip gap |
| | SIS | RB,2 | | Adjust binary buffer pointer |
| | LH | RE,0(RD) | | Make sure it not end of PGM |
| | BZ | ULDLR | | End of PGM - return |
| | BS | EXAMIN | | |
| GOTCOUNT | AIS | RE,6 | | Incl Byte-count, load ADDR & CHKSUM |
| | LA | RC,ABUF | | Start of ASCII bufr |
| | SR | RB,RE | | Enough space for 1 record? |
| | BM | STORTEMP | | No - BR |
| TRANS | ST | RD,ABBUF | | |
| | ST | RC,AABUF | | |
| | BAL | RF,BTA | | |
| | DCX | 6 | | |
| ABBUF | DCF | 0 | | |
| AABUF | DCF | 0 | | |
| | AIS | RD,2 | | |
| | AIS | RC,3 | | |
| | SIS | RE,2 | | |
| | BP | TRANS | | |
| | ST | RC,ASCIIO | | Tag 3 ASCII 0's |
| | BAL | RF,BTA | | |
| | DCX | 6 | | |
| | DAC | Binary0 | | |
| ASCIIO | DAC | 0 | | |
| | AIS | RC,2 | | |
| | ST | RC,DNLDMCB+8 | | End of ASCII record |
| | SVC | 1,DNLDMCB | | Transmit to N/C system (LU-3) |
| | LB | R1,DNLDMCB+2 | | Status = 'CA'? |
| | CLHI | R1,X'CA' | | |
| | BE | SEND.ERR | | Yes - error |
| | BAL | RF,SVCERR | | |
| | DCF | 0,1 | | |
| | DAC | SEND.ERR+1, DNLDMCB | | |
| | BAL | RF,TASKQS | | Check on TASK Queue |
| | B | EXAMIN | | |
| STORTEMP | AR | RB,RE | | Store leftover record to |
| | ST | RB,TEMPKNT | | a temporary storage area |
| | LA | RC,TEMP | | |
| | XR | RF,RF | | |
| STLFTVR | LH | RE,0(RD,RF) | | |
| | STH | RE,0(RC,RF) | | |
| | AIS | RF,2 | | |
| | CR | RB,RF | | |
| | BPS | STLFTVR | | |
| ULDLR | LM | LA,ULDRS | | |
| | BR | RF | | Return |
| SEND.ERR | LA | RB,MSG.ABRT | | Send Abort MSG |
| | BAL | RF, MSG.OUCH | | |
| | B | NEXTTASK | | |
| ULDRS | DSF | 6 | | |
| TEMPKNT | DCF | 0 | | |
| TEMP | DS | BBUFSZ | | |
| | ALIGN | 4 | | |
| ABUF | DS | ABUFSZ | | |
| | ALIGN | 4 | | |
| DNLDMCB | DCX | 2903,0 | | Write/Wait/Image/LU-3; status |
| | DAC | ABUF,0,0,0 | | |
| MSG.ABRT | DB | C'DNLDNC ABORTS',X'D' | | |

MSG.OUCH SUBROUTINE

| Label | Instruction | | Comment |
|---|---|---|---|
| MSG.OUCH | LHI | R0,X'31' | Type 1 MSG |
| | BS | STOREPB | |
| OK.OUCH | LHI | R0,X'32' | Type 2 MSG |
| STOREPB | STB | R0,-1(R6) | Store page Byte |
| | LR | RC,R6 | A(MCB.CDBF) |

-continued

|  | SVC | 2,MOVE | Move message to be sent to buffer storage |
|---|---|---|---|
|  | LHI | R0,X'D' | Add carriage return character |
|  | STB | R0,0(RC) |  |
|  | ST | R5,NEXTQ | A(MCB) |
|  | SVC | 6,SEND.MSG | Transmit message to N/C system |
|  | BR | RF | Return |
|  | ALIGN | 4 |  |
| MOVE | DCX | C012,BOC |  |
|  | DAC | ENDSTRNG |  |
| ENDSTRNG | DCX | 10D |  |
|  | ALIGN | 4 |  |
| SEND.MSG | DC | C'OUCH ' |  |
|  | DC | SFUN.DOM+SFUN.QM |  |
|  | DB | 0,0,0 |  |
| SENDSTAT | DB | 0 |  |
|  | DCF |  |  |
| NEXTQ | DCF | 0 |  |
|  | DCF | 0,0,0 |  |

CONSTANTS & VARIABLES
FOR DNLDNC PROGRAM

|  |  |  | Comment |
|---|---|---|---|
| TSK.COM | COMN |  |  |
| DNC.PARM | DS | 4 | $PARM PART# field definitions ADDR |
| DNC.CDMN | DS | 4 | External command mnemonic table ADDR |
| DNC.CDID | DS | 4 | Internal command mnemonic table ADDR |
| DNC.TKMN | DS | 4 | External task ID table ADDR |
| DNC.TKID | DS | 4 | Internal task ID table ADDR |
| DNC.VMT | DS | 4 | Volume mnemonic table ADDR |
| DNC.SVOL | DS | 4 | System volume VMT ADDR |
| DNC.VDTA | DS | 4 | Volume definition table ADDR (Active L) |
| DNC.OUCH | DS | 4 | Ouch task Q ADDR (Also Online Q) |
| DNC.TASK | DS | 4 | Terminal task-use table |
| DNC.XGET | DS | 8 | Xrfhan SVC 2 get storage Parblk |
| DNC.XFSZ | DS | 2 | XRFSIZ $XREF Entry size |
|  | DS | 2 |  |
| DNC.ASSI | DS | 2 | .ASSI Assignments Offset |
|  | DS | 2 |  |
| DNC.DATE | DS | 2 | .DATE Date offset |
|  | DS | 2 |  |
| DNC.XTRN | DS | 2 | .EXTRN EXT PART# Offset |
|  | DS | 2 |  |
| DNC.FMT | DS | 2 | .FMT Format Offset |
|  | DS | 2 |  |
| DNC.NTRN | DS | 2 | .INTRN INT PART# Offset |
|  | DS | 2 |  |
| DNC.OPTI | DS | 2 | .OPTI Options Offset |
|  | DS | 2 |  |
| DNC.SIZE | DS | 2 | .SIZE Footage Offset |
|  | DS | 2 |  |
| DNC.TIME | DS | 2 | .TIME Time Offset |
|  | DS | 2 |  |
| DNC.TRNS | DS | 2 | .TRANS Transparent Offset |
|  | DS | 2 |  |
| DNC.NMSZ | DS | 2 | NAMSIZ EXTERNAL PART# Size |
| DNC.IXLN | DS | 2 | IDXLIN Index line length |
| DNC.PFLD | DS | 2 | $PFLDS # PART Fields |
| DNC.TFLD | DS | 2 | $TFLDS # TRANS Fields |
| DNC.NMAC | DS | 2 | $NMACH # MACHINES |
| DNC.SYOP | DS. | 2 | SYSOPT SYSTEM OPTIONS |
| DNC.EN | DS | 2 | EN Endtask Mnemonic |
| DNC.MCSZ | DS | 2 | MCB Size (Bytes) |
| DNC.EXP | DS | 152 |  |
| DNC.MCB | DS | 0 | MCBTAB Start |
|  | ENDS |  |  |

*
* DNC.OPTI
* XRF ENTRY PART PROGRAM OPTIONS
* BIT EQU'S ASSUME OPTION BYTE OCCUPIES LSB OF HALFWORD
  (BITS8-15)
*

| DOPT.LTB | EQU | 9 |  |
|---|---|---|---|
| DOPT.LTM | EQU | X'40' | Set=Trailing;Reset=Leading |
| DOPT.DPB | EQU | 8 |  |
| DOPT.DPM | EQU | X'80' | Set=Production; Reset=Development |

*
* DNC.SYOP
* DNC SYSTEM OPTIONS
*

| DSYO.DBB | EQU | 15 |
|---|---|---|
| DSYO.DBM | EQU | X'0001' |

-continued

| | | | |
|---|---|---|---|
| DSYO.SDB | EQU | 1 | |
| DSYO.SDM | EQU | X'4000' | Set=Scheduling |
| DSYO.SCB | EQU | 0 | |
| DSYO.SCM | EQU | X'8000' | Set=Security |
| * | | A(DNC.MCB)+MCB*MACHINE#=ADDRESS OF MACHINE'S MCB | |
| MCB | STRUC | | |
| MCB.MACH | DS | 6 | $MACH Machine ID'S |
| MCB.LMN | DS | 2 | Logical Machine # |
| MCB.MFD | DS | 4 | Machine file descriptor |
| MCB.OPTI | DS | 2 | $OPTI Options |
| MCB.STAT | DS | 2 | $MSTAT Status |
| *BEGIN OUCH SVC1 PARBLK | | | |
| | DS | 4 | MCB ADDR (CDPB−4) |
| MCB.CDPB | DS | 4 | OUCH SVC1 PARBLK |
| MCB.CDBF | DS | 4 | Command Buffer Start ADDR |
| | DS | 16 | Balance of PARBLK |
| * END OUCH SVC1 PARBLK | | | |
| * BEGIN PPCT SVC4 PARBLK | | | |
| MCB.CMPB | DS | 4 | PPCT SVC4 PARBLK |
| MCB.FQ | DS | 4 | $FQ FULL QUEUE ADDR |
| MCB.MTQ | DS | 4 | $MTQ EMPTY QUEUE ADDR |
| MCB.DSEL | DS | 1 | DEVSEL Device Select,ASCII, "N","B", ETC. |
| | DS | 3 | Balance of PARBLK |
| * END PPCT SVC4 PARBLK | | | |
| MCB.CMBF | DS | 4 | $ABUFF ADDR of 1st COMBUF |
| MCB.CMSZ | DS | 1 | $BUFSZ #SECTORS/COMBUF |
| MCB.CMNB | DS | 1 | $NBUFF #COMBUFS/MACHINE |
| | DS | 2 | Filler |
| MCB.EXNM | DS | 4 | $EXTNM EXTERNAL PART # ADDR |
| MCB.MPAT | DS | 4 | $MPAT MACHINE/PROGRAM ASSIGN-MENT TABL |
| MCB.PW | DS | 8 | PWTAB PASSWORD CURRENT |
| MCB.AP | DS | 4 | APTBL ACCESS PRIVILEGES CURRENT |
| MCB.APD | DS | 4 | APDFLT ACCESS DEFAULT |
| | ENDS | | |

*
* MCB.STAT
* DNC TERMINAL STATUS
*

| | | | |
|---|---|---|---|
| MSTA.LTB | EQU | 9 | |
| SFUN.DMS | EQU | Y'C0000000' | Direction: Self |
| SFUN.ECM | EQU | Y'10000000' | End Task: Cancel |
| SFUN.EDM | EQU | Y'20000000' | End Task: Delete |
| SFUN.LM | EQU | Y'2000000' | Load |
| SFUN.LB | EQU | 6 | |
| SFUN.HM | EQU | Y'00800000' | Task Resident |
| SFUN.HB | EQU | 8 | |
| SFUN.SM | EQU | Y'00400000' | Suspend Execution |
| SFUN.SB | EQU | 9 | |
| SFUN.MM | EQU | Y'00100000' | Send Message |
| SFUN.MB | EQU | 11 | |
| SFUN.QM | EQU | Y'80000' | Queue Parameter |
| SFUN.QB | EQU | 12 | |
| SFUN.PM | EQU | Y'40000' | Change Priority |
| SFUN.PB | EQU | 13 | |
| SFUN.OM | EQU | Y'8000' | Connect Device to Called Task |
| SFUN.OB | EQU | 16 | |
| SFUN.TM | EQU | Y'4000' | Thaw |
| SFUN.TB | EQU | 17 | |
| SFUN.IM | EQU | Y'2000' | Sint |
| SFUN.IB | EQU | 18 | |
| SFUN.FM | EQU | Y'1000' | Freeze |
| SFUN.FB | EQU | 19 | |
| SFUN.UM | EQU | Y'800' | Unconnect |
| SFUN.UB | EQU | 20 | |
| SFUN.RM | EQU | Y'00000080' | Release |
| SFUN.RB | EQU | 24 | |
| SFUN.NM | EQU | Y'00000040' | Task Non-resident |
| SFUN.NB | EQU | 25 | |
| SFUN.SIM | EQU | Y'2' | Start Immediately |
| SFUN.SDM | EQU | Y'4' | Delay Start |
| | ENDS | | |
| R0 | EQU | 0 | |
| R1 | EQU | 1 | |
| R2 | EQU | 2 | |
| R3 | EQU | 3 | |
| R4 | EQU | 4 | |
| MSTA.LTM | EQU | X'40' | Set=Trailing; Reset=Leading |
| MSTA.ALB | EQU | 4 | Set=P.P. File Allocated |
| MSTA.ALM | EQU | X'800' | Set=P.P. File Allocated |
| MSTA.OLB | EQU | 3 | |
| MSTA.OLM | EQU | X'1000' | Set=Online; Reset=Offline |
| MSTA.ABB | EQU | 2 | |
| MSTA.ABM | EQU | X'2000' | Set=Aborted |
| MSTA.ACB | EQU | 1 | |
| MSTA.ACM | EQU | X'4000' | Set=Active |
| MSTA.ASB | EQU | 0 | |
| MSTA.ASM | EQU | X'8000' | Set=Assigned |

*
*MCB.OPTI
*DNC TERMINAL OPTIONS
*

-continued

| | | | |
|---|---|---|---|
| MOPT.MIB | EQU | 15 | |
| MOPT.MIM | EQU | 1 | Set=Management Information |
| MOPT.PDB | EQU | 14 | |
| MOPT.PDM | EQU | 2 | Set=Permanent Default  J |
| | COPY | SVC6. | |
| SVC6. | STRUC | | |
| SVC6.ID | DS | 8 | TASKID |
| SVC6.FUN | DS | 4 | Function |
| SUC6.TST | DS | 2 | Task Status |
| SVC6.STA | DS | 2 | Error Pointer & Code |
| SVC6.LU | DS | 1 | Load LU |
| SVC6.PRI | DS | 1 | Priority to be Set |
| SVC6.RPI | DS | 1 | Return Priority |
| | DS | 1 | Reserved |
| SVC6.SAD | DS | 4 | Start Address |
| SVC6.TIM | DS | 4 | Time Type & Delay Time |
| SVC6.DMN | DS | 4 | Device Mnemonic |
| SVC6.PAR | DS | 4 | Parameter (High Byte must be Zero) |
| SVC6.MSG | DS | 4 | A(Mess Buff) |
| | DS | 2*4 | Reserved |
| | ENDS | | |
| SFUN. | STRUC | | |
| SFUN.DOM | EQU | Y'80000000' | Direction: Other Tasks |
| R5 | EQU | 5 | |
| R6 | EQU | 6 | |
| R7 | EQU | 7 | |
| R8 | EQU | 8 | |
| R9 | EQU | 9 | |
| RA | EQU | 10 | |
| RB | EQU | 11 | |
| RC | EQU | 12 | |
| RD | EQU | 13 | |
| RE | EQU | 14 | |
| RF | EQU | 15 | |
| | COPY | UDL | |
| UDL | STRUC | | |
| UDL.CTOP | DS | 4 | CTOP |
| UDL.UTOP | DS | 4 | UTOP |
| UDL.UBOT | DS | 4 | UBOT |
| | DS | 4 | Reserved |
| UDL.TSKQ | DS | 4 | A(TASK QUEUE) |
| UDL.STKQ | DS | 4 | A(SUBTASK QUEUE) |
| UDL.MSGR | DS | 4 | A(MESSAGE RING) |
| UDL.SV14 | DS | 4 | A(SVC 14 ARG) |
| | DS | 16 | Reserved |
| UDL.PWRO | DS | 8 | Power restoration old TSW |
| UDL.PWRN | DS | 8 | Power restoration new TSW |
| UDL.ARFO | DS | 8 | Arithmetic fault old TSW |
| UDL.AFRN | DS | 8 | Arithmetic fault new TSW |
| UDL.SUBO | DS | 8 | Subtask Queue service old TSW |
| UDL.SUBN | DS | 8 | Subtask Queue service new TSW |
| UDL.S14O | DS | 8 | SVC 14 old TSW |
| UDL.S14N | DS | 8 | SVC 14 new TSW |
| UDL.TSKO | DS | 8 | Task Queue service old TSW |
| UDL.TSKN | DS | 8 | Task Queue service new TSW |
| UDL.MAFO | DS | 8 | Memory access fault old TSW |
| UDL.MAFN | DS | 8 | Memory access fault new TSW |
| UDL.IITO | DS | 8 | Illegal instruction old TSW |
| UDL.IITN | DS | 8 | Illegal instruction new TSW |
| | DS | 16*2 | Reserved |
| UDL.AIDS | DS | 64 | Reserved for aids |
| | ENDS | | |
| TSW.WTM | EQU | Y'80000000' | Trap Wait |
| TSW.WTB | EQU | 0 | |
| TSW.PWRM | EQU | Y'40000000' | Power Restoration Trap Enable |
| TSW.PWRB | EQU | 1 | |
| TSW.AFM | EQU | Y'20000000' | Arith Fault Trap Enable |
| TSW.AFB | EQU | 2 | |
| TSW.S14M | EQU | Y'10000000' | SVC 14 Trap Enable |
| TSW.S14B | EQU | 3 | |
| TSW.TSKM | EQU | Y'8000000' | Task Queue Service Trap Enable |
| TSW.TSKB | EQU | 4 | |
| TSW.MAFM | EQU | Y'4000000' | Memory Access Fault Trap Enable |
| TSW.MAFB | EQU | 5 | |
| TSW.IITM | EQU | Y'2000000' | Illegal Instruction Trap Enable |
| TSW.IITB | EQU | 6 | |
| TSW.SUBM | EQU | Y'1000000' | Subtask Status Change Trap Enable |
| TSW.SUBB | EQU | 7 | |
| TSW.NRLM | EQU | Y'800000' | Non-Rollable |
| TSW.NRLB | EQU | 8 | |
| TSW.DIQM | EQU | Y'8000' | Queue Entry Device Interrupt |
| TSW.DIQB | EQU | 16 | |
| TSW.TCM | EQU | Y'4000' | Queue Entry Task Call |
| TSW.TCB | EQU | 17 | |
| TSW.LMM | EQU | Y'2000' | Queue Entry Subtask Log Message |
| TSW.LMB | EQU | 18 | |
| TSW.PMM | EQU | Y'1000' | Queue Entry Peer Task Message |

-continued

| | | | |
|---|---|---|---|
| TSW.PMB | EQU | 19 | |
| TSW.STM | EQU | Y'800' | Queue Entry Supertask Message |
| TSW.STB | EQU | 20 | |
| TSW.IOM | EQU | Y'400' | Queue Entry I/O Proceed Termination |
| TSW.IOB | EQU | 21 | |
| TSW.TMCM | EQU | Y'200' | Queue Entry Timeout Completion |
| TSW.TMCB | EQU | 22 | |
| TSW.ITM | EQU | Y'100' | ITAM Bit |
| TSW.ITB | EQU | 23 | |
| TSW.SSM | EQU | Y'80' | Queue Entry Subtask Status Change |
| TSW.SSB | EQU | 24 | |
| TSW.LOC | EQU | 4 | Displacement of LOC Fullword |
| $DX | EQU | 32768 | Download EXEC Tape Access |
| $DA | EQU | 16384 | Download Application Tape Access |
| $DT | EQU | 8192 | Download Testing Tape Access |
| CMDBFSZ | EQU | 64 | |
| ABUFSZ | EQU | 200 | |
| BBUFSZ | EQU | 126 | |

We claim:

1. A numerical control system, the combination comprising:
    a read/write memory for storing programs including an executive system program;
    an N/C processor coupled to said read/write memory by a data bus and an address bus, said N/C processor being operable to write data into said read/write memory through said data bus;
    a read-only memory coupled to said N/C processor and storing a resident communications program;
    means coupled to said N/C processor for initiating the transfer of said resident communications program from said read-only memory to said read/write memory;
    means associated with said N/C processor which is responsive to said initiating means for sequentially transferring each instruction in said resident communications program to said read/write memory and for causing said N/C processor to commence executing said resident communication program;
    host processor means coupled to said N/C processor;
    storage means for storing executive system programs for numerical control systems, said storage means being coupled to said host processor to download selected executive system programs to said N/C processor;
    wherein said N/C processor is operable in response to said resident communications program to transmit to said host processor a request for a selected executive system program and to receive and store in said read/write memory the downloaded instructions of said selected executive system program.

2. The numerical control system as recited in claim 1 in which a keyboard is coupled to said N/C processor for enabling the manual selection of the executive system program to be downloaded.

3. The numerical control system as recited in claim 1 in which the host processor is located remotely from the N/C processor and the downloaded executive system program is coupled to the N/C processor through a data link.

4. The numerical control system as recited in claim 1 in which said means for sequentially transferring the resident communications program to said read/write memory includes a transfer counter which connects to said read-only memory to address memory locations therein and said transfer counter is repeatedly incremented to successively address each program instruction stored in said read-onl-memory.

5. The numerical control system as recited in claim 4 in which said N/C processor performs functions in response to the execution of microroutines stored in a second read-only memory and said means for initiating the transfer of the resident communications program is a manually operable switch, which when operated, causes the N/C processor to execute a selected one of said microroutines.

6. The numerical control processor as recited in claim 5 in which said N/C processor operates in response to said one selected microroutine to read program instructions addressed by said transfer counter out of said read-only memory and write them into said read/write memory.

7. A control system, the combination comprising:
    a processor which is operable in response to program instructions stored in an associated read/write memory;
    a host processor coupled to said processor by a data link;
    a storage device coupled to said host processor for storing a download library comprised of a plurality of executive system programs for said processor to enable it to control the operation of a machine tool;
    means for generating a download command to said host processor, which command includes a code that identifies one of said executive system programs, said host processor being responsive to said received download command to read the selected executive system program out of said storage device and download it to said processor read/write memory through said data link;
    second memory means coupled to said processor read/write memory for storing a resident communication program; and
    means forming part of said processor for transferring said resident communications program from said second memory means to said read/write memory and means for sequentially reading the instructions of said resident communications program out of said read/write memory and executing them;
    wherein said processor operates in response to the execution of said resident communications program instructions to store instructions of said downloaded executive system program received through said data link in its associated read/write memory.

8. The control system as recited in claim 7 in which said means for generating a download command includes a keyboard coupled to said processor and said processor is operable in response to instructions in said resident communication program to input data from said keyboard, to form a download command using said data, and to coupled the download command to the host processor through said data link.

9. The control system as recited in claim 7 in which said second memory means is an indestructible memory.

* * * * *